(12) United States Patent
He et al.

(10) Patent No.: US 11,297,674 B2
(45) Date of Patent: Apr. 5, 2022

(54) METHOD AND APPARATUS FOR POWER SAVINGS AT A USER EQUIPMENT

(71) Applicant: Samsung Electronics Co., Ltd., Suwon-si (KR)

(72) Inventors: Chao He, Allen, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 16/268,300

(22) Filed: Feb. 5, 2019

(65) Prior Publication Data

US 2019/0254110 A1 Aug. 15, 2019

Related U.S. Application Data

(60) Provisional application No. 62/701,028, filed on Jul. 20, 2018, provisional application No. 62/679,118, filed on Jun. 1, 2018, provisional application No. 62/678,513, filed on May 13, 2018, provisional application No. 62/630,597, filed on Feb. 14, 2018.

(51) Int. Cl.
| | |
|---|---|
| *H04W 76/28* | (2018.01) |
| *H04W 52/02* | (2009.01) |
| *H04L 12/24* | (2006.01) |
| *H04L 5/00* | (2006.01) |
| *H04L 41/0896* | (2022.01) |

(52) U.S. Cl.
CPC .......... *H04W 76/28* (2018.02); *H04L 5/0048* (2013.01); *H04L 41/0896* (2013.01); *H04W 52/0235* (2013.01)

(58) Field of Classification Search
CPC . H04W 76/28; H04W 52/0235; H04W 76/27; H04W 76/15; H04W 52/0212; H04W 72/042; H04L 41/0896; H04L 5/0048; H04L 5/005; Y02D 30/70
See application file for complete search history.

(56) References Cited

U.S. PATENT DOCUMENTS

| | | | |
|---|---|---|---|
| 10,206,091 B2 | 2/2019 | Ryu et al. | |
| 2003/0045288 A1* | 3/2003 | Luschi | H04W 52/16 455/434 |
| 2009/0088148 A1* | 4/2009 | Chung | H04W 48/16 455/423 |

(Continued)

FOREIGN PATENT DOCUMENTS

WO 2016/024789 A1 2/2016

OTHER PUBLICATIONS

Ericsson, "Interaction between DRX and BWP Inactivity Timer", 3GPP TSG-RAN WG2 #AH NR 1801, Jan. 22-26, 2018, 4 pages, Tdoc R2-1800335.

(Continued)

*Primary Examiner* — Gregory B Sefcheck
*Assistant Examiner* — Joshua Smith

(57) ABSTRACT

A method for a user equipment (UE) apparatus to reduce power consumption in response to an outcome of a signal reception. The outcome can indicate whether or not the UE needs to be active at a next discontinuous reception (DRX) cycle. The signal can also provide configurations of parameters for transmissions or receptions during the next DRX cycle and be used by the UE for measurements and to obtain channel state information.

17 Claims, 32 Drawing Sheets

(56) References Cited

U.S. PATENT DOCUMENTS

| | | | |
|---|---|---|---|
| 2009/0175186 A1* | 7/2009 | Du | H04W 76/28 370/252 |
| 2009/0190537 A1* | 7/2009 | Hwang | H04L 5/0032 370/329 |
| 2011/0107225 A1* | 5/2011 | Sukanen | H04L 67/02 715/736 |
| 2012/0044847 A1* | 2/2012 | Chang | H04W 76/28 370/311 |
| 2013/0012186 A1* | 1/2013 | Kim | H04L 5/003 455/418 |
| 2013/0039291 A1* | 2/2013 | Blankenship | H04L 5/0055 370/329 |
| 2013/0210420 A1 | 8/2013 | Deivasigamani et al. | |
| 2014/0307560 A1* | 10/2014 | Kim | H04W 24/08 370/241 |
| 2015/0117287 A1* | 4/2015 | Kim | H04W 4/18 370/311 |
| 2015/0304995 A1* | 10/2015 | Yi | H04L 5/0007 370/329 |
| 2015/0319802 A1* | 11/2015 | Lindoff | H04W 76/28 455/422.1 |
| 2015/0365207 A1* | 12/2015 | Lan | H04L 5/0048 370/329 |
| 2016/0081020 A1* | 3/2016 | Rahman | H04W 24/10 370/311 |
| 2016/0219557 A1* | 7/2016 | He | H04W 76/28 |
| 2016/0262118 A1* | 9/2016 | Kim | H04W 52/365 |
| 2016/0302092 A1* | 10/2016 | Sartori | H04L 5/0094 |
| 2016/0345310 A1* | 11/2016 | Hunukumbure | H04W 72/0453 |
| 2017/0374569 A1* | 12/2017 | Lee | H04W 72/042 |
| 2018/0206289 A1* | 7/2018 | Kim | H04W 72/12 |
| 2018/0324693 A1* | 11/2018 | Yu | H04W 76/28 |
| 2019/0132759 A1* | 5/2019 | Park | H04W 24/10 |
| 2019/0349915 A1* | 11/2019 | Ahn | H04L 5/0091 |
| 2020/0204328 A1* | 6/2020 | He | H04L 5/0055 |

OTHER PUBLICATIONS

Oppo et al., "UE behaviour on DRX timer operation", 3GPP TSG-RAN2 #101, Feb. 26-Mar. 2, 2018, 7 pages, R2-1801758.

International Search Report and Written Opinion of the International Searching Authority dated May 9, 2019 in connection with International Patent Application No. PCT/KR2019/001823, 7 pages.

"3rd Generation Partnership Project; Technical Specification Group Radio Access Network; Evolved Universal Terrestrial Radio Access (E-UTRA); Requirements for support of radio resource management (Release 15)", Technical Specification 3GPP TS 36.133, V15.0.0, Sep. 2017, 2663 pages.

"3rd Generation Partnership Project; Technical Specification Group Radio Access Network; Evolved Universal Terrestrial Radio Access (E-UTRA); User Equipment (UE) procedures in idle mode (Release 14)", Technical Specification 3GPP TS 36.304, V14.5.0, Dec. 2017, 49 pages.

"3rd Generation Partnership Project; Technical Specification Group Radio Access Network; Evolved Universal Terrestrial Radio Access (E-UTRA); Medium Access Control (MAC) protocol specification (Release 15)", Technical Specification 3GPP TS 36.321, V15.0.0, Dec. 2017, 109 pages.

"3rd Generation Partnership Project; Technical Specification Group Radio Access Network; NR; Requirements for support of radio resource management (Release 15)", Technical Specification 3GPP TS 38.133, V15.1.0, Mar. 2018, 59 pages.

"3rd Generation Partnership Project; Technical Specification Group Radio Access Network; NR; Physical layer procedures for control (Release 15)", Technical Specification 3GPP TS 38.213, V15.0.0, Dec. 2017, 56 pages.

"3rd Generation Partnership Project; Technical Specification Group Radio Access Network; NR; NR and NG-RAN Overall Description; Stage 2 (Release 15)", Technical Specification 3GPP TS 38.300, V15.0.0, Dec. 2017, 68 pages.

"3rd Generation Partnership Project; Technical Specification Group Radio Access Network; NR; User Equipment (UE) procedures in Idle mode and RRC Inactive state (Release 15)", Technical Specification 3GPP TS 38.304, V15.1.0, Sep. 2018, 27 pages.

"3rd Generation Partnership Project; Technical Specification Group Radio Access Network; NR; Medium Access Control (MAC) protocol specification (Release 15)", Technical Specification 3GPP TS 38.321. V15.0.0, Dec. 2017, 55 pages.

"3rd Generation Partnership Project; Technical Specification Group Radio Access Network; NR; Radio Resource Control (RRC) protocol specification (Release 15)", Technical Specification 3GPP TS 38.331, V15.0.0, Dec. 2017, 188 pages.

"3rd Generation Partnership Project; Technical Specification Group Radio Access Network; Study on New Radio Access Technology Physical Layer Aspects (Release 14)", Technical Report 3GPP TR 38.802, V14.2.0, Sep. 2017, 145 pages.

"3rd Generation Partnership Project; Technical Specification Group Radio Access Network; Study on Scenarios and Requirements for Next Generation Access Technologies; (Release 14)", Technical Report 3GPP TR 38.913, V14.3.0, Jun. 2017, 39 pages.

Nokia et al., "New WID on Enhancing CA Utilization", 3GPP TSG RAN Meeting #75, RP-170805 (revision of RP-170715), Mar. 2017, 4 pages.

Qualcomm Incorporated, "Open Issues on CA", 3GPP TSG RAN WG1 Meeting #91, R1-1720694, Nov. 2017, 14 pages.

MCC Support, "Final Report of 3GPP TSG RAN WG1 #91 v1.0.0 (Reno, USA, Nov. 27-Dec. 1, 2017)", 3GPP TSG RAN WG1 Meeting #92, R1-1801301, Feb. 2018, 218 pages.

MCC Support, "Final Report of 3GPP TSG RAN WG1 #AH_1801 v1.0.0 (Vancouver, Canada, Jan. 22-26, 2018)", 3GPP TSG RAN WG1 Meeting #92, R1-1801302, Feb. 2018, 114 pages.

Huawei et al., "Summary of remaining issues on bandwidth part and wideband operation", 3GPP TSG RAN WG1 Meeting #92, R1-1801347, Feb. 2018, 13 pages.

ETSI MCC, "Report of 3GPP TSG RAN2#100 meeting, Reno, Nevada, USA", 3GPP TSG-RAN WG2 meeting #101, R2-1801701, Feb. 2018, 212 pages.

Qualcomm Incorporated, "Advanced Grant Indication for UE Power Saving", 3GPP TSG RAN WG1 NR Ad-Hoc#2, Jun. 27-30, 2017, R1-1711187, 5 pages.

Huawei et al., "Designs for UE power saving", 3GPP TSG RAN WG1 Meeting #91, Nov. 27-Dec. 1, 2017, R1-1719832, 3 pages.

Supplementary European Search Report dated Feb. 8, 2021 in connection with European Patent Application No. 19 75 5093, 12 pages.

\* cited by examiner

METHOD AND APPARATUS FOR POWER SAVINGS AT A USER EQUIPMENT

CROSS-REFERENCE TO RELATED APPLICATIONS AND CLAIM OF PRIORITY

The present application claims priority to:
U.S. Provisional Patent Application Ser. No. 62/630,597, filed on Feb. 14, 2018;
U.S. Provisional Patent Application Ser. No. 62/678,513, filed on May 31, 2018;
U.S. Provisional Patent Application Ser. No. 62/679,118, filed on Jun. 1, 2018; and
U.S. Provisional Patent Application Ser. No. 62/701,028, filed on Jul. 20, 2018;
The content of the above-identified patent document is incorporated herein by reference.

TECHNICAL FIELD

The present disclosure relates generally to mechanisms for enabling reduced power consumption at a user equipment in wireless communication systems. More specifically, this disclosure relates to enabling power savings for a user equipment in new radio systems.

BACKGROUND

5th generation (5G) or new radio (NR) mobile communications, initial commercialization of which is expected around 2020, is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3x, support for up to 500 kilometer per hour (km/h) mobility, 1 millisecond (ms) latency, a connection density of 106 devices/km2, a network energy efficiency improvement of 100x and an area traffic capacity of 10 Mb/s/m2. While all the requirements need not be met simultaneously, the design of 5G/NR networks may provide flexibility to support various applications meeting part of the above requirements on a use case basis.

SUMMARY

The present disclosure relates to enabling power savings for a user equipment. Embodiments of the present disclosure provide signaling and mechanisms for a user equipment to reduce power consumption.

In one embodiment, a user equipment (UE) is provided. The UE includes a receiver and a processor operably connected to the receiver. The receiver is configured to receive a configuration for a set of cells that includes more than one cell. The processor is configured to determine whether the receiver received a signal on a cell in the set of cells; configure the receiver to receive on each cell in the set of cells at a respective next discontinuous reception (DRX) cycle based on determination of a first outcome for whether the receiver received the signal; and configure the receiver to skip reception on each cell in the set of cells at a respective next DRX cycle based on determination of a second outcome for whether the receiver received the signal.

In another embodiment, a method for operation of a UE is provided. The method includes receiving a configuration for a set of cells that includes more than one cell and determining whether a receiver of the UE received a signal on a cell in the set of cells. The method also includes configuring the receiver to receive on each cell in the set of cells at a respective next DRX cycle based on determining a first outcome for whether the receiver received the signal and configuring the receiver to skip reception on each cell in the set of cells at a respective next DRX cycle based on determining a second outcome for whether the receiver received the signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 40, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.913 v14.3.0, "Study on Scenarios and Requirements for Next Generation Access Technologies;" 3GPP TS 38.300 v15.0.0, "NR and NG-RAN Overall Description;" 3GPP TS 38.213 v15.1.0, "NR, Physical Layer Procedures for Control;" Chairman's Notes, 3GPP TSG RAN WG1 #91;" Chairman's Notes, 3GPP TSG RAN WG1 NR Ad-Hoc #1801;" 3GPP TS 36.304 v14.5.0, "User Equipment (UE) procedures in idle mode;" Chairman's Notes, 3GPP TSG RAN WG1 #90bis;" 3GPP TS 38.321 v15.1.0, "Medium Access Control (MAC) protocol specification;" 3GPP TS 38.331 v15.1.0, "NR, Radio Resource Control (RRC) protocol specification;" 3GPP TS 36.321 v15.1.0, "Evolved Universal Terrestrial Radio Access (E-UTRA); Medium Access Control (MAC) protocol specification;" 3GPP TS 36.133 v15.1.0, "Evolved Universal Terrestrial Radio Access (E-UTRA); Requirements for support of radio resource managements;" RP-170805 "New WID on Enhancing CA Utilization;" 3GPP TS 38.802 v14.2.0, "Study on new radio access technology Physical layer aspects;" 3GPP TS 38.133 v15.1.0, "NR; Requirements for support of radio resource managements;" 3GPP TS 38.304 v15.1.0, "NR; User Equipment (UE) procedures in Idle mode and RRC Inactive state;" and Chairman's Notes, 3GPP TSG RAN WG2 #100."

Figure 1:
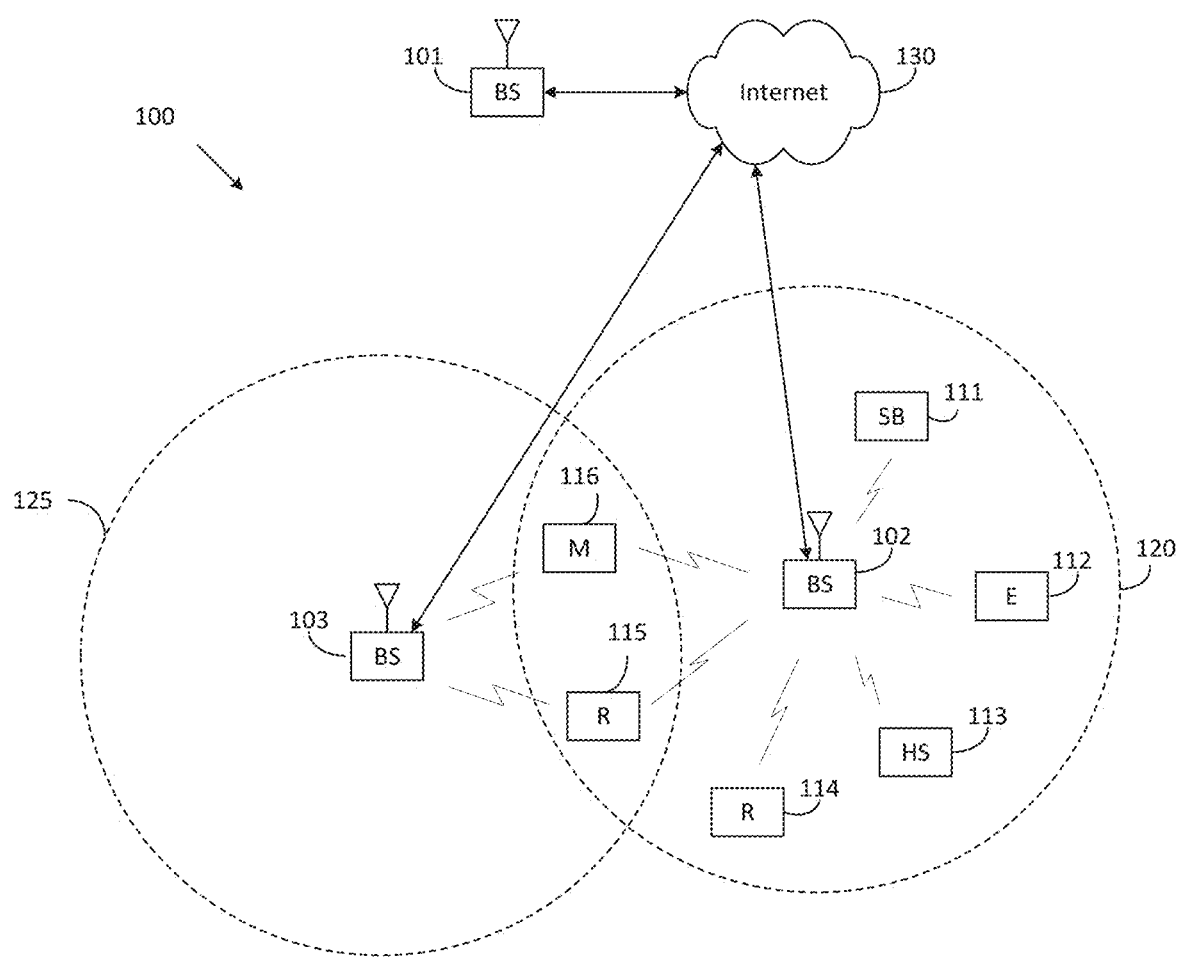
FIG. 1 illustrates an example wireless network according to embodiments of the present disclosure.
Figure 2:
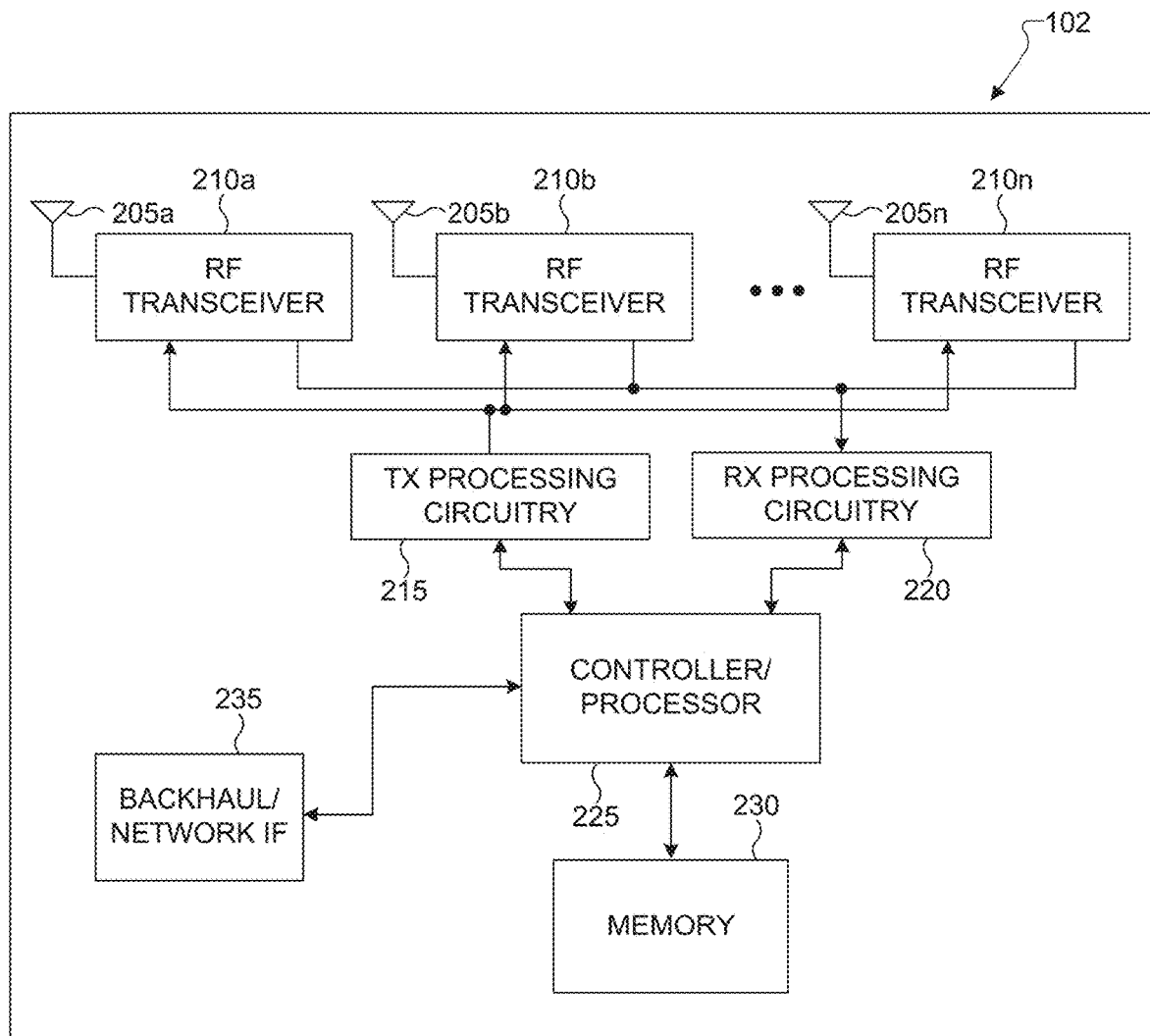
FIG. 2 illustrates an example gNB according to embodiments of the present disclosure.
Figure 3:
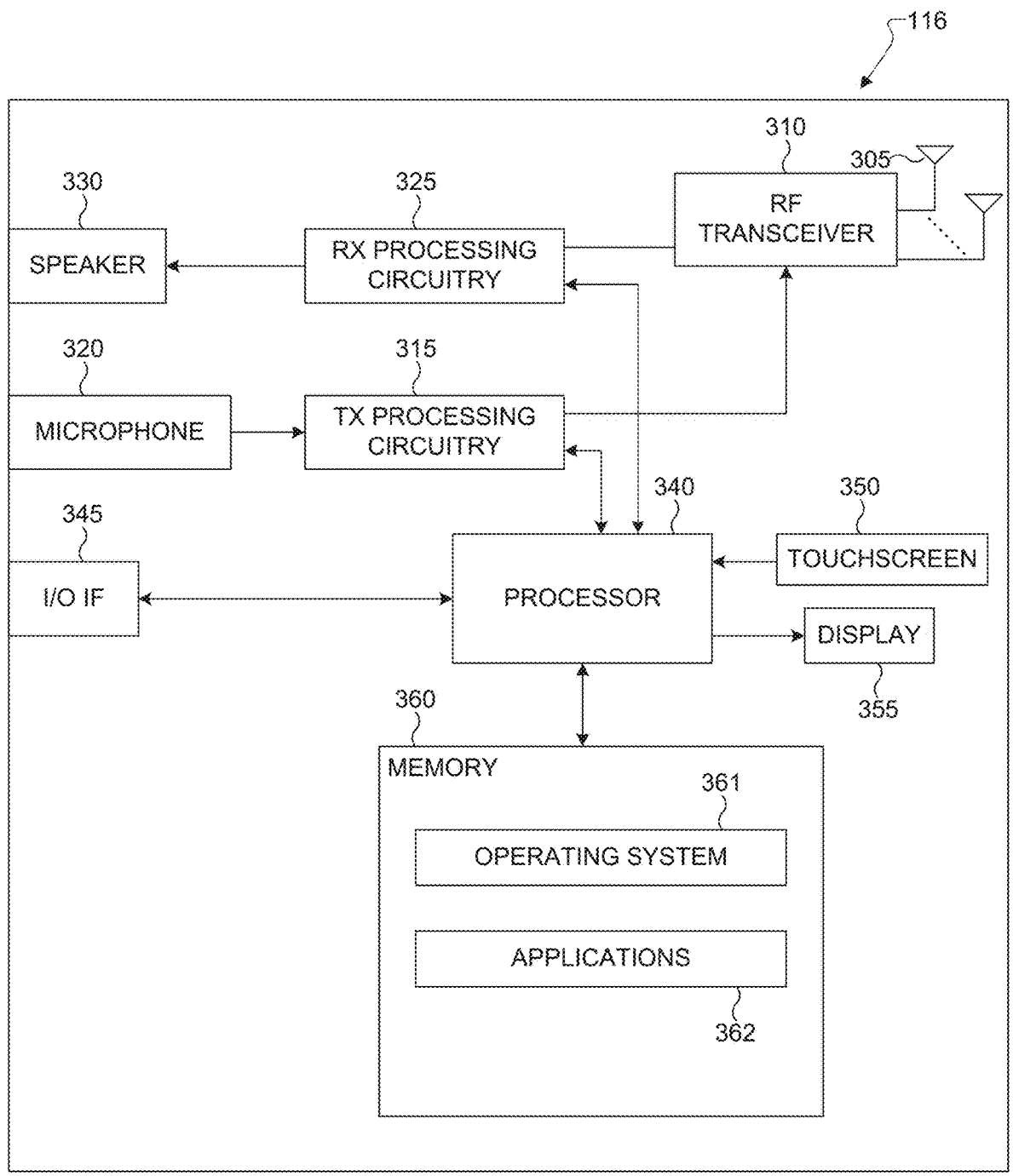
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient power saving operations in new radio systems. In certain embodiments, and one or more of the gNBs 101-103 includes circuitry, programming, or a combination thereof, for efficient power saving operations in new radio systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX)

processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems. In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G/NR system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
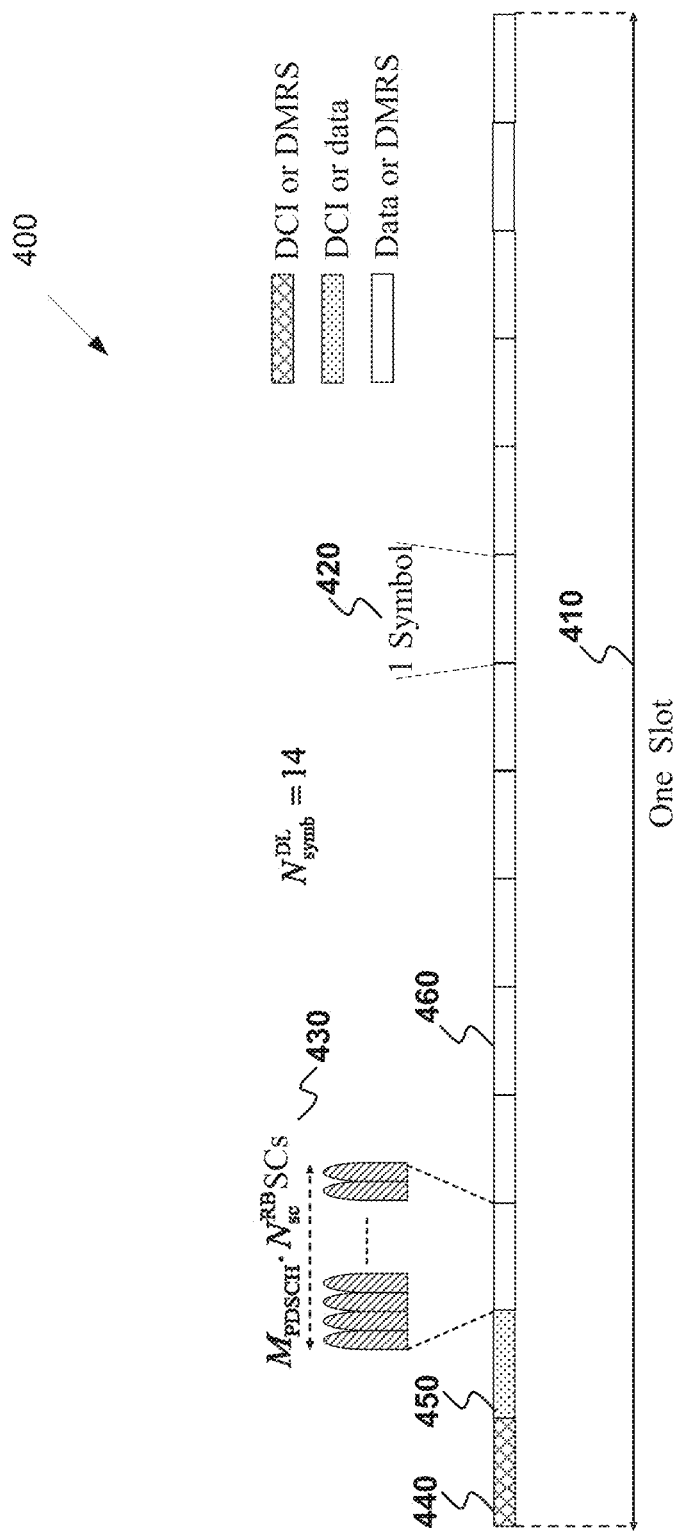
FIG. 4 illustrates an example DL slot structure according to embodiments of the present disclosure.

FIG. 4 illustrates an example DL slot structure 400 according to embodiments of the present disclosure. The embodiment of the DL slot structure 400 illustrated in FIG. 4 is for illustration only and could have the same or similar configuration. FIG. 4 does not limit the scope of this disclosure to any particular implementation.

A DL slot 410 includes $N_{symb}^{DL}$ symbols 420 where a gNB can transmit data information, DCI, or DMRS. A DL system BW includes $N_{RB}^{DL}$ RBs. Each RB includes $N_{sc}^{RB}$ SCs. A UE is assigned $M_{PDSCH}$ RBs for a total of $M_{sc}^{PDSCH} = M_{PDSCH} \cdot N_{sc}^{RB}$ SCs 430 for a PDSCH transmission BW. A PDCCH conveying DCI is transmitted over control channel elements (CCEs) that are substantially spread across the DL system BW. A first slot symbol 440 can be used by the gNB to transmit PDCCH. A second slot symbol 450 can be used by the gNB to transmit PDCCH or PDSCH. Remaining slot symbols 460 can be used by the gNB to transmit PDSCH and CSI-RS. In some slots, the gNB can also transmit synchronization signals and channels that convey system information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH.

UCI includes hybrid automatic repeat request acknowledgement (HARQ-ACK) information, indicating correct or incorrect detection of data transport blocks (TBs) in a PDSCH, scheduling request (SR) indicating whether or not a UE has data in the UE's buffer, and CSI reports enabling a gNB to select appropriate parameters for PDSCH or PDCCH transmissions to a UE. HARQ-ACK information can be configured to be with a smaller granularity than per TB and can be per code block (CB) or per group of CBs where a TB includes a number of CBs.

A CSI report from a UE can include a channel quality indicator (CQI) informing a gNB of a largest modulation and coding scheme (MCS) for the UE to detect a TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, and a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH).

Figure 5:
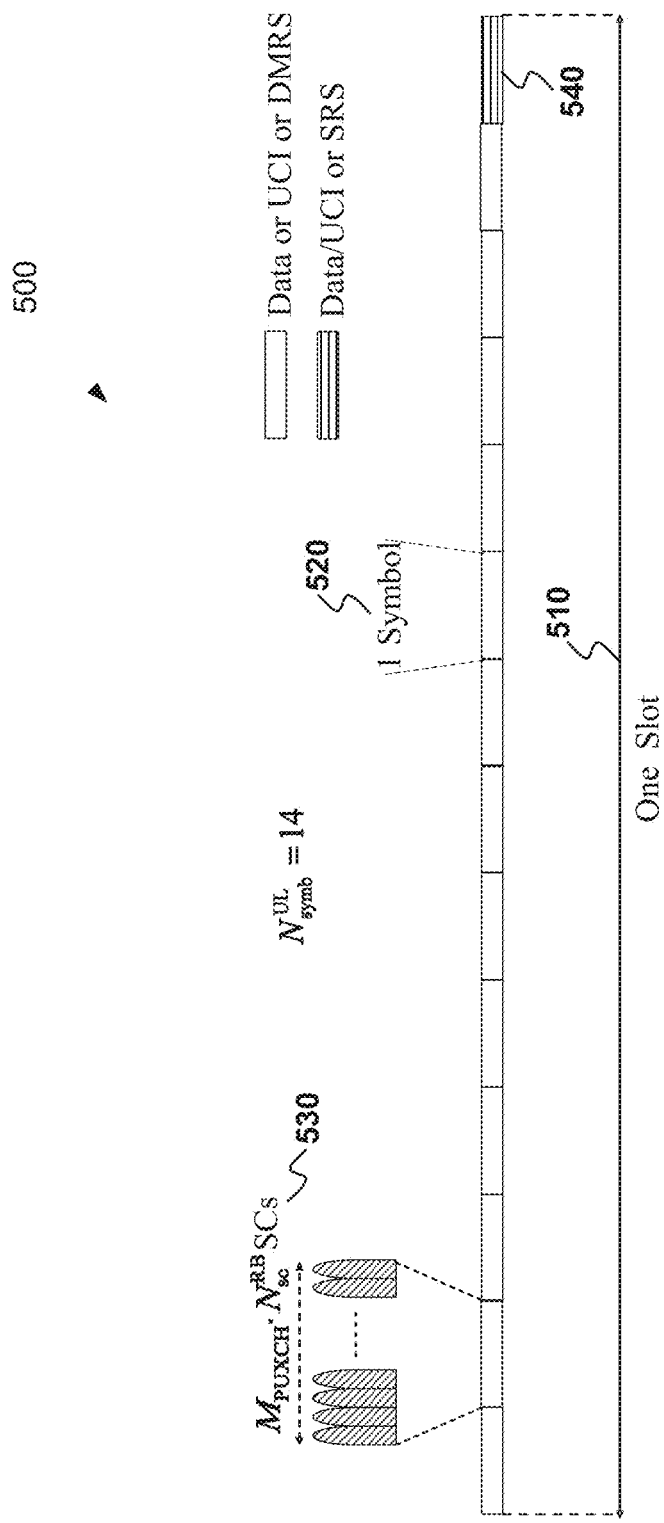
FIG. 5 illustrates an example UL slot structure for PUSCH transmission or PUCCH transmission according to embodiments of the present disclosure.

FIG. 5 illustrates an example UL slot structure 500 for PUSCH transmission or PUCCH transmission according to embodiments of the present disclosure. The embodiment of the UL slot structure 500 illustrated in FIG. 5 is for illustration only and could have the same or similar configuration. FIG. 5 does not limit the scope of this disclosure to any particular implementation.

As shown in FIG. 5, a slot 510 includes $N_{symb}^{UL}$ symbols 520 where UE transmits data information, UCI, or DMRS. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH}=M_{PUXCH} \cdot N_{sc}^{RB}$ SCs 530 for a PUSCH transmission BW ("X"="S") or for a PUCCH transmission BW ("X"="C"). Last one or more symbols of a slot can be used to multiplex SRS transmissions 550 or short PUCCH transmissions from one or more UEs.

A number of symbols available for data/UCI/DMRS transmission is $N_{symb}^{PUXCH}=2 \cdot (N_{symb}^{UL}-1)-N_{SRS}$ where $N_{SRS}$ is a number of symbols used for SRS transmission. Therefore, a number of total REs for a PUXCH transmission is $M_{sc}^{PUXCH} \cdot N_{symb}^{PUXCH}$. PUCCH transmission and PUSCH transmission can also occur in a same slot; for example, a UE can transmit PUSCH in the earlier symbols and PUCCH in the later symbols and then symbols used for PUCCH are not available for PUSCH and the reverse.

A hybrid slot includes a DL transmission region, a guard period region, and an UL transmission region, similar to a special subframe in LTE specification. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

DL transmissions and UL transmissions can be based on an orthogonal frequency division multiplexing (OFDM) waveform including a variant using DFT preceding that is known as DFT-spread-OFDM.

Figure 6:
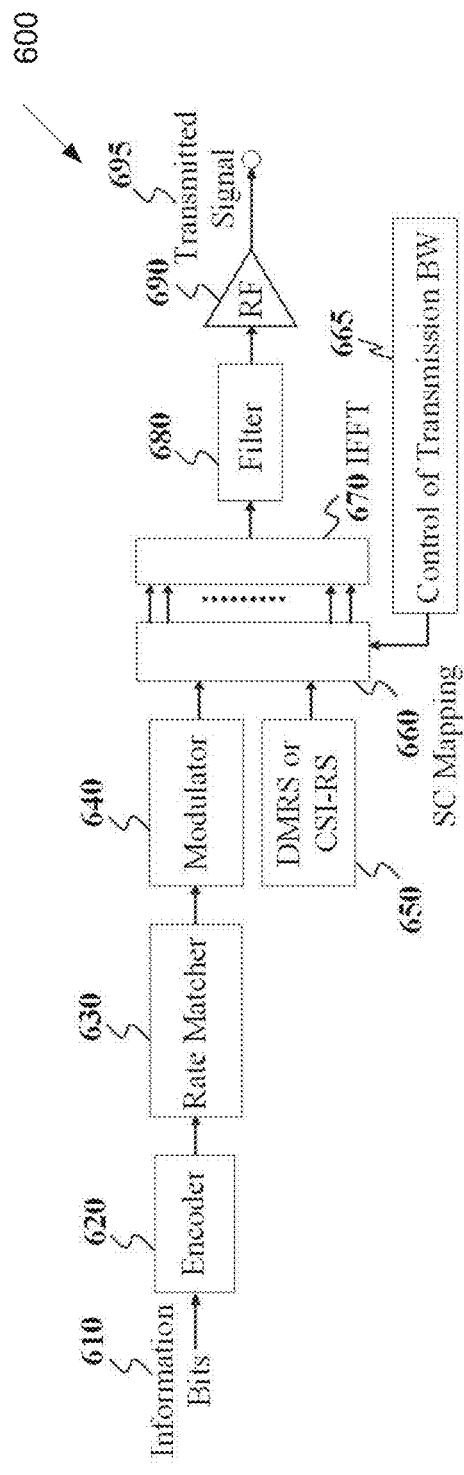
FIG. 6 illustrates an example transmitter structure using OFDM according to embodiments of the present disclosure.

FIG. 6 illustrates an example transmitter structure 600 using OFDM according to embodiments of the present disclosure. The embodiment of the transmitter structure 600 illustrated in FIG. 6 is for illustration only and could have the same or similar configuration. FIG. 6 does not limit the scope of this disclosure to any particular implementation.

As shown in FIG. 6, information bits, such as DCI bits or data bits 610, are encoded by encoder 620, rate matched to assigned time/frequency resources by rate matcher 630, and modulated by modulator 640. Subsequently, modulated encoded symbols and DMRS or CSI-RS 650 are mapped to SCs 660 by SC mapping unit 665, an inverse fast Fourier transform (IFFT) is performed by filter 670, a cyclic prefix (CP) is added by CP insertion unit 680, and a resulting signal is filtered by filter 690 and transmitted by an radio frequency (RF) unit 695.

Figure 7:
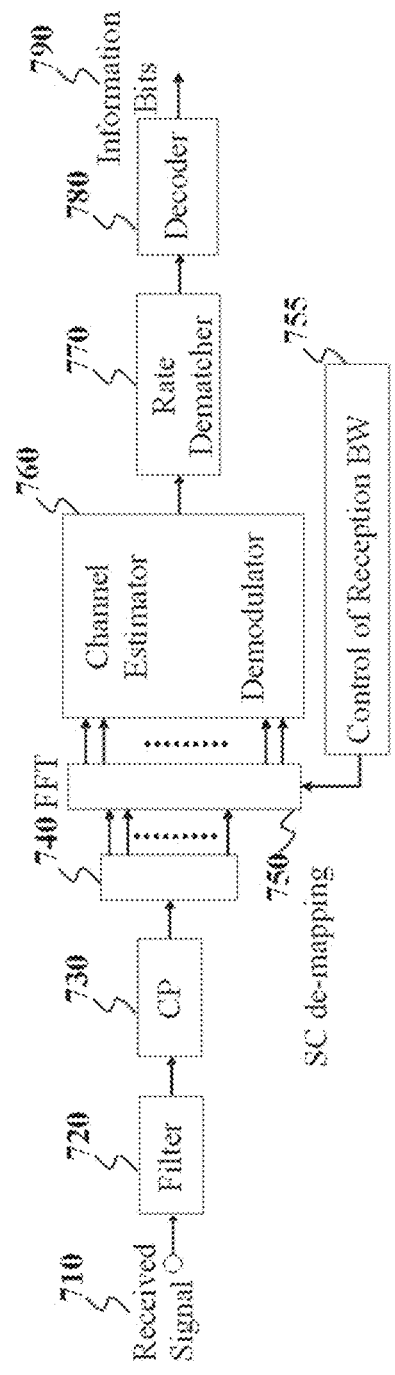
FIG. 7 illustrates an example receiver structure using OFDM according to embodiments of the present disclosure.

FIG. 7 illustrates an example receiver structure 700 using OFDM according to embodiments of the present disclosure. The embodiment of the receiver structure 700 illustrated in FIG. 7 is for illustration only and could have the same or similar configuration. FIG. 7 does not limit the scope of this disclosure to any particular implementation.

As shown in FIG. 7, a received signal 710 is filtered by filter 720, a CP removal unit removes a CP 730, a filter 740 applies a fast Fourier transform (FFT), SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

UE power consumption has been a critical issue in all generations of wireless communication systems. This is especially the case in NR where operation can be in large carrier frequencies, such as mmWave frequencies, a maximum channel bandwidth for a UE can be up to 400 MHz, and in several frequency bands a UE can be mandated to operate with 4 (instead of 2) receiver antennas. UE data typically arrives in bursts and a UE may be in idle or inactive mode most of time. In LTE, power saving schemes include a network separately configuring a UE with a discontinuous reception (DRX) cycle for idle and connected mode operation. The UE wakes up in each configured DRX cycle to detect if there is a paging indication in idle mode or to decode PDCCH candidates in order to detect potential DL/UL DCI formats in connected mode.

Even though most of the time a UE does not detect a paging indication or a DCI format for each respective DRX cycle, the UE needs to wake up to attempt detection of a paging indication in idle mode or to decode potential DCI formats in connected mode and this leads to considerable power consumption. If the same DRX mechanisms as in LTE are used for NR, more UE power may be unnecessarily consumed considering the larger channel bandwidth, the larger carrier frequencies, and the larger number of UE receiver antennas in NR.

NR has adopted bandwidth part (BWP) switching for a UE where an active BWP for a UE is switched to a smaller BWP for PDCCH monitoring when there is temporarily no PDSCH transmission to or PUSCH transmission from a UE. However, substantial additional improvements are needed in radio protocols to minimize UE power consumption.

UE power savings mechanisms are a system level design that interrelates and interacts with many other aspects of the system. The following technical background illustrates some of these related aspects of the system.

Figure 8:
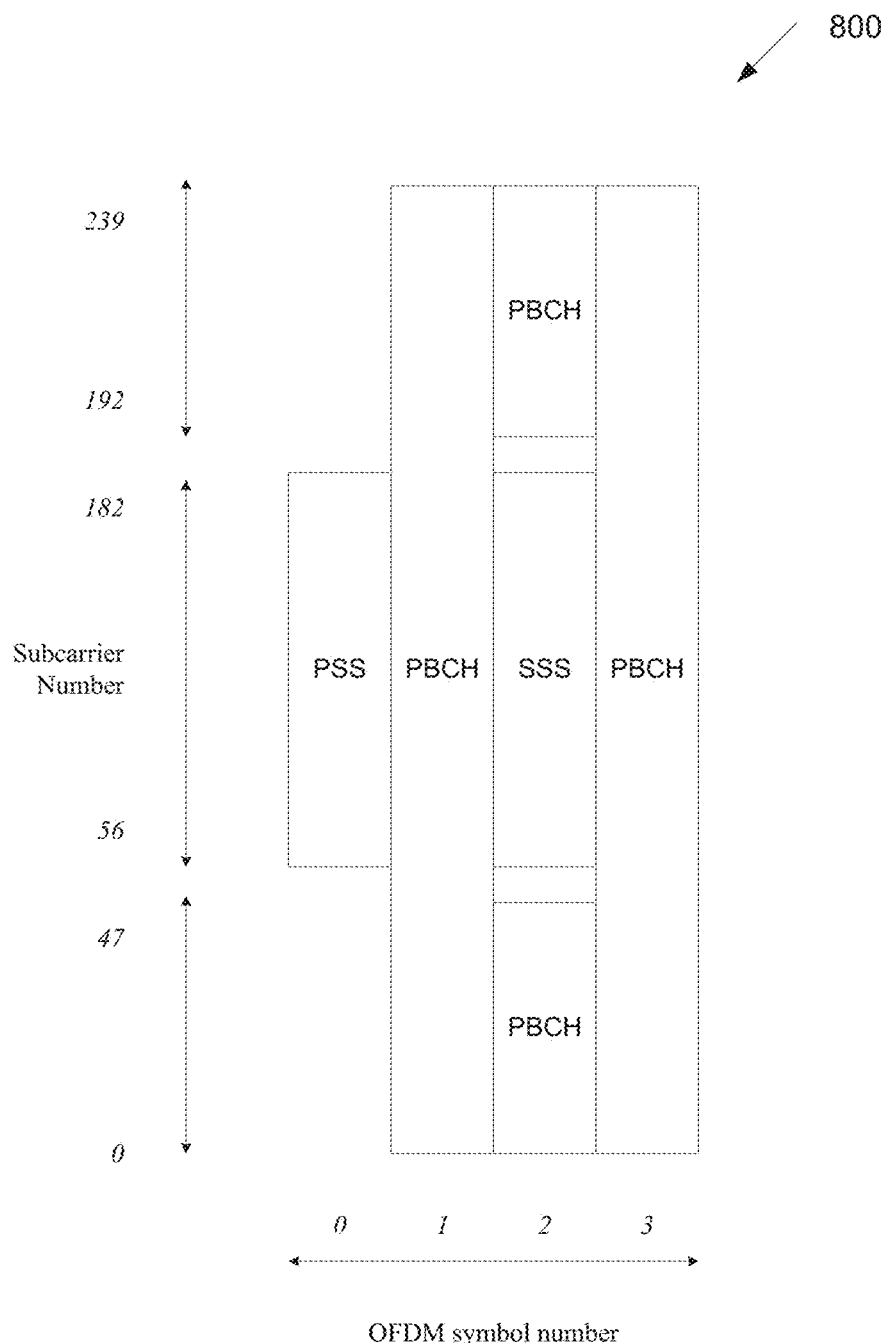
FIG. 8 illustrates an example synchronization signal and PBCH block according to embodiments of the present disclosure.

FIG. 8 illustrates an example synchronization signal and PBCH block 800 according to embodiments of the present disclosure. The embodiment of the synchronization signal and PBCH block 800 illustrated in FIG. 8 is for illustration only and could have the same or similar configuration. FIG. 8 does not limit the scope of this disclosure to any particular implementation.

The synchronization signal and PBCH block (SS/PBCH block) consists of primary and secondary synchronization signals (PSS, SSS), each occupying 1 symbol and 127 subcarriers, and PBCH spanning across 3 OFDM symbols and 240 subcarriers as shown in FIG. 8. The periodicity of a SS/PBCH block transmission can be configured by a gNB and the time locations where the gNB transmits SS/PBCH blocks are determined by the subcarrier spacing of the SS/PBCH block. For a half frame with SS/PBCH blocks, a number and first symbol indexes for candidate SS/PBCH blocks are determined according to a subcarrier spacing of SS/PBCH blocks.

A UE can be configured per serving cell a periodicity of the half frames for reception of SS/PBCH blocks per serving cell. If the UE is not configured a periodicity of the half frames for receptions of SS/PBCH blocks, the UE may assume a periodicity of a half frame. A UE may assume that the periodicity is same for all SS/PBCH blocks in the serving cell. For initial cell selection, a UE may assume that half frames with SS/PBCH blocks occur with a periodicity of 2 frames.

A UE is provided a configuration for a control resource set (CORESET) for Type0-PDCCH common search space (CSS) and for Type2-PDCCH CSS and for a subcarrier spacing (SCS) for PDCCH receptions. The UE determines the CORESET and the monitoring occasions for Type0-PDCCH CSS and for Type2-PDCCH CSS as described below where monitoring implies decoding each PDCCH candidate according to the monitored DCI formats.

The UE may assume that the DM-RS antenna port associated with PDCCH reception in the Type0-PDCCH CSS and the Type2-PDCCH CSS and for corresponding PDSCH receptions, and the DM-RS antenna port associated with SS/PBCH reception are quasi co-located (QCLed) with respect to delay spread, Doppler spread, Doppler shift, average delay, and spatial Rx parameters. The value for the DM-RS scrambling sequence initialization is the cell ID.

A CORESET configuration for candidate PDCCH receptions that include DCI formats scheduling PDSCH receptions that provide system information supports one-to-one association between one SS/PBCH block and one PDSCH with system information. NR does not support a CORESET configuration with many-to-one association between multiple SS/PBCH blocks and one PDSCH with system information in wideband operation.

Figure 9:
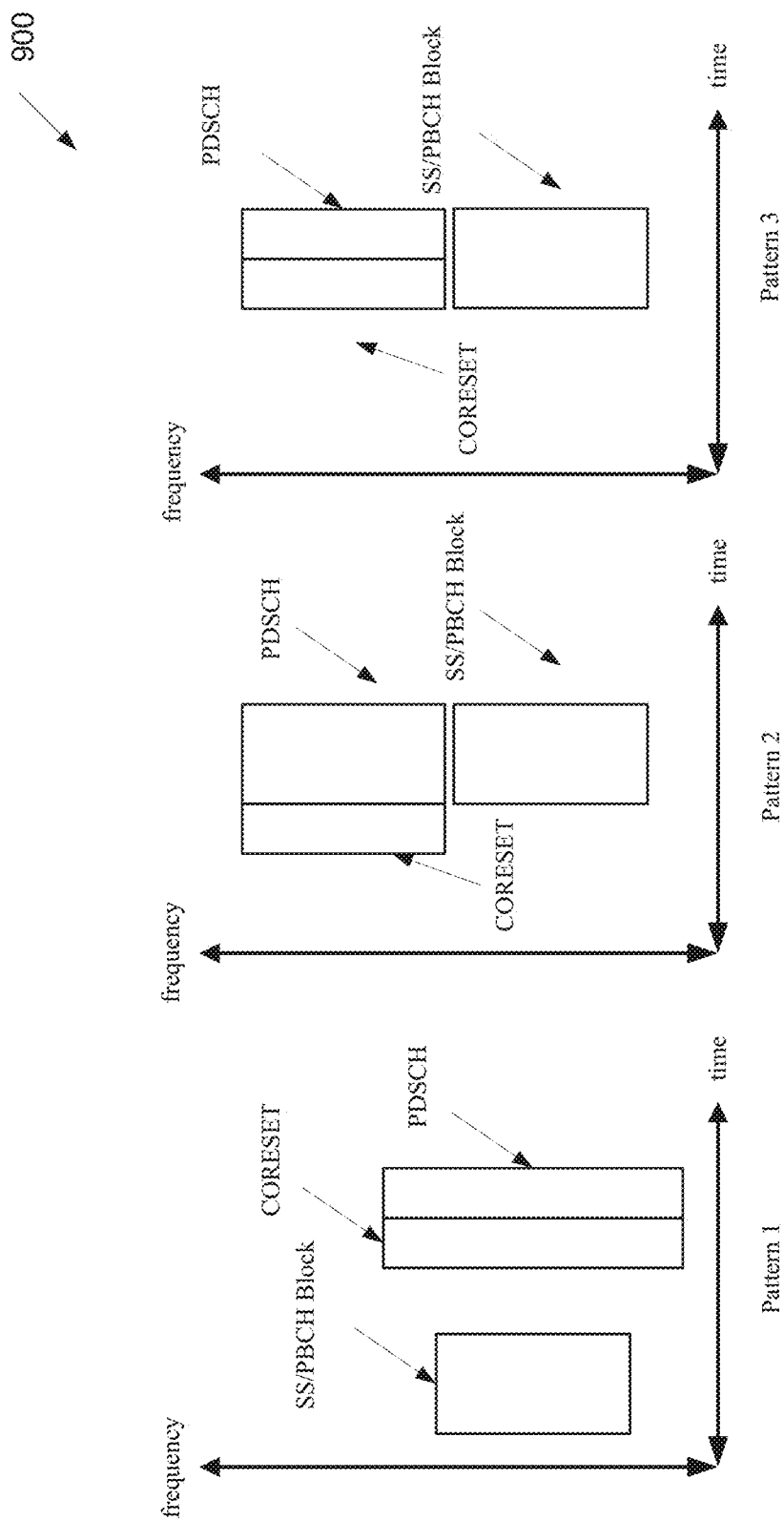
FIG. 9 illustrates an example multiplexing pattern table according to embodiments of the present disclosure.

FIG. 9 illustrates an example multiplexing pattern table 900 according to embodiments of the present disclosure. The embodiment of the multiplexing pattern table 900 illustrated in FIG. 9 is for illustration only and could have the same or similar configuration. FIG. 9 does not limit the scope of this disclosure to any particular implementation.

Definition for the multiplexing pattern tables SS/PBCH SCS and CORESET SCS for PDCCH receptions scheduling PDSCH reception with system information as shown in FIG. 9.

In one example, "Pattern 1" refers to the multiplexing pattern that a SS/PBCH block and a CORESET for candidate PDCCH receptions scheduling PDSCH receptions with system information occur in different time instances, and SS/PBCH block transmission BW and the initial active DL BWP containing the CORESET overlap.

In one example, "Pattern 2" refers to the multiplexing pattern that a SS/PBCH block and a CORESET for PDCCH receptions scheduling PDSCH reception with system information occur in different time instances, and SS/PBCH block transmission BW and the initial active DL BWP containing the CORESET do not overlap.

In one example, "Pattern 3" refers to the multiplexing pattern that a SS/PBCH block and a CORESET for PDCCH receptions scheduling PDSCH reception with system information occur in the same time instance, and SS/PBCH block transmission BW and the initial active DL BWP containing the CORESET do not overlap.

For SS/PBCH block and CORESET multiplexing pattern 1, a UE monitors PDCCH in the Type0-PDCCH CSS over two consecutive slots $\{n_0, n_0+1\}$. For SS/PBCH block with index i, the UE determines an index of the first slot $n_0$ as $n_0 = (O \cdot 2^\mu + \lfloor i \cdot M \rfloor) \bmod N_{slot}^{frame,\mu}$ located in a frame with system frame number (SFN) satisfying SFNmod2=0 if $\lfloor (O \cdot 2^\mu + \lfloor i \cdot M \rfloor)/N_{slot}^{frame,\mu} \rfloor = 0$ or in a frame with SFN satisfying SFNmod2=1 if $\lfloor (O \cdot 2^\mu + \lfloor i \cdot M \rfloor)/N_{slot}^{frame,\mu} \rfloor = 1$.

In one example, NR supports a DCI format having the same size as the DCI format 1_0 to be used for scheduling system information, for Paging, and for random access.

In one example, DCI format 0_1 and 1_1 are monitored only in USS.

In one example, DCI format 0_0 and 1_0 are monitored in CSS.

In one example, DCI format 0_0 and 1_0 are monitored in USS.

In one example, one of the following is configured by RRC signaling for the USS: Monitoring DCI format 0_1 and 1_1 only; and/or Monitoring DCI format 0_0 and 1_0 only.

A UE in RRC_IDLE and RRC_INACTIVE states can be configured for DRX operation in order to reduce power consumption. In RRC_IDLE, the UE monitors 5GC-initiated paging. In RRC_INACTIVE, the UE is reachable via RAN-initiated paging and 5GC-initiated paging. RAN and 5GC paging occasions overlap and same paging mechanism is used. The UE monitors one paging occasion per DRX cycle for reception of a paging message.

An association between a transmitted SS/PBCH block and a monitoring window for a PDCCH containing a DCI format scheduling a paging message in a PDSCH can be configured via system information. A default association is same as that between a SS/PBCH block index and a monitoring window for system information.

One paging occasion (PO) in LTE is a subframe where a UE may detect a DCI format with CRC scrambled by a P-RNTI. One paging frame (PF) is one radio frame that may contain one or multiple paging occasion(s). When DRX is used, the UE needs only to monitor one PO per DRX cycle.

With bandwidth adaptation (BA), a bandwidth used for receptions by or transmissions from a UE can be smaller than a serving cell bandwidth and can be adjusted according to the traffic characteristics among more than one bandwidth parts (BWPs). For example, a BWP with smaller size can be used during periods of low traffic activity to save UE power while a BWP with larger size can be used during periods of high traffic activity to increase data rates. For example, a first subcarrier spacing associated with a first traffic type can be used in a first BWP while a second subcarrier spacing associated with a second traffic type can be used in a second BWP.

Figure 10:
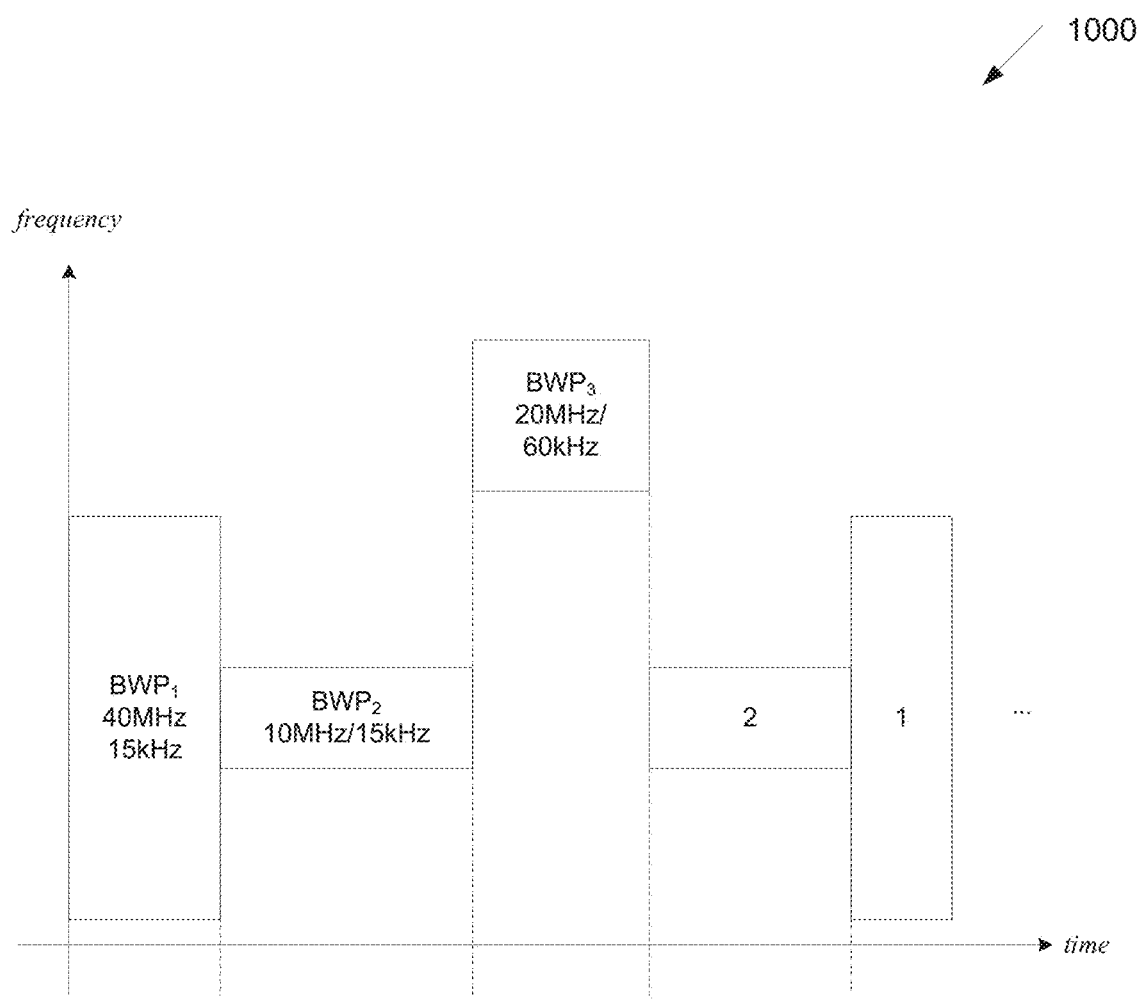
FIG. 10 illustrates an example BWP configuration according to embodiments of the present disclosure.

FIG. 10 illustrates an example BWP configuration 1000 according to embodiments of the present disclosure. The embodiment of the BWP configuration 1000 illustrated in FIG. 10 is for illustration only and could have the same or similar configuration. FIG. 10 does not limit the scope of this disclosure to any particular implementation.

FIG. 10 describes a scenario where 3 different BWPs are configured to a UE. $BWP_1$ has size of 40 MHz and subcarrier spacing of 15 kHz; $BWP_2$ has size of 10 MHz and subcarrier spacing of 15 kHz; and $BWP_3$ has size of 20 MHz and subcarrier spacing of 60 kHz.

For the primary cell (PCell), a UE can be indicated a default DL BWP among the configured DL BWPs. If a UE is not indicated a default DL BWP, the default BWP is the initial active DL BWP.

For paired spectrum operation, DL and UL BWPs are configured to a UE separately and independently for each serving cell. A DL DCI format is used for active DL BWP switching and an UL DCI format is used for active UL BWP switching. For unpaired spectrum operation, a DL BWP and an UL BWP are jointly configured as a pair with the restriction that, although they can have different sizes, the DL BWP and the UL BWP of a DL/UL BWP pair share a same center frequency. A DL DCI format or an UL DCI format can be used for active BWP switching from one DL/UL BWP pair to another DL/UL BWP pair.

If a BWP indicator field is configured to be included in DCI format 1_1, the BWP indicator field value indicates the active DL BWP, from a configured DL BWP set, for receptions by the UE. If a BWP indicator field is configured to be included in DCI format 0_1, the BWP indicator field value indicates the active UL BWP, from the configured UL BWP set, for transmissions from the UE.

A UE can be configured a timer value for BWP switching. The UE starts the timer each time the UE detects a DCI format 1_1 indicating an active DL BWP, other than the default DL BWP, for paired spectrum operation or each time the UE detects a DCI format 1_1 or a DCI format 0_1 indicating a respective active DL BWP or UL BWP, other than the default DL BWP or UL BWP, for unpaired spectrum operation. The UE increments the timer in the unit of a millisecond (ms) if the UE does not detect any DCI format 1_1 for paired spectrum operation or if the UE does not detect any DCI format 1_1 or DCI format 0_1 for unpaired spectrum operation during a respective time interval. The timer expires when the timer is equal to the timer value. The UE switches to a default DL BWP when the timer expires.

A MAC entity at a UE with a DRX functionality that controls PDCCH monitoring by the UE can be configured by RRC signaling. When the UE is in RRC_CONNECTED state and if DRX is configured to the UE, the MAC entity can configure the physical layer of the UE to monitor PDCCH discontinuously using the DRX operation; otherwise, the MAC entity can configure the physical layer of the UE to monitor PDCCH continuously.

In LTE it was found beneficial at least for idle mode paging to use a physical signal/channel that can be decoded or detected by a UE prior to decoding PDCCH/PDSCH by the UE. This signal is a sequence and is referred to as wake-up signal (WUS). A new re-synchronization signal for WUS or WUS with synchronization function is considered to reduce a time required by a UE to achieve synchronization with a serving base station. Before each DRX cycle, a UE attempts to detect a WUS. If there is no paging indication in the paging occasion, a serving base station may not transmit a WUS and then the UE does not detect a WUS and can stay in a power efficient mode without monitoring PDCCH for detecting a DCI format for paging. Since fewer information bits can be carried in the WUS compared to a DCI format for paging, the WUS requires lower detection complexity and blind decoding time while enabling reduced synchronization time and UE power savings.

Therefore, as for the LTE radio access, there is a need for a WUS design and for corresponding procedures for the NR radio access in both RRC idle, inactive and connected states, to enable associated UE power savings.

In one example for a UE in the RRC_IDLE or RRC_INACTIVE state, a WUS can be provided by one or more of a SIB; a PDCCH that includes a DCI format scheduling a SIB; a SS/PBCH block; a CSI-RS; a new sequence.

In one example for a UE in the RRC_CONNECTED state, a WUS can be provided by a CSI-RS or a PDCCH that includes a DCI format. The PDCCH DMRS or the DCI format or both can provide a WUS and the DCI format can provide configuration information for various parameters associated with the UE operation. A PDCCH providing a WUS can be in a same CORESET as a PDCCH for a UE-specific search space in a default DL BWP. A search space for PDCCH providing a WUS can be configured to a UE by higher layers. The DCI format conveyed by the PDCCH providing the WUS can include information such as transmission types for PDSCH/PUSCH or a BWP indicator for transmissions/receptions in the following DRX cycle. The information provided by the DCI format can be configured to a UE by higher layers A serving gNB (or eNB) can also configure a UE the WUS reception parameters.

Figure 11:
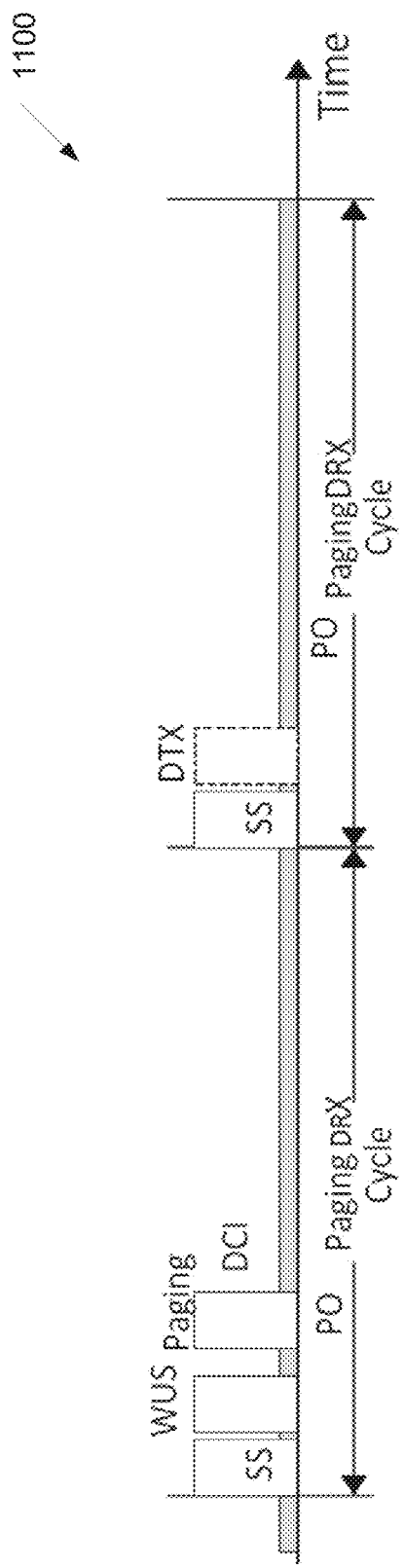
FIG. 11 illustrates an example WUS in NR idle and inactive modes according to embodiments of the present disclosure.

FIG. 11 illustrates am example WUS in NR idle and inactive modes 1100 according to embodiments of the present disclosure. The embodiment of the WUS in NR idle and inactive modes 1100 illustrated in FIG. 11 is for illustration only and could have the same or similar configuration. FIG. 11 does not limit the scope of this disclosure to any particular implementation.

FIG. 11 shows an exemplary WUS operation for the NR idle and inactive modes. Before WUS detection, a UE wakes up to perform re-synchronization. If the UE is to be paged in the next paging DRX cycle, a correct WUS detection may be positive. A positive WUS detection indicates to the UE to monitor PDCCH for a DCI format scheduling a PDSCH with a paging message in the next paging DRX cycle as shown in the first paging DRX cycle. Otherwise, if the UE is to not be paged in the next paging cycle, the correct WUS detection may be negative and the UE can go back to a sleep mode as shown in the second paging DRX cycle. In the first paging DRX cycle, the UE needs to perform WUS detection in addition to PDCCH monitoring for detecting a DCI format scheduling a PDSCH with a paging message. In the second DRX cycle, the UE can avoid monitoring PDCCH. If the paging rate is low and WUS detection requires much less UE power consumption than monitoring PDCCH, the overall effect would be lower UE power consumption compared to the case without a WUS.

In multi-beam NR operation, a gNB transmits SS/PBCH blocks, system information blocks (SIBs), and paging messages in a beam sweeping manner by changing quasi-collocation properties of transmitted signals. For a WUS, the gNB needs to apply beam sweeping over multiple slots in order to increase a probability that the UE detects the WUS. If the UE needs to be awake for the entire duration of the WUS transmission, UE power consumption increases and the benefits of WUS are diminished or even cancelled. It is therefore beneficial to maintain a timing between the WUS and a SS/PBCH index or a CSI-RS resource configuration index and first transmit WUS, SS/PBCH blocks, and CSI-RS (if the WUS is not a CSI-RS) from one beam before repeating their transmission from another beam.

For example, a configuration for a CORESET used for receiving a PDCCH that schedules a SIB supports a one-to-one association between a SS/PBCH block index and a DM-RS used for demodulating information (DCI formats) conveyed by the PDCCH. An association between a SS/PBCH block index and a monitoring window for PDCCH providing a DCI format scheduling a paging message in a PDSCH is same as an association between a SS/PBCH block index and a monitoring window for PDCCH providing a DCI format scheduling a SIB.

Therefore, there is support for one-to-one mapping between a SS/PBCH block index, a PDCCH monitoring window for scheduling a PDSCH providing SIB, and a PDCCH monitoring window for scheduling a PDSCH providing paging. In NR multi-beam operation, transmissions of SS/PBCH blocks, SIBs, and paging occasions from multiple beams can span multiple slots/symbols.

Based upon the above considerations, alternative designs for WUS include the following. In a first alternative, a WUS is provided by a SS/PBCH block, or by a PDCCH that includes a DCI format scheduling a SIB, or by a SIB. For example, one information bit by the WUS, such as ON/OFF WUS transmissions, can indicate whether or not an associated paging occasion(s) has a paging message. If yes, the UE wakes up at the paging occasion(s) to detect the DCI format scheduling the PDSCH with the paging message; otherwise, the UE can remain in DRX.

In a second alternative, a WUS is designed for multi-beam operation to indicate whether or not there is a paging message at associated paging occasion(s). The WUS monitoring window can be associated with an SS/PBCH block index, a SIB scheduling window, or a paging occasion.

For the first alternative, potential realizations for a WUS include the following.

In a first example, a WUS is provided by a SIB. For example, a SIB can be transmitted every 160 ms and a PDSCH transmission periodicity for the SIB can be 20 ms. The SIB can include one or more WUS information bits to indicate whether or not one or more paging messages exist in associated paging occasion(s). This impacts the soft buffer combining at a UE for the SIB because there are different coded bits in different PDSCH transmissions for the SIB.

Additionally, a UE needs to receive PDSCH conveying a SIB in every DRX cycle in order to determine whether or not to decode PDCCH conveying a DCI format scheduling a paging message at a paging occasion. When the UE is in the RRC_IDLE or the RRC_INACTIVE state and is configured with a DRX cycle that is longer than the SIB modification period, the UE can verify that the stored system information remains valid by checking the information in the SIB. However, when the UE in the RRC_IDLE or the RRC_INACTIVE state is configured with a DRX cycle shorter than the SIB modification period, the UE needs to decode a PDSCH conveying the SIB in each DRX cycle that is smaller than the SIB modification period. When the UE needs to combine multiple SIB receptions over an SIB modification period in order to correctly decode the SIB, UE power consumption increases.

Figure 12:
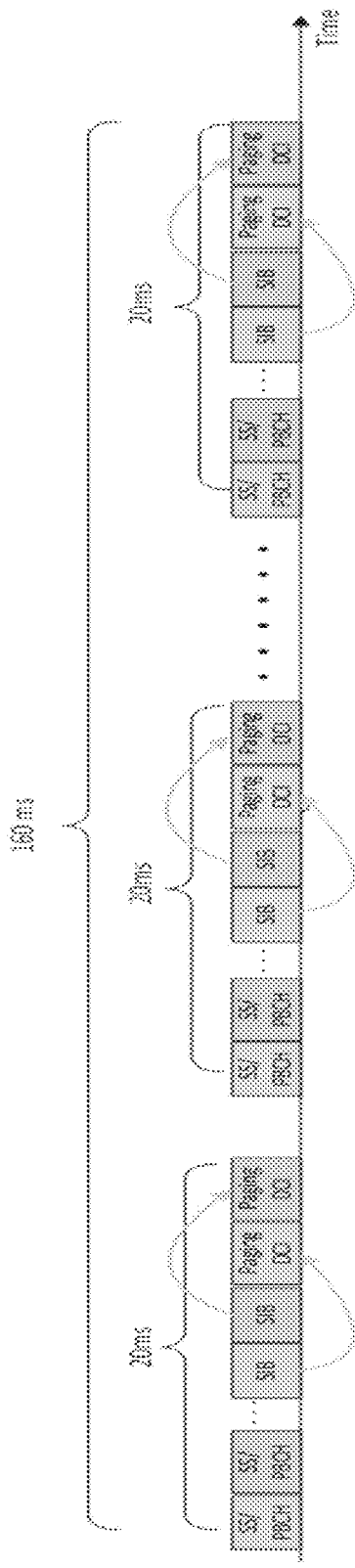
FIG. 12 illustrates an example scheduling of paging messaging in TDM according to embodiments of the present disclosure.

FIG. 12 illustrates an example scheduling of paging messaging in TDM 1200 according to embodiments of the present disclosure. The embodiment of the scheduling of paging messaging in TDM 1200 illustrated in FIG. 12 is for illustration only and could have the same or similar configuration. FIG. 12 does not limit the scope of this disclosure to any particular implementation.

In FIG. 12, a SS/PBCH block, a PDSCH conveying an SIB, and a PDCCH providing a DCI format scheduling a PDSCH with a paging message are time division multiplexed (TDM) and are assumed to have a one-to-one association. Each PDSCH conveying the SIB indicates one associated paging occasion per corresponding monitoring window of 20 ms. A same design can be extended to the case when a SS/PBCH block, a PDSCH conveying an SIB, and a PDCCH scheduling a paging message are frequency division multiplexed (FDM). Also, the same design can be extended to the case without a one-to-one association between the SS/PBCH block, the PDSCH conveying the SIB, and the PDCCH scheduling the paging message. For example, a one-to-many association between a PDSCH conveying the SIB and PDCCHs scheduling PDSCHs with paging messages can exist.

In a second example, a SIB modification period is 160 ms and a SIB is transmitted every 160 ms. Each WUS in a PDSCH conveying the SIB indicates all paging occasions associated with all the SIBs in each modification period. Since more UEs are indicated by each WUS, a false alarm probability that a UE is indicated transmission of a paging message when there is no paging message for the UE increases. Also, the UE needs to receive the SIB in every DRX cycle to decide if the UE needs to decode PDCCH scheduling a paging message at the paging occasion.

Figure 13:
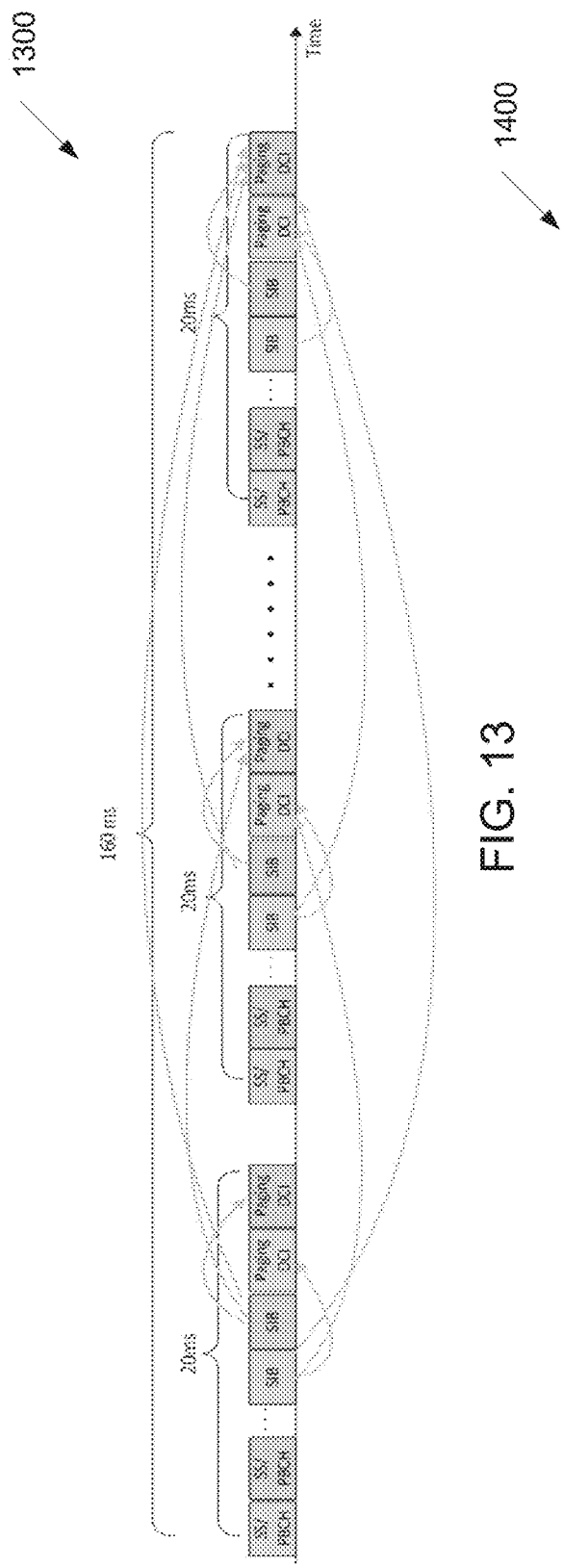
FIG. 13 illustrates another example scheduling of paging messaging in TDM according to embodiments of the present disclosure.

FIG. 13 illustrates another example scheduling of paging messaging in TDM 1300 according to embodiments of the present disclosure. The embodiment of the scheduling of paging messaging in TDM 1300 illustrated in FIG. 13 is for illustration only and could have the same or similar configuration. FIG. 13 does not limit the scope of this disclosure to any particular implementation.

In FIG. 13, a SS/PBCH block, a PDSCH conveying a SIB, and a PDCCH scheduling a PDSCH with a paging message are TDM and have a one-to-one association. Each PDSCH conveying a SIB indicates all associated paging occasions in the 160 ms SIB modification period. The same design can be extended to the case when the SS/PBCH block, the PDSCH scheduling the SIB, and the PDCCH scheduling the paging message are FDM. The same design can also be extended to the case without a one-to-one association between a SS/PBCH block, a PDSCH conveying a SIB, and a PDCCH conveying a DCI format scheduling a paging message. For example, a one-to-many association between a PDSCH conveying a SIB and PDCCHs scheduling paging messages can exist.

In a second realization, a WUS is provided by a PDCCH that includes a DCI format scheduling a SIB. In a first example, a SIB modification period is 160 ms and a SIB transmission periodicity is 20 ms. WUS information bit(s) in the DCI format scheduling a PDSCH for a SIB reception in every monitoring period, such as 20 ms, indicate scheduling of one or more paging messages in the associated paging occasion(s). Because the resource allocation fields in the DCI format scheduling the PDSCH for the SIB reception are not necessarily same for different SIB reception instances in a same SIB modification period, the UE can detect the DCI format scheduling the SIB without soft combining. Either some unused fields in the DCI format scheduling the PDSCH for the SIB reception or a new field in the DCI format can be used to provide the WUS information bits. An unused field can correspond to a new data indicator, or a HARQ process number, or a downlink assignment index, or a TPC command for PUCCH transmission, or a PUCCH resource indicator, or a PDSCH-to-HARQ_feedback timing indicator, or to one or more reserved bits. Since a detection probability for the DCI format scheduling the PDSCH for the SIB reception is typically larger than the one for the SIB reception, one or a few DCI format receptions are sufficient for the UE to correctly decode (detect) the DCI format and the UE does not need to receive the SIB every time when the UE obtains the WUS information bits.

Figure 14:
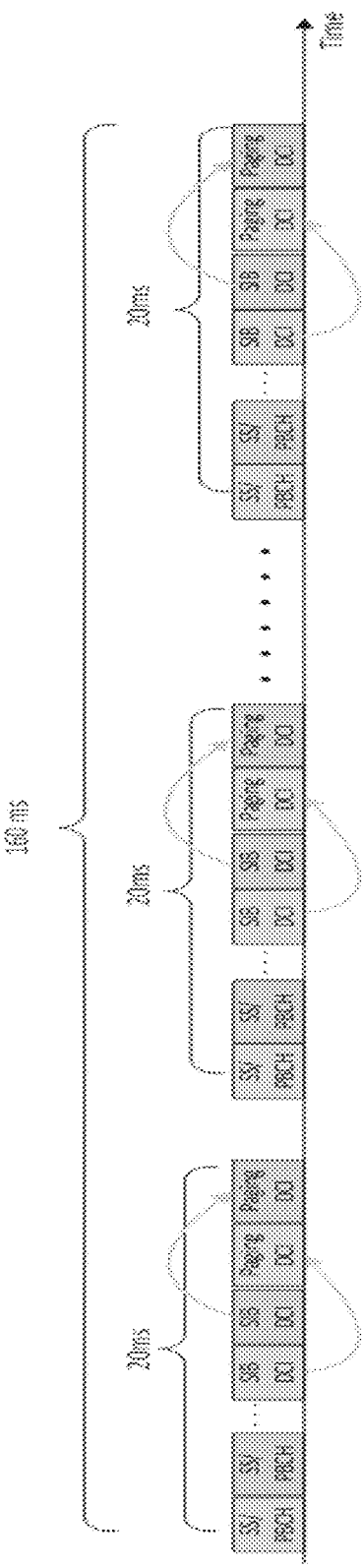
FIG. 14 illustrates yet another example scheduling of paging messaging in TDM according to embodiments of the present disclosure.

FIG. 14 illustrates yet another example scheduling of paging messaging in TDM 1400 according to embodiments of the present disclosure. The embodiment of the scheduling of paging messaging in TDM 1400 illustrated in FIG. 14 is for illustration only and could have the same or similar configuration. FIG. 14 does not limit the scope of this disclosure to any particular implementation.

In FIG. 14, a SS/PBCH block, a DCI format scheduling a PDSCH for a SIB reception, and a DCI format scheduling a paging message are TDM and have a one-to-one association. Each DCI format scheduling a PDSCH for a SIB reception indicates one associated paging occasion in a corresponding monitoring windows of 20 ms. The same design can be extended to the case when a SS/PBCH block, a DCI format scheduling a PDSCH for a SIB reception, or a DCI format scheduling a paging message are FDM. The same design can also be extended to the case without a one-to-one association. For example, a one-to-many association can exist between a DCI format scheduling a SIB reception and a DCI format scheduling a paging message.

In a second example, for a SIB modification period of 160 ms, each WUS in a DCI format scheduling a PDSCH for a SIB reception indicates all paging occasions associated with all DCI formats scheduling PDSCH for SIB receptions in each SIB modification period. Since more UEs are indicated whether or not a paging message is transmitted by each WUS, a probability that a UE is indicated a paging message reception without the paging message actually addressing the UE increases.

Figure 15:
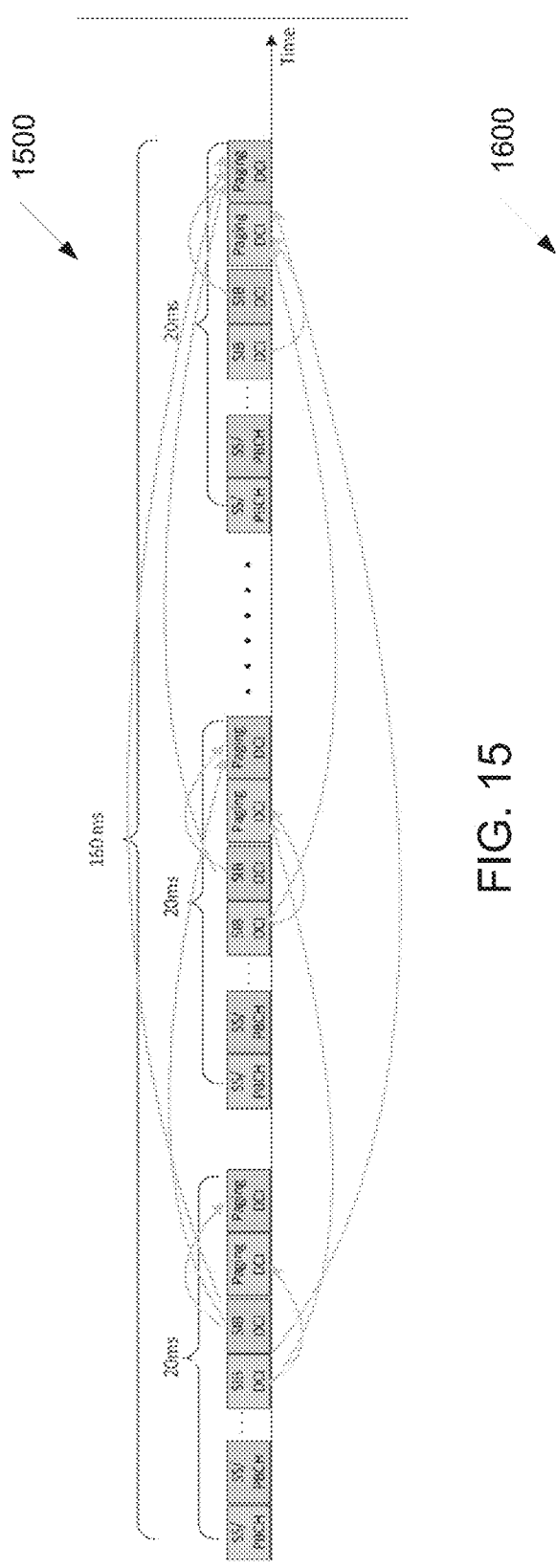
FIG. 15 illustrates yet another example scheduling of paging messaging in TDM according to embodiments of the present disclosure.

FIG. 15 illustrates yet another example scheduling of paging messaging in TDM 1500 according to embodiments of the present disclosure. The embodiment of the scheduling of paging messaging in TDM 1500 illustrated in FIG. 15 is for illustration only and could have the same or similar configuration. FIG. 15 does not limit the scope of this disclosure to any particular implementation.

In FIG. 15, a SS/PBCH block, a DCI format scheduling a PDSCH for a SIB reception, and a DCI format scheduling reception of a paging message are TDM and have a one-to-one association. Each SIB indicates all associated paging occasions in the 160 ms SIB modification period. The same can be extended to the case when a SS/PBCH block, a PDCCH conveying a DCI format scheduling a PDSCH for a SIB reception, and a PDCCH conveying a DCI format scheduling a paging message are FDM. The same can also be extended to the case without a one-to-one association. For example, a one-to-many association between a PDCCH conveying a DCI format scheduling a PDSCH for a SIB reception and a PDCCH conveying a DCI format scheduling a paging message can exist.

In a third realization, a WUS is provided by PBCH.

Figure 16:
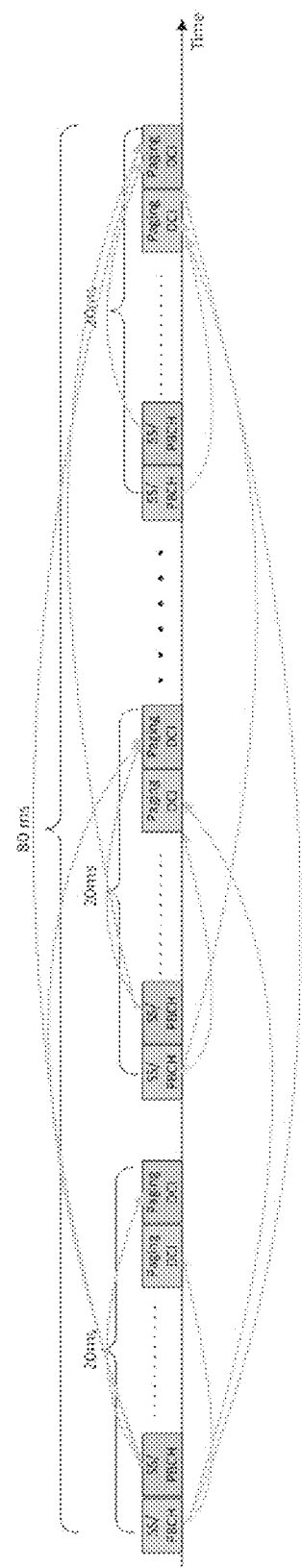
FIG. 16 illustrates yet another example scheduling of paging messaging in TDM according to embodiments of the present disclosure.

In a first example, a PBCH modification period is 80 ms and the PBCH transmission periodicity is at least 20 ms. The master information block (MIB) in the PBCH includes one or more WUS information bits in every SS/PBCH block transmission period to indicate one or more paging messages in the associated paging occasion(s). This impacts the soft buffer combining of PBCH for the UE during each PBCH modification period because different coded bits are received in different reception periods. Also, the UE needs to receive PBCH to obtain the MIB in every DRX cycle in order to determine if the UE needs to decode PDCCH conveying a DCI format scheduling a PDSCH with a paging message at the paging occasion. Additionally, when the UE needs to receive PBCH multiple times in order to correctly decode a respective MIB, UE power consumption increases. When the PBCH provides the WUS, a UE can go to sleep after the UE determines, based on the WUS, that there is no paging message in the associated paging occasion FIG. 16 illustrates yet another example scheduling of paging messaging in TDM 1600 according to embodiments of the present disclosure. The embodiment of the scheduling of paging messaging in TDM 1600 illustrated in FIG. 16 is for illustration only and could have the same or similar configuration. FIG. 16 does not limit the scope of this disclosure to any particular implementation.

In FIG. 16, a SS/PBCH block and a PDCCH conveying a DCI format scheduling a PDSCH for a reception of a paging message are TDM and have a one-to-one association. Each PBCH indicates one associated paging occasion in the corresponding monitoring window of 20 ms. The same design can be extended to the case when a SS/PBCH block and a PDCCH conveying a DCI format scheduling a reception of a paging message are FDM. The same design can also be extended to the case without one-to-one association. For example, a one-to-many association can exist between an SS/PBCH block and a PDCCH conveying a DCI format scheduling a PDSCH for a reception of a paging message.

In a second example, each WUS in a MIB of a PBCH indicates all paging occasions associated with all PBCH transmissions in each MIB modification period. Since more UEs are indicated by each WUS, a probability that a UE is indicated a paging message reception without the paging message actually addressing the UE increases. Also, the UE needs to receive PBCH in order to obtain a corresponding MIB in every DRX cycle in order to determine if the UE needs to decode PDCCH conveying a DCI format scheduling a PDSCH with a paging message at the paging occasion.

Figure 17:
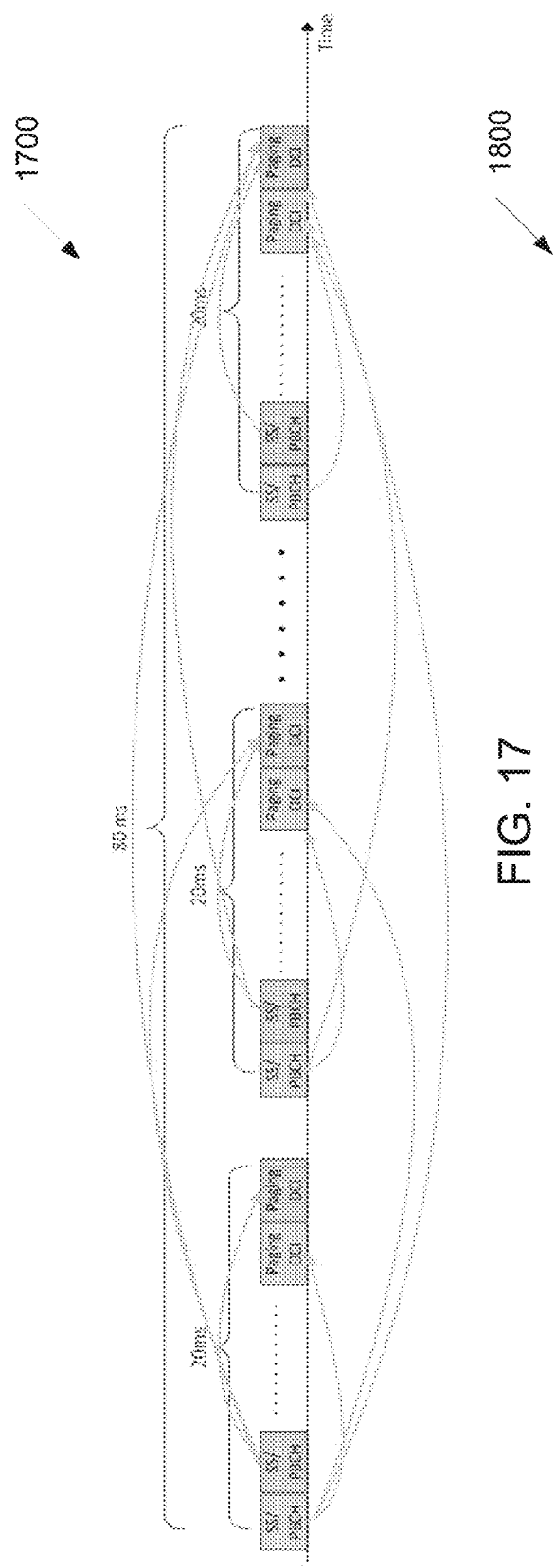
FIG. 17 illustrates yet another example scheduling of paging messaging in TDM according to embodiments of the present disclosure.

FIG. 17 illustrates yet another example scheduling of paging messaging in TDM 1700 according to embodiments of the present disclosure. The embodiment of the scheduling of paging messaging in TDM 1700 illustrated in FIG. 17 is for illustration only and could have the same or similar configuration. FIG. 17 does not limit the scope of this disclosure to any particular implementation.

A SS/PBCH block and a PDCCH conveying a DCI format scheduling a PDSCH with a paging message are TDM and have a one-to-one association. A MIB in each PBCH indicates all associated paging occasions in the 80 ms MIB modification period. The same design can be extended to the case when a SS/PBCH block and a PDCCH conveying a DCI scheduling a paging message are FDM. The same design can also be extended to the case without a one-to-one association. For example, a one-to-many association between a SS/PBCH block and a PDCCH conveying a DCI scheduling a PDSCH with a paging message can exist.

If the WUS is provided by a SIB, or by a PDCCH that includes a DCI format scheduling a PDSCH for a SIB reception, or by a MIB in a SS/PBCH block, the time and frequency positions of the WUS are same as for the corresponding channel conveying the information providing the WUS. This can simplify the design for operation with WUS and does not require introduction of a separate WUS design.

If a PDCCH conveying a DCI format scheduling a PDSCH with a paging message has a one-to-one association with a PDSCH providing an SIB, a PDCCH conveying a DCI format scheduling a PDSCH for a SIB reception, or a SS/BPCH block, one WUS for one paging occasion can be configured. If a PDCCH conveying a DCI format scheduling a PDSCH with a paging message has a many-to-one association with a PDCCH conveying a DCI format scheduling a SIB reception, or a SS/PBCH block, one WUS for multiple paging occasions can be configured. When a SS/PBCH block transmission periodicity or a SIB monitoring window is 20 ms, the paging occasion can only exist every second radio frame if one WUS indicates only one paging occasion. If one paging occasion exists in each radio frame, one WUS every 20 ms can be used to indicate two possible paging occasions. If more than one paging occasion exists for each radio frame, one WUS every 20 ms can be used to indicate at least four paging occasions.

If a SIB, or a DCI format scheduling a PDSCH for a SIB reception is used for WUS to indicate all PDCCH transmissions conveying respective DCI formats scheduling receptions of respective PDSCHs with paging messages in one SIB modification period, one WUS every SIB modification period is used to indicate all the associated paging occasions in a SIB modification period.

If a MIB in a PBCH is used to provide a WUS indicating transmission for all PDCCH conveying a DCI format scheduling a PDSCH with paging message in one MIB modification period, one WUS in an MIB modification period is used to indicate all the associated paging occasions.

The UE can determine which WUS in a SIB, or a DCI format scheduling a PDSCH for a SIB reception, or a MIB in a SS/PBCH block is used to indicate the corresponding paging occasion for respective paging occasion configurations. All paging occasions associated with a SS/PBCH block periodicity or a SIB monitoring window are indicated by the WUS in the corresponding SS/PBCH block periodicity or SIB monitoring window.

Since one WUS is configured to associate with one or more paging occasions, one WUS can apply to a group of UEs associated with the paging occasion(s) in a SS/PBCH block periodicity, SIB monitoring window, or MIB modification period.

Figure 18:
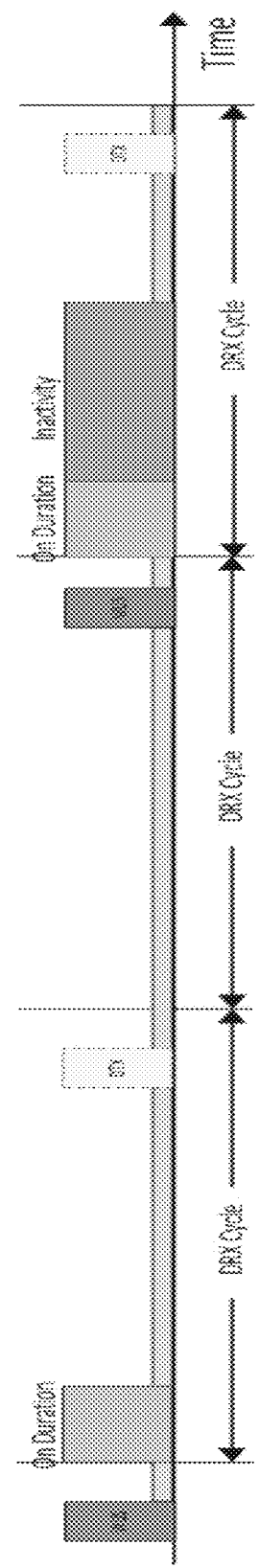
FIG. 18 illustrates an example WUS in a connected mode according to embodiments of the present disclosure.

FIG. 18 illustrates an example WUS in a connected mode 1800 according to embodiments of the present disclosure. The embodiment of the WUS in a connected mode 1800 illustrated in FIG. 18 is for illustration only and could have the same or similar configuration. FIG. 18 does not limit the scope of this disclosure to any particular implementation.

Before each DRX cycle, a UE wakes up to detect a WUS. If there is data transmission to or from the UE in a next DRX cycle, the gNB transmits a WUS for the UE. If the UE detects the WUS, the UE decodes PDCCH in the on duration period of the next DRX cycle as shown by the first DRX cycle in FIG. 18. Otherwise, the UE goes back to sleep mode as shown in the second DRX cycle in FIG. 18.

In the first paging DRX cycle in FIG. 18, the UE needs to detect a WUS in addition to normal processing, such as PDCCH decoding in the on duration period. In the second DRX cycle in FIG. 18, the UE can avoid PDCCH decoding in the on duration period. In the third DRX cycle in FIG. 18, the UE needs to detect a WUS in addition to normal processing in the on duration and inactivity timer period. As data transmission to or from the UE can be bursty and the WUS detection requires smaller UE power consumption than monitoring PDCCH in the on duration and inactivity timer period, WUS enables smaller UE power consumption than when WUS is not supported by a network.

In order to avoid a new design and UE receiver hardware for a WUS in connected mode, the WUS can be a CSI-RS or a PDCCH providing a DCI format. For a WUS using a PDCCH, transmission for connected mode UEs can be in a same CORESET as in a CORESET for a UE-specific search space set in the default BWP. A WUS for a UE operating in connected mode can be UE-specific or UE-group common. The purpose of WUS transmitted in a default BWP is to reduce the UE reception bandwidth and therefore reduce UE power consumption. A UE can be configured to return to a default BWP when the UE goes into DRX. In some cases where the UE is operating in an active BWP other than the default BWP at the time of WUS transmission, the WUS can also be configured by the higher layers, or have a default behavior, to operate in an active BWP other than the default BWP. A WUS using a PDCCH can use a new DCI format with CRC scrambled by a C-RNTI, other than the DCI formats used for scheduling PUSCH transmissions from or PDSCH receptions by the UE. Alternatively, a WUS using a PDCCH can use a DCI format with CRC scrambled by a new RNTI that does not schedule a PUSCH transmission from or a PDSCH reception by the UE and can have a same size as another DCI format, such as for example a DCI format providing transmission power control commands. Alternatively, a WUS using a PDCCH can use a DCI format with CRC scrambled by a C-RNTI that schedules a PUSCH transmission from or a PDSCH reception by the UE (and is transmitted before the DRX cycle for the UE). The search space set for a PDCCH conveying a DCI format and providing a WUS can be configured to a UE by higher layers. The DCI format providing WUS information can have a smaller size than DCI formats used for scheduling PUSCH transmissions from or PDSCH receptions by the UE.

When a serving gNB does not expect to schedule PDSCH/PUSCH for a UE in a following DRX cycle, the gNB can keep the UE in DTX by not transmitting a WUS. When a serving gNB expects to schedule PDSCH/PUSCH for a UE in a following DRX cycle, the gNB can transmit a WUS to inform the UE to monitor PDCCH in the following DRX cycle. In both cases, the UE may monitor PDCCH in the WUS search space set.

A search space set for a PDCCH conveying a DCI format providing a WUS can be configured to a UE by higher layers. The configuration can include the following parameters: a number of CCE aggregation levels, number of candidates per CCE aggregation level, monitoring periodicity, monitoring offset, and monitoring pattern within a slot. A configuration of the monitoring periodicity can also be omitted and it can then have a same value as the periodicity of the DRX cycle.

In one example, a DCI format conveyed by a PDCCH providing WUS information does not include a resource allocation field when there is no corresponding scheduling of a PUSCH transmission or PDSCH reception. Information fields of WUS can include a BWP indicator field to indicate a BWP for the UE to switch to, when needed, before the next DRX cycle starts. Then, same slot scheduling at the start of next DRX cycle is possible for the UE.

Figure 19:
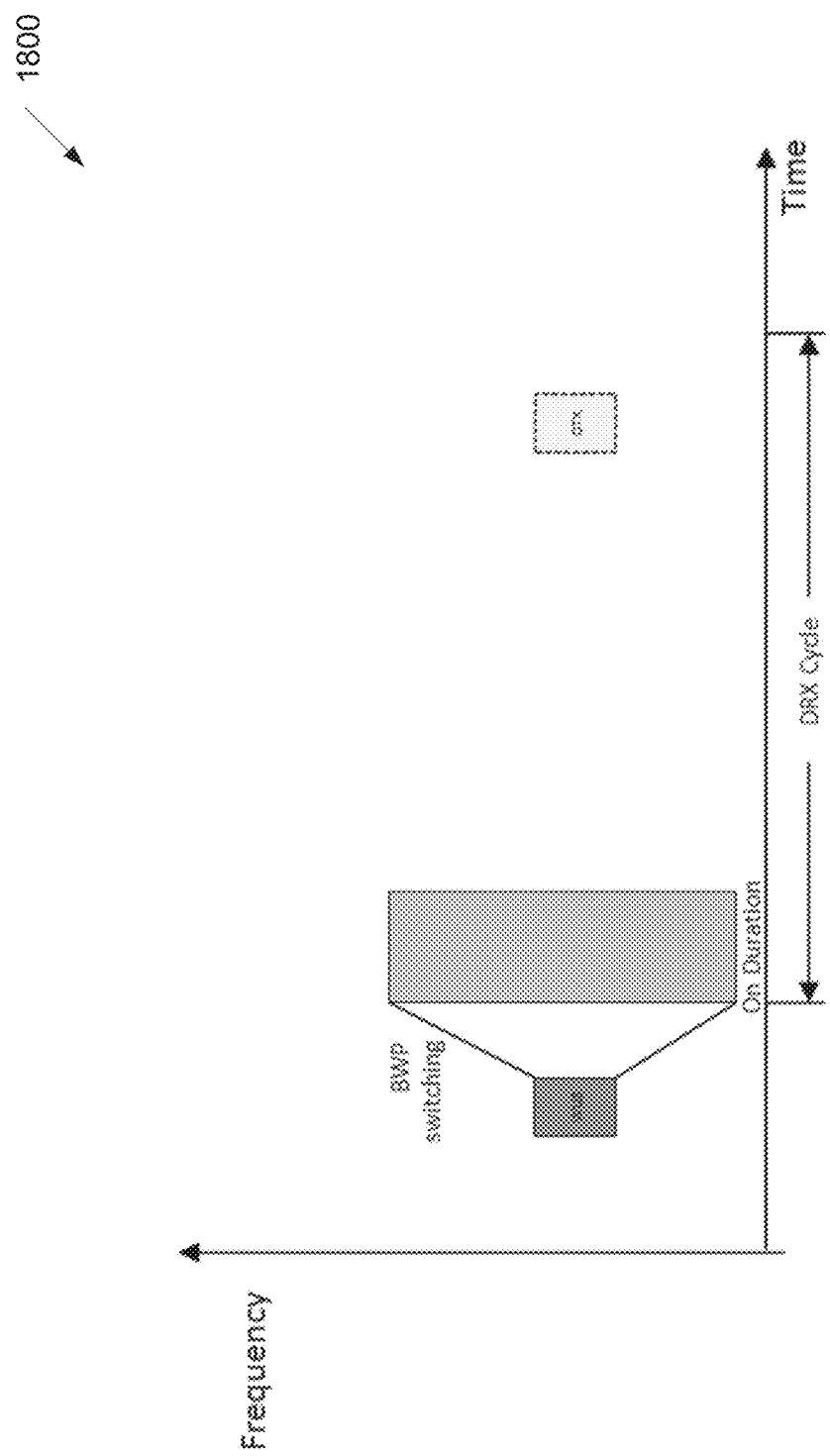
FIG. 19 illustrates an example WUS-triggered BWP switching according to embodiments of the present disclosure.

FIG. 19 illustrates an example WUS-triggered BWP switching 1900 according to embodiments of the present disclosure. The embodiment of the WUS-triggered BWP switching 1900 illustrated in FIG. 19 is for illustration only and could have the same or similar configuration. FIG. 19 does not limit the scope of this disclosure to any particular implementation.

FIG. 19 shows a WUS indicating to a UE to monitor PDCCH for PDSCH/PUSCH scheduling in the next DRX cycle and also indicates to the UE to switch a BWP from a default BWP to another active BWP.

A WUS can also provide to a UE a PDSCH/PUSCH transmission type indication. For example, the indication can be that there is only uplink/PUSCH or downlink/PDSCH transmission or both in the upcoming DRX cycle. Then, the UE can monitor PDCCH only for UL DCI formats, or only for DL DCI formats, or for both UL DCI formats and DL DCI formats, respectively. For example, the indication can be that transmissions have a first type, such as one associated with broadband data, or a second type such as one associated with low latency data. For example, when there are only uplink/PUSCH transmissions in a DRX cycle, the UE does not need to activate a DL part (for PDSCH processing) of the UE modem. For example, the indication can be for a PDSCH transmission scheme through an indication for a number of MIMO layers.

Figure 20:
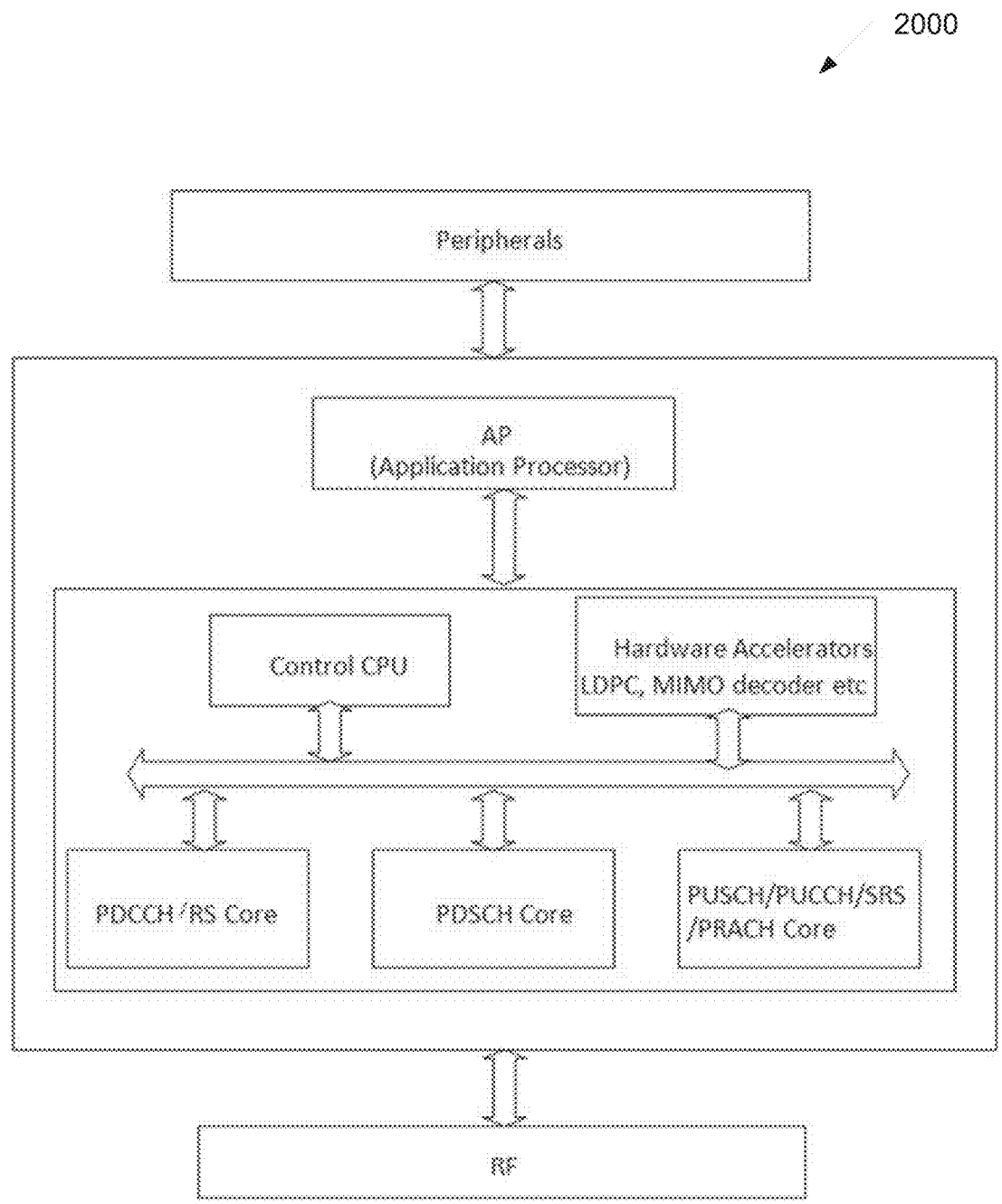
FIG. 20 illustrates an example modem of UE according to embodiments of the present disclosure.

FIG. 20 illustrates an example modem of UE 2000 according to embodiments of the present disclosure. The embodiment of the modem of UE 2000 illustrated in FIG. 20 is for illustration only and could have the same or similar configuration. FIG. 20 does not limit the scope of this disclosure to any particular implementation.

In FIG. 20, a UE modem includes data processors and control processors. Data processors include a PDCCH/RS core, a PDSCH core, a PUSCH/PUCCH/SRS/PRACH core, hardware accelerators, and other circuitry. If the UE receives an indication from the WUS that there is only uplink transmission in the following DRX cycle, the PDSCH core, and most of the hardware accelerators (LDPC decoder, MIMO decoder, and so on) can stay in sleep mode. Otherwise, the PDSCH core and most of the hardware accelerators need to wake up earlier at the start of each DRX cycle in case there is any downlink data scheduled in the first slot of the following DRX cycle.

A WUS can also provide dynamic indication of DRX parameters, including the length of onDurationTimer, the drx-InactivityTimer, and the DRX cycle duration. A WUS can also provide information related to PDCCH monitoring for PDSCH or PUSCH scheduling such as, for example, CCE aggregation levels and candidates per CCE aggregation level, to dynamically control a number of PDCCH decoding operations a UE needs to perform in the following DRX cycle.

A WUS can provide some or all of the above information as described in the following. In one example, a DCI format providing a WUS includes only one type of additional information. One flag field that includes one or more bits in the DCI format can be used to indicate the type of additional information that is contained in the DCI format. For example, a value 0 of a flag field can indicate transmission types, a value of 1 can indicate DRX parameters, a value of 2 can indicate a BWP, and a value of 3 can indicate other information.

In another example, the type of additional information in a DCI format providing a WUS can be configured to a UE by higher layers, for example according to the UE service requirements or network conditions. For example, higher layers can configure that the DCI format only carries BWP switching information. Higher layers can also configure that no additional information is provided by the DCI format. Then, a DCI format detection indicates corresponding PDSCH or PUSCH scheduling in the following DRX cycle. A CSI-RS can also be used as a WUS when the WUS provides only a few bits of information such as 1 bit for indicating whether or not the UE wakes up in the next DRX cycle.

In yet another example, more than one types of information are included in the DCI format. The types can be configured by higher layers. For example, higher layers can configure that the DCI format carries BWP switching information and transmission types in the following DRX cycle. For example, a WUS can be provided through a DCI format in a PDCCH the UE monitors for other purposes such as for obtaining slot structure information or for obtaining transmission power control commands. Then, the UE can be configured a location of binary elements in the DCI format corresponding to the WUS and a location corresponding to other information provided by the DCI format such as a slot structure or a transmission power control command.

In yet another example, all aforementioned information fields are included in each DCI format in a PDCCH providing a WUS.

The following can apply for a UE with BWP switching configuration at the time of WUS detection. Before the UE wakes up to monitor PDCCH for a WUS, the UE may retune to the default BWP.

Figure 21:
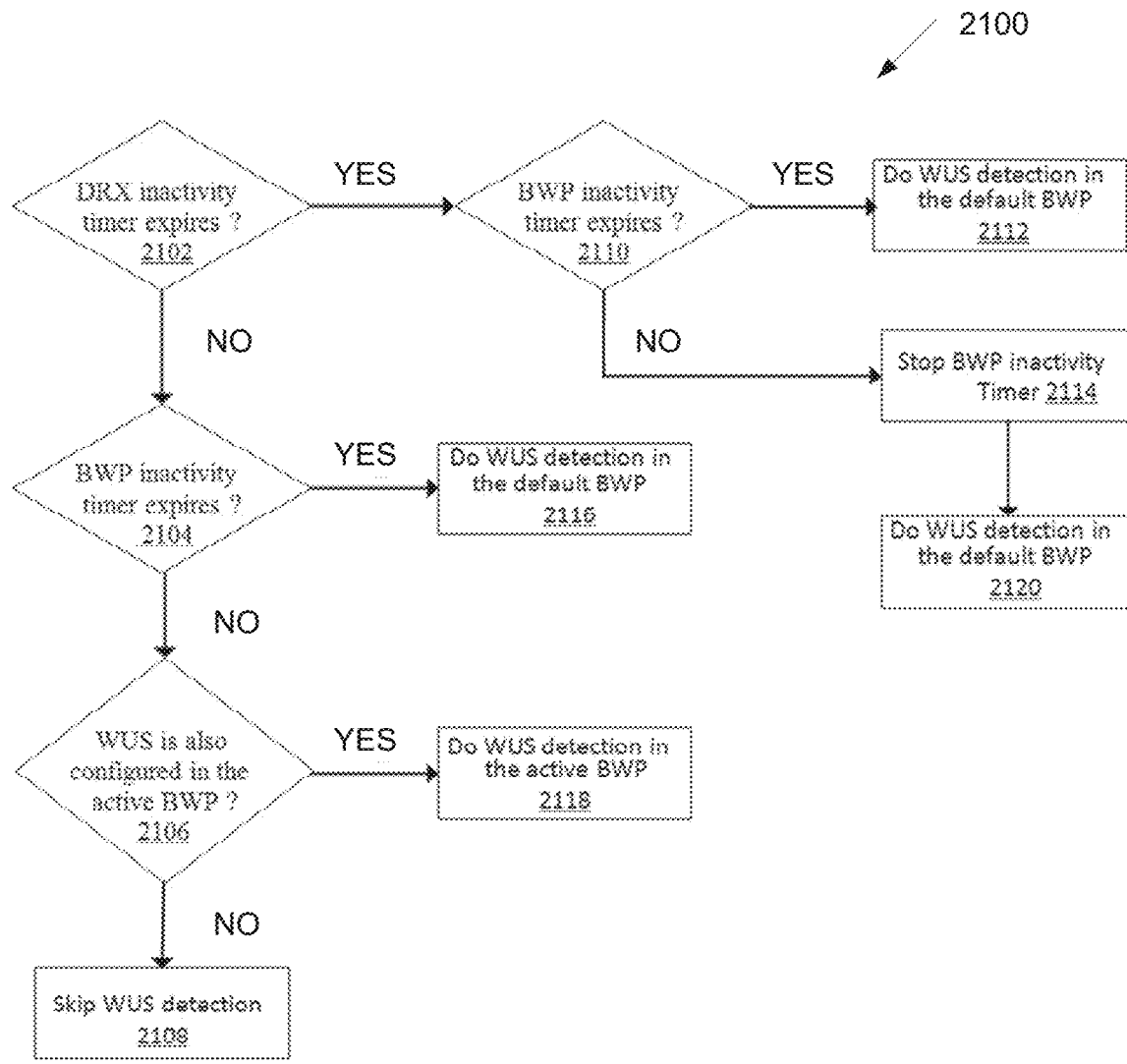
FIG. 21 illustrates a flow chart of a method for interactions among WUS, BWP inactivity timer, and DRX inactivity timer according to embodiments of the present disclosure.

FIG. 21 illustrates a flow chart of a method 2100 for interactions among WUS, BWP inactivity timer, and DRX inactivity timer according to embodiments of the present disclosure. The embodiment of the method 2100 illustrated in FIG. 21 is for illustration only and could have the same or similar configuration. FIG. 21 does not limit the scope of this disclosure to any particular implementation.

FIG. 21 shows the procedure of interactions among the WUS, BWP inactivity timer, and DRX inactivity timer.

When the DRXinactivity timer is running at the time prior to WUS detection:
1> if the BWP inactivity timer expires:
   2> the UE may attempt WUS detection in the default BWP.
1> Else:
   2> if WUS is also configured in the active BWP:
      3> the UE may attempt WUS detection in the active BW.
   2> else:
      3> the UE may not retune to perform WUS detection in case there are any data to be scheduled to the UE in the active BWP during the DRXinactivity timer period.

When the DRXinactivity timer expires at the time prior to WUS detection:
2> if the BWP inactivity timer expires:
   2> the UE may attempt WUS detection in the default BWP.
2> Else:
   2> the UE may retune to the default BWP and perform WUS detection in the default BWP.

The method begins at step 2102. In step 2102, if DRX inactivity timer expires for a UE, the UE performs step 2110. In step 2110, BWP inactivity timer expires, and in step 2112 the UE performs WUS detection in the default BWP. In step 2110, BWP inactivity timer does not expire, BWP inactivity timer stops in step 2114, and the UE performs WUS detection in the default BWP in step 2120. In step 2102, if DRX inactivity timer does not expire, and the UE moves to step 2104. In step 2104, if BWP inactivity timer expires, the UE performs WUS detection in the default BWP in step 2116. In step 2104, if BWP inactivity timer does not expire, the UE moves to step 2106. In step 2106, if the UE is configured to receive WUS in the active BWP, the UE performs WUS detection in the active BWP in step 2118. In step 2106, if the UE is not configured to detect a WUS, the UE skips WUS detection in step 2108.

Figure 22:
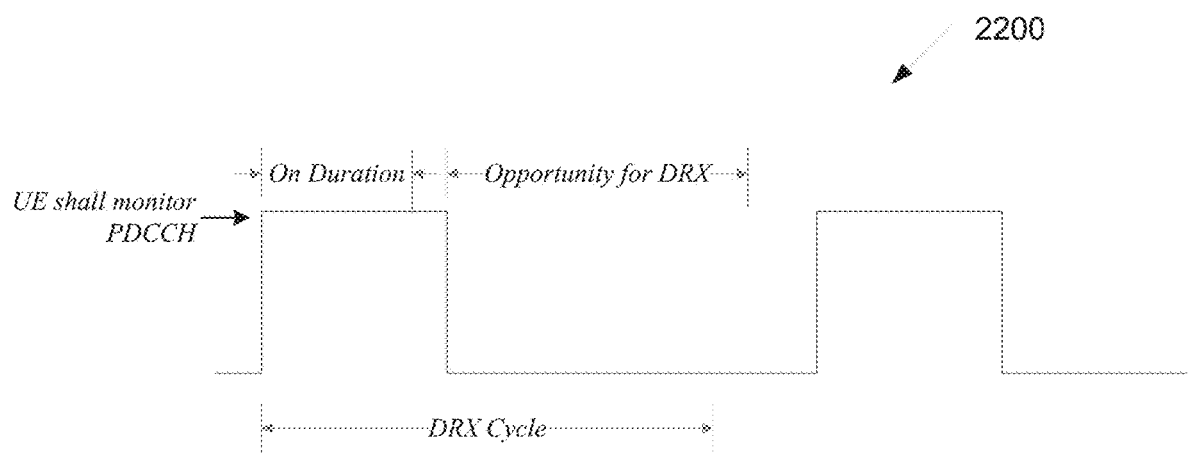
FIG. 22 illustrates an example DRX cycle according to embodiments of the present disclosure.

FIG. 22 illustrates an example DRX cycle 2200 according to embodiments of the present disclosure. The embodiment of the DRX cycle 2200 illustrated in FIG. 22 is for illustration only and could have the same or similar configuration. FIG. 22 does not limit the scope of this disclosure to any particular implementation.

When DRX is configured to a UE, the UE does not have to continuously monitor PDCCH. DRX is characterized by an on-duration that is the duration that the UE waits for, after waking up, to detect a DCI format before going back to sleep mode. If the UE detects a DCI format, the UE stays awake and starts the inactivity timer. The inactivity-timer determines a duration that the UE waits to detect a DCI format, after a last DCI format detection, and if the UE does not detect a DCI format before the inactivity timer expires, the UE can go back to sleep. The UE may restart the inactivity timer following a DCI format detection only for a first/initial transmission of a transport block (i.e., not for retransmissions of a transport block). A retransmission-timer determines a duration until a UE can expect a retransmission of a transport block. A cycle determines a periodic repetition of the on-duration followed by a possible period of inactivity.

When a UE is configured bandwidth adaptation, the UE monitors PDCCH only on an active DL BWP. A BWP inactivity timer (independent from the DRX inactivity-timer) is used to switch the active BWP to the default BWP. The UE restarts the BWP inactivity timer upon a successful PDCCH decoding. The UE switches to the default BWP when the BWP inactivity timer expires.

A UE can determine a HARQ-ACK codebook either dynamically or semi-statically depending upon RRC configuration parameter HARQ-ACK-codebook.

If a UE is configured with higher layer parameter HARQ-ACK-codebook=semi-static and, based on maximum and minimum slot timing values provided to a UE by higher layer parameter DL-data-DL-acknowledgement and on a number of possible slot timing values, the UE determines a number M of PDCCH monitoring occasion(s) for PDCCH with DCI format 1_0 or DCI format 1_1, for which the UE transmits a corresponding HARQ-ACK codebook in a same PUCCH or PUSCH. The determination for the number M of PDCCH monitoring occasion(s) is based on the PDCCH monitoring periodicity, the PDCCH monitoring offset, and the PDCCH monitoring pattern within a slot for each control resource set in the set of control resource sets configured to the UE. For a serving cell and for a HARQ-ACK codebook determination, PDCCH monitoring occasions are indexed in an ascending order in time.

If a UE is configured with higher layer parameter HARQ-ACK-codebook=dynamic, based on maximum and minimum PDSCH-to-HARQ_feedback timing values provided to a UE by union of the set of slot timing values {1, 2, 3, 4, 5, 6, 7, 8} for DCI format 1_0 and the set of slot timing values provided by higher layer parameter DL-data-DL-acknowledgement for DCI format 1_1, the UE determines monitoring occasions for PDCCH with DCI format 1_0 or DCI format 1_1 for scheduling on a serving cell c and for which the UE transmits HARQ-ACK in a same PUCCH based on respective PDSCH-to-HARQ_feedback timing values.

The PDCCH monitoring occasions for PDSCH scheduling on serving cell c are determined based on the PDCCH monitoring periodicity, the PDCCH monitoring offset, and the PDCCH monitoring pattern within a slot for each search space in the set of search spaces configured to the UE for PDCCH candidates corresponding to DCI format 1_0 or DCI format 1_1 for serving cell c. The set of PDCCH monitoring occasions is defined as the union of PDCCH monitoring occasions across configured cells, ordered in ascending order of start time of the search space associated with a PDCCH monitoring occasion.

The cardinality of the set of PDCCH monitoring occasions defines a total number M of PDCCH monitoring occasions. A value of the counter downlink assignment indicator (DAI) field in DCI format 1_0 or DCI format 1_1 denotes the accumulative number of {serving cell, PDCCH monitoring occasion}-pair(s) in which PDSCH reception(s) associated with DCI format 1_0 or DCI format 1_1 or DCI format 1_0 indicating downlink SPS release is present, up to the current serving cell and current PDCCH monitoring occasion, first in increasing order of serving cell index and then in increasing order of PDCCH monitoring occasion index m, where $0 \leq m < M$. The value of the total DAI, when present, in DCI format 1_1 denotes the total number of {serving cell, PDCCH monitoring occasion}-pair(s) in which PDSCH reception(s) associated with DCI format 1_0 or DCI format 1_1 or associated with DCI format 1_0 indicating downlink SPS release is present, up to the current PDCCH monitoring occasion m and may be updated from PDCCH monitoring occasion to PDCCH monitoring occasion.

Simultaneous transmission/reception on multiple active BWPs can be beneficial for a UE in several use cases. One example is simultaneous transmissions of eMBB and URLLC services in V2X, 5G-V2X use cases are defined, including safety-related V2X scenarios (e.g. automated driving) and non-safety-related V2X scenarios (mobile high data rate entertainment). Some UEs may need both automated driving and infotainment, i.e. simultaneous transmission of URLLC and eMBB.

In one example, a UE performs simultaneous multi-BWP listen-before-talk (LBT) in unlicensed spectrum where LBT is a procedure whereby radio transmitters first sense the medium and transmit only if the medium is sensed to be idle. If the medium is occupied, the UE performs random backoff resulting in larger latency and lower user throughput. To improve access probability and throughput, a UE can apply multi-BWP LBT. An operating bandwidth is split into multiple BWPs and LBT is carried out individually on each BWP, e.g. each BWP could be configured as 20 MHz in 5 GHz bands. With simultaneous multi-BWP LBT, it is possible to support transmission on any BWP in one wide carrier, hence achieve high channel access opportunity including fast initial access.

In one example of simultaneous transmission of Uu UL and sidelink in V2X, in LTE D2D and V2X, simultaneous transmission of sidelink transmission and uplink transmission at the same time is considered. For the case that uplink and sidelink share the same carrier frequency, simultaneous transmission is not allowed and one transmission may be dropped. For example, considering that V2V traffic is for road safety related information, especially some higher priority traffic, prioritizing V2V sidelink is supported. Generally, a vehicle equipment has higher capability and can support simultaneous transmission of multiple BWPs. To improve the performance in NR-V2X, FDM transmission of UL and sidelink is considered with multiple active BWPs for congestion level report by the UL and safety-related message by sidelink. A similar consideration applies to the case of having backhaul in a different BWP from a DL BWP.

Reconfiguration, addition and removal of serving cells can be performed by RRC signaling. If the MAC entity is configured with one or more SCells, a network can activate and deactivate the configured SCells. The network activates and deactivates the SCell(s) by sending the Activation/Deactivation MAC control element (CE). Furthermore, the MAC entity maintains a sCellDeactivationTimer timer per SCell and deactivates the associated SCell upon expiry. The same initial timer value applies to each instance of the sCellDeactivationTimer and the same initial timer value is configured by RRC.

If a SCell is deactivated, a UE neither transmits nor receives on the SCell. An exception is for CSI-RS reception if the SCell is in a dormant state as defined in LTE operation.

A CA activation/deactivation command is provided by a MAC CE command in a PDSCH. In LTE, if a UE receives a MAC-CE command in subframe n, the UE transmits HARQ-ACK information for a corresponding TB in subframe n+4. Upon receiving SCell activation command in subframe n, the UE may be capable to transmit a valid CSI report and apply actions related to the activation command for the SCell being activated no later than in subframe n+24 or n+34. The overall SCell activation latency is allowed to be up to 24/34 ms although in practice it can be substantially smaller.

Carrier aggregation (CA) has become a widely-used feature for increasing UE data rates. The current CA framework is not optimum from a delay perspective for SCell activation. A larger delay reduces the efficiency of radio resource and CA usage especially in small cell deployments. Managing a large number of small cells efficiently together with CA becomes challenging as a number of deployed small cells on different carriers increases. In dense small cell deployments, there is also substantial signaling overhead for configuration of each SCell. Therefore, the current CA framework adds additional latencies that limit the usage of CA and reduce the offloading gains from CA. For instance, in case of noticeable latencies in activating a SCell, it is possible that the data available for transmission is served by the PCell before the Scell is activated.

Fast SCell activation/deactivation is beneficial for reducing power consumption. In an example, a UE is configured and activated several SCells along with the PCell and the UE undergoes C-DRX. Initially, SCells may be activated with a first active BWP. When the amount of traffic becomes low, to avoid spending significant amount of time and energy monitoring PDCCH on all activated SCells and the PCell, SCells can be switched to a dormant state or a deactivated state. When the amount of traffic is large enough again, SCells can be switched out of dormant state or inactivated state and to an activated state. Traffic is transferred across all activated cells. Cycles of switching in and out of dormant/deactivated states for a SCell can happen within a DRX cycle and more closely track the instantaneous traffic load.

Therefore, there is a need to specify operations for multiple active BWPs including RRC (re)configuration, RRC based and dynamic BWP activation/deactivation/switching, and HARQ-ACK codebook determination.

There is another need to further improve UE power efficiency in scenarios of multiple active BWPs and CA, including WUS, DCI format activation signal and MAC CE activation signaling used as wake-up signal for inactive mode of DRX cycle of serving cells and activation signal for activating SCells.

The disclosure relates to operations for multiple active BWPs and enhanced power efficiency in scenarios of CA and multiple active BWPs. One example of operations for multiple active BWPs provides dedicated RRC (re)configuration, RRC-based BWP activation/deactivation/switching, dynamic BWP activation/deactivation/switching, and semi-static and dynamic HARQ-ACK codebook determination.

One example of enhanced power efficiency in scenarios of CA operation and multiple active BWPs includes WUS for both PCell and SCells, WUS for both multiple active BWPs for both/either PCell and/or SCells, WUS for PCell and activation signal for a SCell, PDCCH with DCI format scheduling PDSCH/PUSCH as activation signal for a SCell, and MAC CE command as activation signal for a SCell with multiple active BWPs.

There are two RRC (re)configurations related to multiple active BWPs. In one example, in addition to configurations per BWP, RRC only (re)configures a UE with a maximum number of active BWPs for simultaneous transmissions/receptions for the UE for each serving cell. A BWP is dynamically activated/deactivated/switched by a DCI format the UE detects in a currently active BWP. The ServingCellConfig information element (IE) is used to configure (add or modify) the UE with a serving cell, which may be a SpCell or a SCell of an MCG or SCG. In one instance, one information field is present in ServingCellConfig IE that indicates a maximum number of simultaneously active BWPs for each serving cell.

In another example, in addition to configurations per BWP, RRC configures simultaneous transmissions/receptions for a UE on more than one active BWPs. Addition or removal of one or more BWPs from currently active BWPs can be configured by RRC. RRC can also configure new active BWPs that may override all currently active BWPs. The time point when new BWP(s) become active can be conveyed in the RRC message.

When RRC configures all new active BWPs that may override all currently active BWPs, the information field firstActiveDownlinkBWP-Id and firstActiveUplinkBWP-Id in ServingCellConfig IE, when present, can indicate the multiple active downlink and uplink BWPs indexes, respectively, that are activated upon receiving the RRC reconfiguration for a SpCell or activation for a SCell.

When RRC configures addition or removal of one or more BWPs from the currently active BWPs, one new information field AddedActiveDownlinkBWP-Id/RemovedActiveDownlinkBWP-Id or AddedActiveUplinkBWP-Id/RemovedActiveUplinkBWP-Id in ServingCellConfig IE, when present, indicates the multiple active downlink and uplink BWPs indexes respectively that are added/removed upon receiving the RRC reconfiguration for a SpCell or activation for a SCell.

Figure 23:
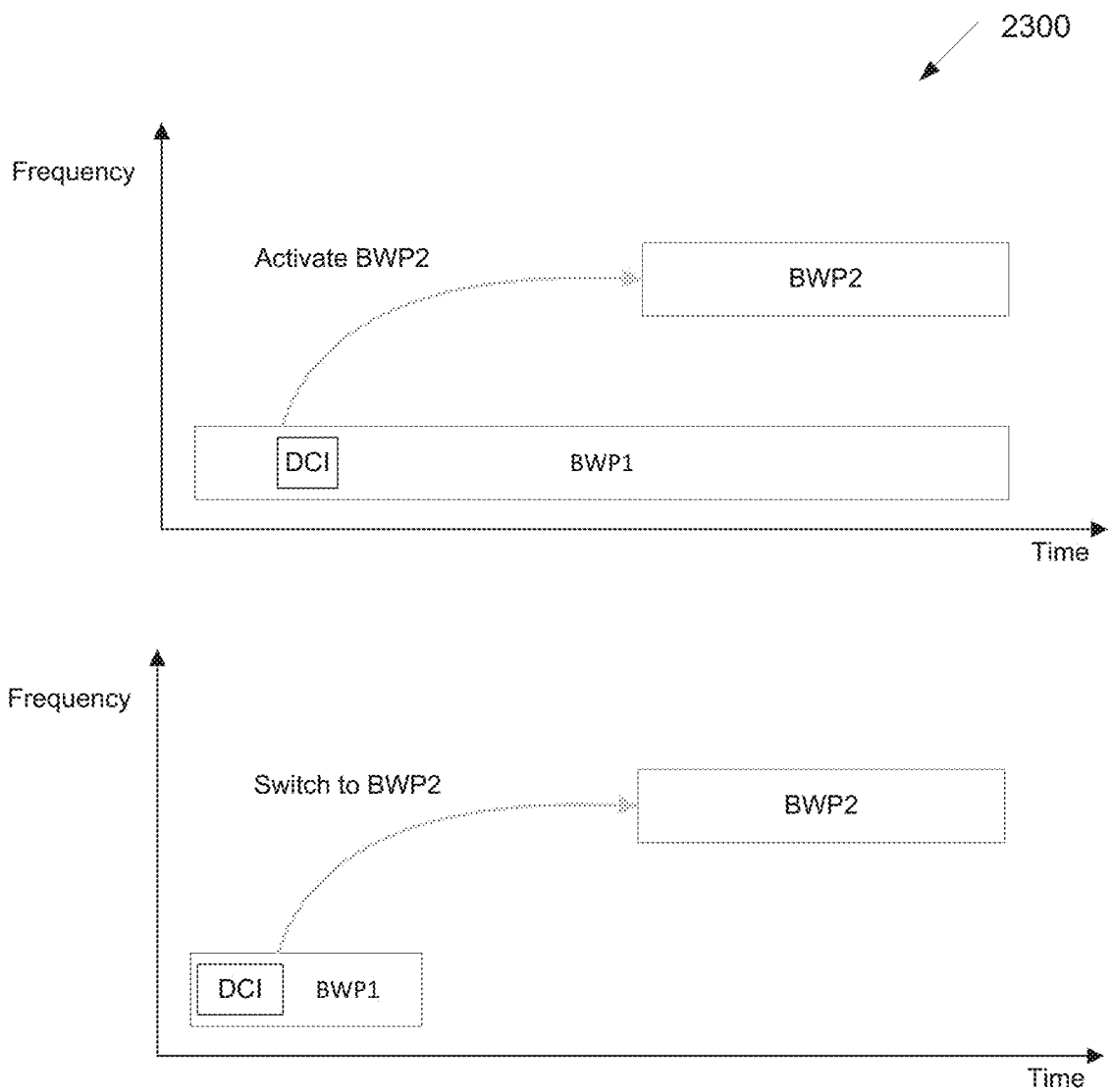
FIG. 23 illustrates an example dynamic switching according to embodiments of the present disclosure.

FIG. 23 illustrates an example dynamic switching 2300 according to embodiments of the present disclosure. The embodiment of the dynamic switching 2300 illustrated in FIG. 23 is for illustration only and could have the same or similar configuration. FIG. 23 does not limit the scope of this disclosure to any particular implementation.

When a new BWP is activated from a currently active BWP through a DCI format, one information field in the DCI format indicates the new active BWP while the currently active BWP either remains active (dynamic activation, see the top figure in FIG. 23) or becomes inactive (dynamic switching, see the bottom figure in FIG. 23).

In addition to the BWP indicator field in DCI format 1_1, another indication field in DCI format 1_1 can exist to indicate whether or not the currently active BWP is kept active or becomes inactive when a new BWP is activated by DCI format 1_1. Whether or not this indication field is present in DCI format 1_1 can be configured by RRC.

If this indication field is not present and a new BWP is activated by a DCI format, some rules need to be specified for the current active BWPs. In one example, when a number of currently simultaneously active BWPs is smaller than a configured maximum number of simultaneously active BWPs, BWP activation occurs (a currently active BWP remains active) occurs. Otherwise, BWP switching occurs (a currently active BWP becomes inactive).

A set of BWPs can be simultaneously activated/deactivated for a UE by a single DCI format. In FIG. 23 BWP2 to BWPn are activated by a DCI format on BWP1. In one example, a DCI format with indicating zero resource allocation (zero-RA) can be used to activate/deactivate a set of BWPs. Non-used fields in the zero-RA DCI format can be re-interpreted by specification. In another example, a new DCI format can be designed to activate/deactivate a set of BWPs. In both example, a BWP control bitmap can be used in the DCI format to indicate the BWPs that are activated. Each bit in the bitmap corresponds to a configured BWP and indicates whether the BWP is activated or deactivated. Alternatively, BWPs can be configured in groups and the DCI format can include a field activating a group of BWPs. The BWP indicator field can be modified to indicate a group of active BWPs instead of a single active BWP. Additional information can be included in the DCI format such as a CSI-RS configuration or PUCCH resources for each BWP for a UE to measure and report CSI.

A set of BWPs can be activated/deactivated for a group of UEs by a single UE-group common DCI format. An advantage is smaller DCI format signaling overhead when a same set of BWPs are activated for a group of UEs. The information fields present in the UE-group common DCI format can be similar to those in the UE-specific DCI format for activating/deactivating a set of BWPs as aforementioned.

Figure 24:
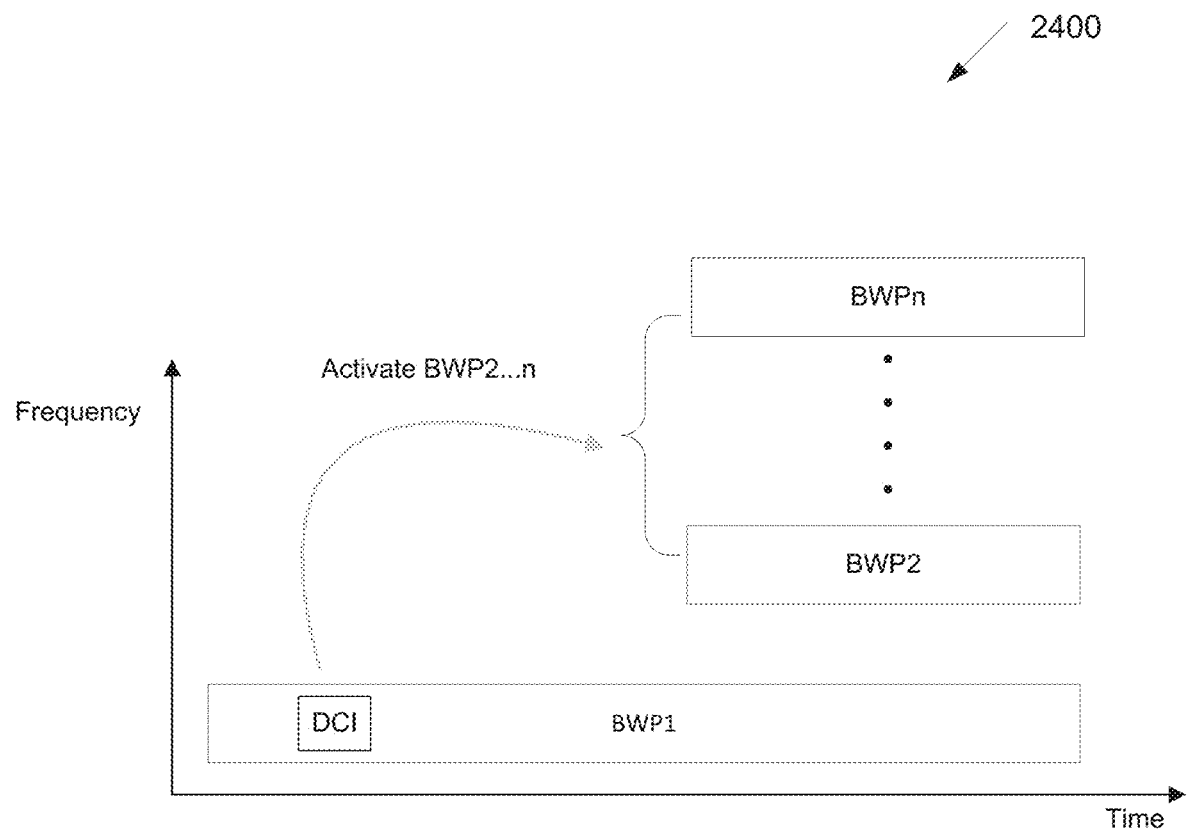
FIG. 24 illustrates another example dynamic switching according to embodiments of the present disclosure.

FIG. 24 illustrates another example dynamic switching 2400 according to embodiments of the present disclosure. The embodiment of the dynamic switching 2400 illustrated in FIG. 24 is for illustration only and could have the same or similar configuration. FIG. 24 does not limit the scope of this disclosure to any particular implementation.

If a field that indicates whether or not a currently active BWP remains active is not present in a DCI format that activates a set of BWPs, whether or not the currently active BWP remains active can be implicitly determined. In one example, when a number of currently active BWPs plus a number of BWPs that are activated by the DCI format is not larger than a configured maximum number of simultaneously active BWPs, the currently active BWPs are kept active. Otherwise, BWP switching occurs and some of currently active BWPs are changed to inactive, for example according to ascending or descending order of a BWP index, so that a total number of active BWPs is equal to the maximum number of active BWPs.

Each active BWP, other than the default BWP, can have its own BWP inactivity timer. When a UE detects DCI format that schedules a PDSCH on an active BWP, the BWP inactivity timer for the active BWP restarts. When the BWP inactivity timer of an active BWP expires, if there are other active BWPs, the default BWP is not activated when the default BWP is inactive. When the BWP inactivity timer of an active BWP expires, if there are no other active BWPs, the default BWP is activated.

Another alternative is to configure a common BWP inactivity timer for all active BWPs other than the default BWP for a UE. The common BWP inactivity timer restarts whenever the UE detects a DCI format scheduling a PDSCH on any active BWP other than the default BWP.

When the default BWP is active, for an active BWP switching to the default BWP, no transition time (BWP switching time) is required.

When simultaneously active BWPs are configured and activated by RRC, a DL association set for a HARQ-ACK codebook determination corresponds to all simultaneously active BWPs per serving cell.

When simultaneously active BWPs are activated by a DCI format, one example is the DL association set corresponds to the active BWPs per serving cell at the time when a UE transmits HARQ-ACK corresponding to PDSCH reception(s). One reason for this is for further reduction of HARQ-ACK codebook size. Another example is the DL association set for a HARQ-ACK codebook determination corresponds to all configured BWPs per serving cell. This can lead to increased HARQ-ACK codebook size.

In the following, in order to support multiple active BWPs, the update is according to the embodiment where the DL association set corresponds to the active BWPs per serving cell at the time when a UE transmits HARQ-ACK corresponding to PDSCH reception(s).

For a serving cell c and the active DL BWP and the active UL BWP, the UE determines a set of $M_{A,c}$ occasions for candidate PDSCH receptions for which the UE can transmit corresponding HARQ-ACK information in a PUCCH in slot n. Since for each active BWP, DCI format 1_0 or DCI format 1_1 detection to a PDSCH reception timing values by higher layer parameter DL-data-time-domain, and PDSCH reception to a HARQ-ACK transmission timing values by higher layer parameter DL-data-DL-acknowledgement are configured per BWP and can be different for each BWP. In order to support multiple simultaneously active BWPs, The UE may determine a $M_{A,c}$ per BWP in each serving cell.

TABLE 1 shows the pseudo-code for Type-1 HARQ-ACK codebook determination that supports multiple simultaneously active BWPs in one serving cell. For the set of slot timing values $K_1$ the UE determines $M_{A,c}$ occasions per active BWP in each serving cell for candidate PDSCH receptions or SPS PDSCH releases according to the following pseudo-code.

TABLE 1

Type-1 HARQ-ACK codebook determination

Set j = 0 - index of occasion for candidate PDSCH reception or SPS PDSCH release
Set B = Ø
Set $M_{A,c}$ = Ø
Set $K_{1,C}$ to the cardinality of set $K_1$
Set k = 0 - index of slot timing values in set $K_1$
while k < $K_{1,C}$
  Set R to the set of rows provided by pdsch-symbolAllocation
  Set $R_C$ to the cardinality of R,
  Set r = 0 - index of row provided by pdsch-symbolAllocation
  while r < $R_C$
    if the UE is provded higher layer parameter UL-DL-configuration-common, or
    higher layer parameter UL-DL-configuration-common-Set2, or higher layer
    parameter UL-DL-configuration-dedicated and at least one OFDM symbol of the
    PDSCH time resource derived by row r in slot n - $K_{1,K}$ is configured as UL or slot
    n - $K_{1,k}$ - $K_0$, does not include at least one configured PDCCH monitoring occasion TABLE 1-continued Type-1 HARQ-ACK codebook determination

```
    for PDCCH with DCI format 1_0 or DCI format 1_1, where K₁,ₖ is the k-th slot
    timing value in set K₁ and K₀ is derived by row r of pdsch-symbolAllocation,
R = R\r;
    end if
    r = r + 1;
  end while
  If the does not UE indicate capability to receive more than one unicast PDSCH per slot
and R ≠ Ø,
    M_{A,c} = M_{A,c} ∪ k;
else
  Set R_C to the cardinality of R
  Set m to the smalles last OFDM symbol index, as determined by the SLIV, among all
rows of R
    while R ≠ Ø
      Set r = 0
      while r < R_C
        if s ≤ m for start OFDM symbol index s for row r
          b_{r,k} = j; - index of occasion for candidate PDSCH reception of SPS PDSCH
release associated with row r
          R = R\r;
          B = B ∪ b_{r,k};
        end if
        r = r + 1;
      end while
      M_{A,c} = M_{A,c} ∪ j;
      j = j + 1;
      Set m to the smallest last OFDM symbol index among all rows of R;
    end while
  end if
k = k + 1;
end while
```

Correspondingly, the UE may determine HARQ-ACK information bits for each active BWP in each serving cell in order to support multiple simultaneously active BWPs. An innermost loop may be added for configured BWPs in each serving cell.

A UE may determine $\tilde{o}_0^{ACK}, \tilde{o}_1^{ACK}, \ldots, \tilde{o}_{o_{ACK}-1}^{ACK}$ HARQ-ACK information bits, for a total number of $o_{ACK}$ HARQ-ACK information bits, of a HARQ-ACK codebook for transmission in a PUCCH according to the following pseudo-code. TABLE 2 shows pseudo-codes. If the UE does not receive a transport block or a CBG, due to the UE not detecting a corresponding PDCCH with DCI format 1_0 or DCI format 1_1, the UE generates a NACK value for the transport block or the CBG. The cardinality of the set $M_{A,c}$ defines a total number $M_c$ of occasions for each active BWP in each serving cell for PDSCH reception or SPS PDSCH release for serving cell c.

TABLE 2

Pseudo code for H-ARQ operation

```
Set c = 0—serving cell index: lower indices correspond to lower RRC indices of
corresponding cell
Set j = 0—HARQ-ACK bit index
Set N_cells^DL to the number of serving cells configured by higher layers for the UE
while c < N_cells^DL
  Set N_BWPs^DL to the number of BWPs for cell c configured by higher layers for the UE
  while b < N_BWPs^DL—BWP index
  if BWP c is active at the time when HARQ-ACK is transmitted
  continue
  end if
  Set m = 0—index of occasion for candidate PDSCH reception for SPS PDSCH release
      while m < M_c
        if HARQ-ACK-spatial-bundling-PUCCH = FALSE, CBG-DL = OFF and the UE
        is configured by higher layer parameter Number-MCS-HARQ-DL-DCI with
        reception of two transport blocks for the active DL BWP of serving cell c,
          õ_j^ACK = HARQ-ACK bit corresponding to a first transport block of this cell;
          j = j + 1;
          õ_j^ACK = HARQ-ACK bit corresponding to a second transport block of this
        cell;
          j = j + 1;
        else if HARQ-ACK-spatial-bundling-PUCCH = TRUE, and the US is configured
        by higher layer parameter Number-MCS-HARQ-DL-DCI with reception of two
        transport blocks for the active DL BWP of serving cell c,
          õ_j^ACK = binary AND operation of the HARQ-ACK bits corresponding to first and
          second transport blocks of this cell—if the UE receives one transport block, the
          UE assumes ACK for the second transport block;
          j = j + 1;
```

TABLE 2-continued

Pseudo code for H-ARQ operation

```
    else if CBG-DL = ON, and N_{HARQ-ACK,c}^{CBG/TBmax} CBGs indicated by higher layer
parameter
        CBGs-per-TB-DL for serving cell c,
            Set n_{CBG} = 0—CBG index
            while n_{CBG} < N_{HARQ-ACK,c}^{CBG/TBmax}
                õ_{j+n_{CBG}}^{ACK} = HARQ-ACK bit corresponding to CBG n_{CBG} of the first transport
                block;
                if the UE is configured by higher layer parameter Number-MCS-HARQ-DL-
                DCI with reception of two transport blocks for the active DL BWP of serving
                cell c
                    õ_{j+n_{CBG}+N_{HARQ-ACK,c}^{CBG/TB,max}}^{ACK} = HARQ-ACK bit corresponding to CBG n_{CBG} of the second
                    transport block;
                end if
                n_{CBG} = n_{CBG} + 1;
            end while
            j = j + N_{TB,c}^{DL} · N_{HARQ-ACK,c}^{CBG/TBmax}, where N_{TB,c}^{DL} is the value of higher layer
parameter
            Number-MCS-HARQ-DL-DCI for the active DL BWP of serving cell c;
        else
            õ_j^{ACK} = HARQ-ACK bit of this cell
            j = j + 1;
        end if
        m = m + 1;
    end while
    b = b + 1;
    end while
    c = c + 1;
end while
```

A DAI field in DCI format 1_0 or DCI format 1_1 in each active BWP is used to determine the size/payload of UCI. The set of PDCCH monitoring occasions is defined as the union of PDCCH monitoring occasions across all configured BWPs in all configured cells, ordered in ascending order of start time of the search space associated with a PDCCH monitoring occasion. The cardinality of the set of PDCCH monitoring occasions defines a total number M of PDCCH monitoring occasions.

A value of the counter DAI field in DCI format 1_0 or DCI format 1_1 denotes the accumulative number of {BWP per serving cell, PDCCH monitoring occasion}-pair(s) in which PDSCH reception(s) associated with DCI format 1_0 or DCI format 1_1 or DCI format 1_0 indicating downlink SPS release is present, up to the current BWP in the current serving cell and current PDCCH monitoring occasion, first in increasing order of BWP index, then increasing order of serving cell index and then in increasing order of PDCCH monitoring occasion index m, where $0 \leq m < MM$.

The value of the total DAI, when present, in DCI format 1_1 denotes the total number of {BWP per serving cell, PDCCH monitoring occasion}-pair(s) in which PDSCH reception(s) associated with DCI format 1_0 or DCI format 1_1 or associated with DCI format 1_0 indicating downlink SPS release is present, up to the current PDCCH monitoring occasion wand may be updated from PDCCH monitoring occasion to PDCCH monitoring occasion.

TABLE 3 shows the pseudo-code for Type-2 HARQ-ACK codebook determination that supports multiple simultaneously active BWPs in one serving cell. An innermost loop may be added for all configured BWPs in each serving cell.

TABLE 3

Pseudo-code for Type-2 HARQ-ACK codebook determination

```
If the UE transmits HARQ-ACK in a PUCCH and for any PUCCH format, the UE may
determine the õ_0^{ACK}, õ_1^{ACK}, ..., õ_{O_{ACK}-1}^{ACK}, for a total number of O_{ACK} HARQ-ACK information
bits, according to the following pseudo-code:
Set c = 0—serving cell index: lower indices correspond to lower RRC indices of
corresponding cell
Set b = 0—BWP index: lower indices correspond to loer RRC indices of
corresponding BWP
Set m = 0—PDCCH with DCI format 1_0 or DCI format 1_1 monitoring occasion index:
lower index corresponds to earlier PDCCH with DCI format 1_0 or DCI format 1_1
monitoring occasion
Set j = 0
Set V_{temp} = 0
Set V_{temp2} = 0
Set V_s = 0
Set N_{cells}^{DL} to the number of serving cell configured by higher layers for the UE
Set M to the number of PDCCH monitoring occasion(s)
    while m < M
        while c < N_{cells}^{DL}
    Set N_{BWPs}^{DL} to the number of BWPs for cell c configured by higher layers for the UE
        while b < N_{BWPs}^{DL}
            if there is a PDSCH on BWP b in serving cell c associated with PDCCH in
```

TABLE 3-continued

Pseudo-code for Type-2 HARQ-ACK codebook determination

PDCCH monitoring occasion m, or there is a PDCCH indicating downlink SPS
release on BWP b in serving cell c
    if $V_{C-DAI,c,m}^{DL} \leq V_{temp}$
        j = j + 1
    end if
    $V_{temp} = V_{C-DAI,c,m}^{DL}$
    if $V_{C-DAI,m}^{DL} = \emptyset$
        $V_{temp2} = V_{C-DAI,c,m}^{DL}$
    else
        $V_{temp2} = V_{T-DAI,m}^{DL}$
    if the higher layer parameter HARQ-ACK-spatial-bundling-PUCCH = FALSE
    and m is a monitoring occasion for PDCCH with DCI format 1_0 or DCI
    format 1_1 and the UE is configured by higher layer parameter Number-MCS-
    HARQ-DL-DCI with reception of two transport blocks for at least one
    configured DL BWP of at least one serving cell,
        $\tilde{o}^{ACK}_{8j+2(V_{C-DAI,c,m}^{DL}-1)}$ = HARQ-ACK bit corresponding to the first transport block of
    this cell
        $\tilde{o}^{ACK}_{8j+2(V_{C-DAI,c,m}^{DL}-1)+1}$ = HARQ-ACK bit corresponding to the second transport block
    of this cell
        $V_s = V_s \cup \{8j + 2(V_{C-DAI,c,m}^{DL} - 1), 8j + 2(V_{C-DAI,c,m}^{DL} - 1) + 1\}$
    else if the higher layer parameter HARQ-ACK-spatial-bundling-PUCCH =
    TRUE and m is a monitoring occasion for PDCCH with DCI format 1_1 and
    the UE is configured by higher layer parameter Number-MCS-HARQ-DL-DCI
    with reception of two transport blocks in at least one configured DL BWP of a
    serving cell,
        $\tilde{o}^{ACK}_{4j+V_{C-DAI,c,m}^{DL}-1}$ = binary AND operation of the HARQ-SCK bits corresponding
    to the first and second transport blocks of this cell
        $V_s = V_s \cup \{4j + V_{C-DAI,c,m}^{DL} - 1\}$
    else
        $\tilde{o}^{ACK}_{4j+V_{C-DAI,c,m}^{DL}-1}$ = HARQ-ACK bit of this cell
        $V_s = V_s \cup \{4j + V_{C-DAI,c,m}^{DL} - 1\}$
    end if
    b = b + 1
    end while
    c = c + 1
    end while
    m = m + 1
end while
if $V_{temp2} < V_{temp}$
    j = j + 1
end if
if the higher layer parameter HARQ-ACK-spatial-bundling-PUCCH = FALSE and m is
a monitoring occasion for PDCCH with DCI format 1_0 or DCI format 1_1 and the UE
is configured by higher layer parameter Number-MCS-HARQ-DL-DCI with reception
of two transport blocks for at least one configured DL BWP of a serving cell,
    $O^{ACK} = 2 \cdot (4 \cdot j + V_{temp2})$
else
    $O^{ACK} = 4 \cdot j + V_{temp2}$
$\tilde{o}_i^{ACK}$ = NACK for any $i \in \{0, 1, \ldots, O^{ACK} - 1\} \backslash V_s$
Set c = 0
    while $c < N_{cells}^{DL}$
        if SPS PDSCH transmission is activated for a UE and the UE is configured to
        receive SPS PDSCH in a slot within the M monitoring occasions for serving cell c
        $O^{ACK} = O^{ACK} + 1$
        $o^{ACK}_{O^{ACK}-1}$ = HARQ-ACK bit associated with the SPS PDSCH reception
    end if
        c = c + 1;
end while UCI is multiplexed on a PUSCH transmission on a cell with the smallest index and on a BWP with the smallest BWP index.

A C-DRX operation is common across component carriers (CC) or cells, i.e. if the DRX state is ON duration, then all CCs/cells are undergoing the ON duration together. Because sCellDeactivationTimer can take values starting from 20 ms to 1280 ms (20, 40, 80, 160, 320, 640, and 1280 ms), it is possible SCells can remain in active state for a few DRX cycles assuming a typical configuration of DRX cycle of 320 ms as in LTE. A difference for a CC/cell between deactivated state and activated state but in inactive mode of DRX cycle is that the network already has a CSI report available for the CC/cell in inactive mode of DRX cycle so that the network can schedule resources on the CC/cell quickly when the CC/cell wakes up.

A WUS in the PCell (or in a scheduling cell) can indicate for all or subset of the configured serving cells whether or not there is any upcoming grant scheduling a PDSCH or PUSCH for a UE in a respective serving cell. A benefit is that the UE needs to wake up only on the cell where the WUS is transmitted for detecting a WUS. The UE does not need to wake up on SCells other than the cell where the WUS is transmitted for detecting a WUS. That is, the UE needs to turn on the RF and baseband processing units only for detecting a WUS on the PCell or on a SCell associated with a subset of configured SCells for WUS purpose (UE 'wake-up' for Scell). This can be beneficial for UE power savings in case of inter-band CA where different RF units may be used for transmissions/receptions on different cells. When the WUS indicates there potential scheduling of a PDSCH or PUSCH for the UE, the UE may wake up to monitor PDCCH, or receive PDSCH, or transmit PUSCH on the serving cell and on the configured SCells that are associated with the serving cell with respect to the WUS functionality. When the WUS indicates there is no PDSCH/PUSCH scheduling for the UE in a next DRX cycle, the UE may not wake up on the serving cell and on the configured serving cells that are associated with the serving cell with respect to the WUS functionality. The SCells associated with the serving cell with respect to the WUS functionality can be configured to the UE. UE power consumption can be reduced for serving cells because of increased inactive time in the DRX cycle.

The main properties of the WUS in CA cases are further discussed in the following examples. In one example, the WUS serves to wake-up the UE for both PCell and SCells in the following DRX cycle, for example when there is PDSCH/PUSCH scheduling for the UE in the following DRX cycle, or to keep the UE in inactive mode in the following DRX cycle, for example when there is no PDSCH/PUSCH scheduling for the UE in the following DRX cycle.

In another example, similar to WUS in non-CA cases, a WUS for a UE with CA operation can be UE-specific or UE-group specific. A PDCCH transmission conveying a DCI format providing a WUS to a UE is in a same CORESET as PDCCH transmissions conveying DCI formats scheduling PDSCH reception to or PUSCH transmissions from the UE. A search space set for PDCCH conveying a DCI format providing a WUS can be configured to a UE by higher layers. The configuration can include the following parameters: number of CCE aggregation levels, number of candidates per CCE aggregation level, monitoring periodicity, monitoring offset, and monitoring pattern within a slot. The monitoring periodicity can also be implicitly configured and can have a same value as the length of the DRX cycle. The monitoring offset relative to the monitoring periodicity for the PDCCH providing the WUS can be some slots or symbols before the next PDCCH monitoring in the next DRX cycle.

In yet another example, similar to WUS in non-CA cases, the DCI format providing the WUS can have a CRC scrambled by C-RNTI or a new RNTI, and a same or smaller size than a DCI format scheduling PDSCH receptions to or PUSCH transmissions from the UE. The DCI format providing the WUS can have a same size as another DCI format with CRC scrambled by a RNTI, such as a DCI format providing transmission power control commands.

In yet another example, additional information conveyed by the DCI format in the PDCCH providing a WUS can be configured by higher layers. In one example, the DCI format can include a bitmap indicating the cells where the UE wakes up in the following DRX cycle. Each bit in the bitmap corresponds to a configured SCell and indicates whether or not the UE wakes up for the SCell in the following DRX cycle. Alternatively, a cell can be configured to be in one or more cell groups in a configured set of cell groups and the WUS can indicate a cell group from the set of cell groups for the UE to wake up in the next DRX cycle. Other information can be included in the DCI format such as a CSI-RS configuration or PUCCH resources for each SCell for the UE to measure and report CSI. An initial BWP for a SCell indicated by a WUS for the UE to wake up for receptions/transmissions in a next DRX cycle can be configured by higher layers or can be a latest active BWP for the SCell.

In yet another example, similar to WUS in non-CA cases, the PDCCH providing the WUS can be configured to be received by a UE in the default BWP on the PCell or on a SCell associated with a group of SCells with respect to the WUS functionality. The purpose of a WUS in a default BWP is to reduce the UE reception bandwidth and therefore reduce UE power consumption.

Figure 25:
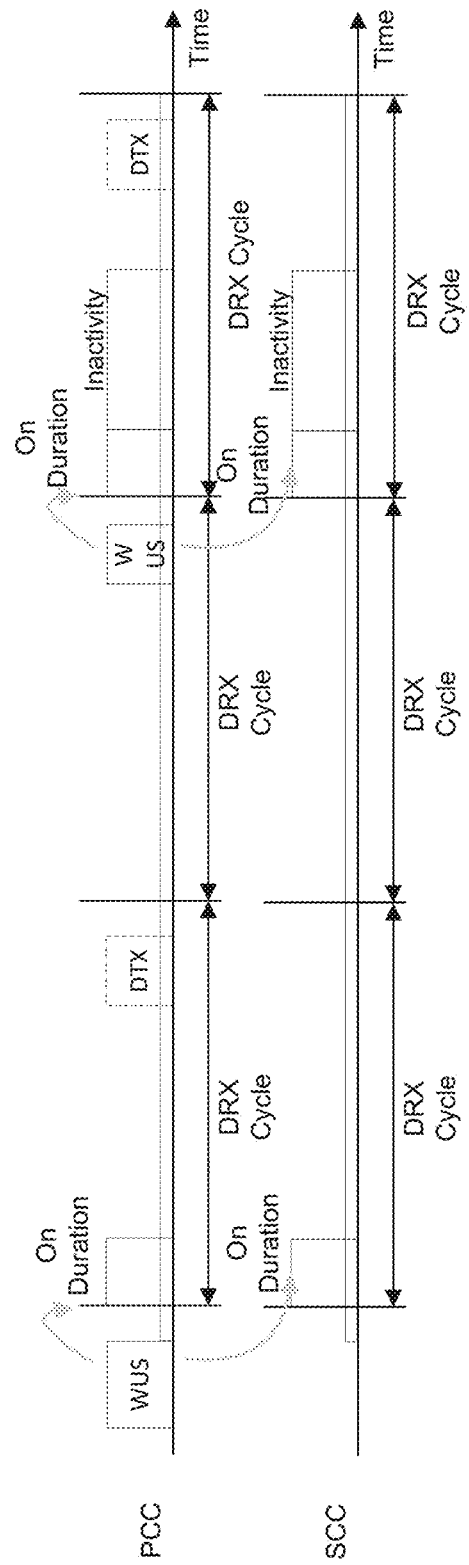
FIG. 25 illustrates an example multiple cells configuration according to embodiments of the present disclosure.

FIG. 25 illustrates an example multiple cells configuration 2500 according to embodiments of the present disclosure. The embodiment of the multiple cells configuration 2500 illustrated in FIG. 25 is for illustration only and could have the same or similar configuration. FIG. 25 does not limit the scope of this disclosure to any particular implementation.

FIG. 25 shows an example where a WUS simultaneously applies to two cells. The UE receives the WUS on the PCell and the WUS serves to wake up or not the UE on both the PCell and a SCell. In this example, because there is PDSCH/PUSCH scheduling on the PCell and the SCell in the first DRX cycle after the WUS reception, the UE needs to wake up on both the PCell and the SCell in the first DRX cycle. Because there is no PDSCH/PUSCH scheduling on the PCell and the SCell in the second DRX cycle, the UE does not need to wake up either on the PCell or on the SCell in the second DRX cycle.

When C-DRX operation is common across multiple active BWPs, the UE typically consumes significant amount of power for monitoring PDCCH without detecting any DCI format in all multiple active BWPs. When BWP-Inactivity-Timer for an active BWP is still running at the start of the following DRX cycle and is not stopped e.g., by specification before the start of the following DRX cycle, it is possible that this active BWP(s) can remain in active state for a few DRX cycles.

When multiple active BWPs are configured, a WUS in a BWP can be used to indicate for all or a subset of the active BWPs whether or not there is any upcoming PDSCH/PUSCH scheduling in the respective BWP. A benefit is that only one BWP where the UE receives the PDCCH providing the WUS needs to be active. BWPs other than the one BWP do not need to be active. When the WUS indicates there is PDSCH/PUSCH scheduling for the UE on an active BWP in a next DRX cycle, the BWP may be activated in the following DRX cycle. When the WUS indicates there is no PDSCH/PUSCH scheduling for the UE on an active BWP in a next DRX cycle, the BWP may remain inactive in the following DRX cycle. UE power consumption can be reduced because of increased inactive time in the DRX cycle.

The form of WUS used when a UE has multiple active BWP is similar to that in CA except that the WUS in case of multiple active BWP serves as a wake-up signal for all active BWPs in a serving cell in the following DRX cycle. In case of multiple active BWPs, the WUS serves to indicate to the UE to stay in inactive mode on all active BWPs in a serving cell in the following DRX cycle when there is no upcoming transmission/reception for the UE in the serving cell. Additional information conveyed in a DCI format, when a PDCCH provides the WUS, can be configured by higher layers. In one example, a DCI format in a PDCCH providing a WUS includes a BWP control bitmap or a BWP group index to indicate the BWPs in a serving cell where the UE wakes up in the following DRX cycle. Each bit in the bitmap, or each BWP in the group of BWPs, corresponds to a configured BWP in a serving cell. A bit indicates whether the UE wakes up for a corresponding BWP is waken up or whether the UE remains inactive in the BWP in the following DRX cycle. Other information can be included in the DCI such as a CSI-RS configuration or PUCCH resources for each BWP for a UE to measure and report CSI.

Figure 26:
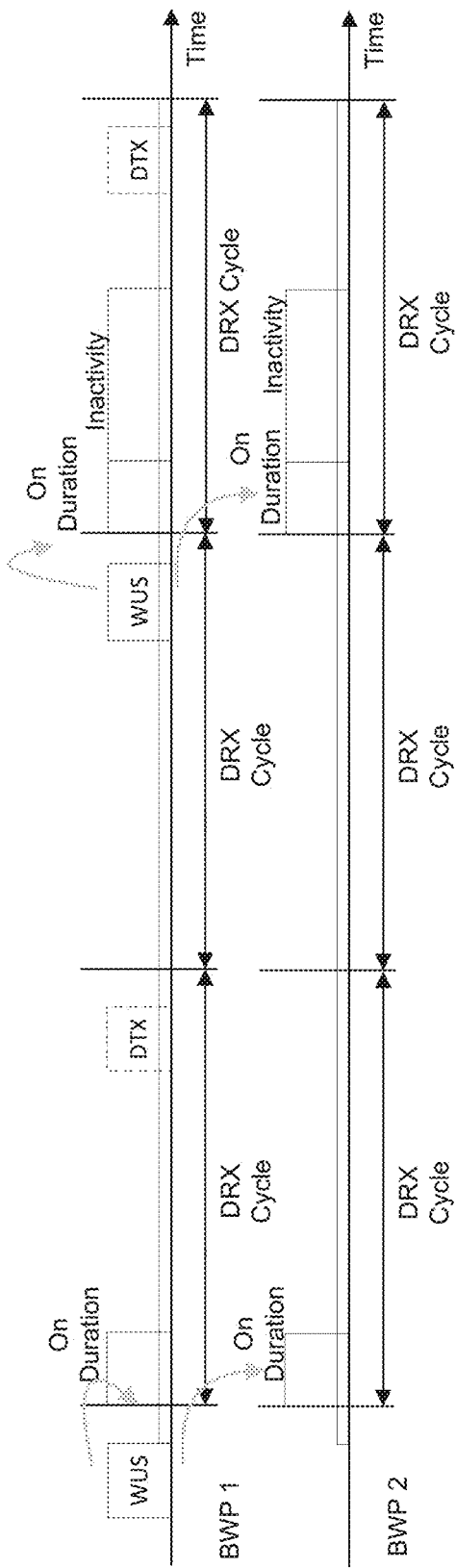
FIG. 26 illustrates another example multiple cells configuration according to embodiments of the present disclosure.

FIG. 26 illustrates another example multiple cells configuration 2600 according to embodiments of the present disclosure. The embodiment of the multiple cells configuration 2600 illustrated in FIG. 26 is for illustration only and could have the same or similar configuration. FIG. 26 does not limit the scope of this disclosure to any particular implementation.

FIG. 26 shows an example where two BWPs in a serving cell are active for a UE at the same time and are configured with a same DRX cycle. The WUS that is received by the UE on $BWP_1$ serves as WUS for both $BWP_1$ and $BWP_2$. Because there is no PDSCH/PUSCH scheduling on BWP2 in the second DRX cycle, the UE does not need to wake up on BWP2 for PDCCH monitoring in the second DRX cycle. Because there is PDSCH/PUSCH scheduling on BWP2 in the first DRX cycle, the UE needs to wake up on BWP2 for PDCCH monitoring in the first DRX cycle.

A WUS can be extended to provide wake-up signals for multiple cells with multiple active BWPs. In one example, the WUS conveys all multiple active BWP indexes in each associated cell. A BWP control bitmap or a BWP group index for each serving cell can be included in the DCI format in the PDCCH providing the WUS to indicate the BWPs and the corresponding serving cells where the UE wakes up (or remain inactive) in the following DRX cycle.

If a new fast SCell state (e.g., dormant state) is introduced in NR as in LTE, a WUS on the PCell can be used to activate SCells from a deactivated state as well as from a dormant state.

Figure 27:
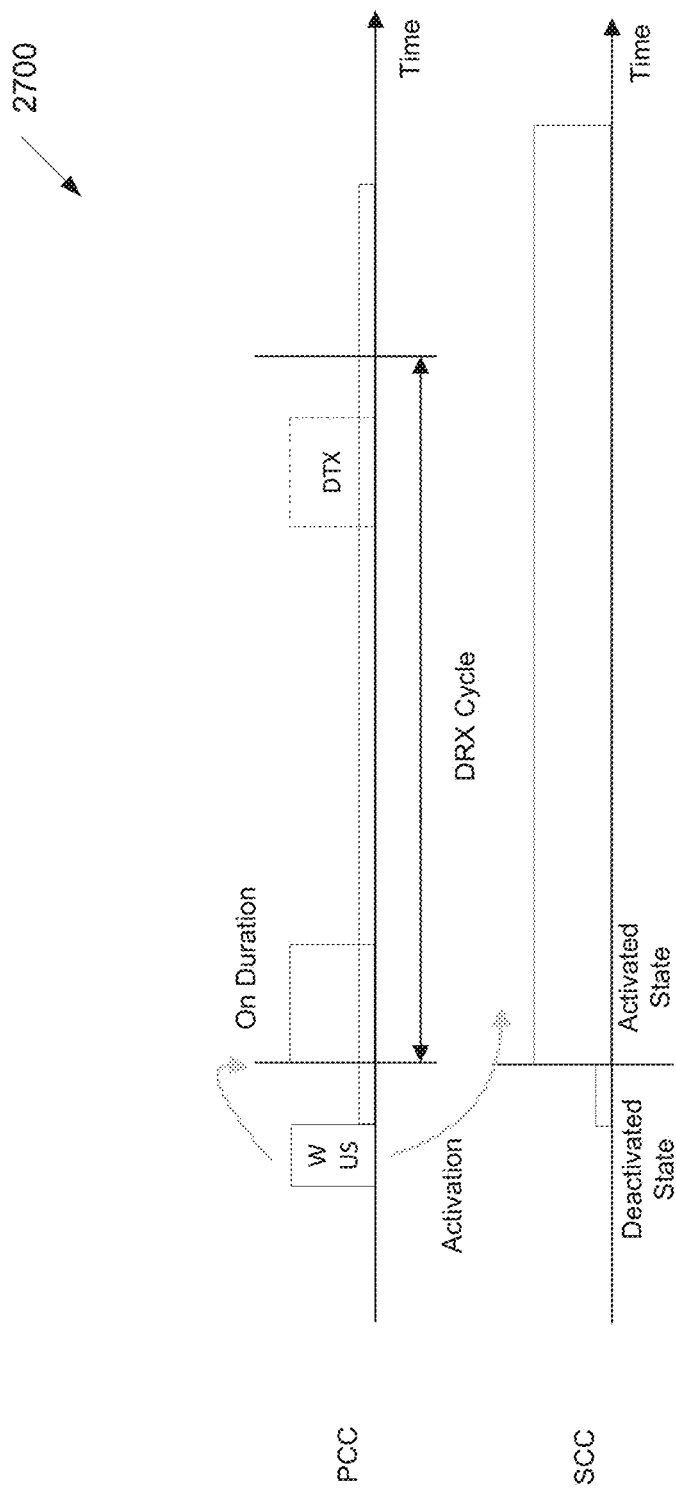
FIG. 27 illustrates yet another example multiple cells configuration according to embodiments of the present disclosure.

FIG. 27 illustrates yet another example multiple cells configuration 2700 according to embodiments of the present disclosure. The embodiment of the multiple cells configuration 2700 illustrated in FIG. 27 is for illustration only and could have the same or similar configuration. FIG. 27 does not limit the scope of this disclosure to any particular implementation.

For a dormant SCell to be activated by a WUS, the activation delay is not large. For a SCell in the deactivated state, because the network may need to wait to get a CSI report and the UE may need to turn on the RF and re-synchronize, the UE needs more time for the SCell to become activated and the offset between the WUS and the start of the next DRX cycle can be larger.

The WUS used in activating SCells and the WUS used as wake-up signal for activated cells are respectively used in different cases of deactivated/dormant state and activated state in inactive mode of DRX cycle. The WUS used for activating SCells can also include an information field providing an index of an active BWP on which the corresponding SCell may operate. Otherwise, when this information field is absent, the initial active BWP or default BWP that is configured per SCell by RRC signaling is assumed for operation on the corresponding SCell.

When multiple active BWPs are supported for a SCell, a WUS can convey all active BWP indexes for the SCell. Otherwise, when this information field is absent, all initial active BWPs that are configured for a SCell by RRC signaling are assumed for the SCell.

Figure 28:
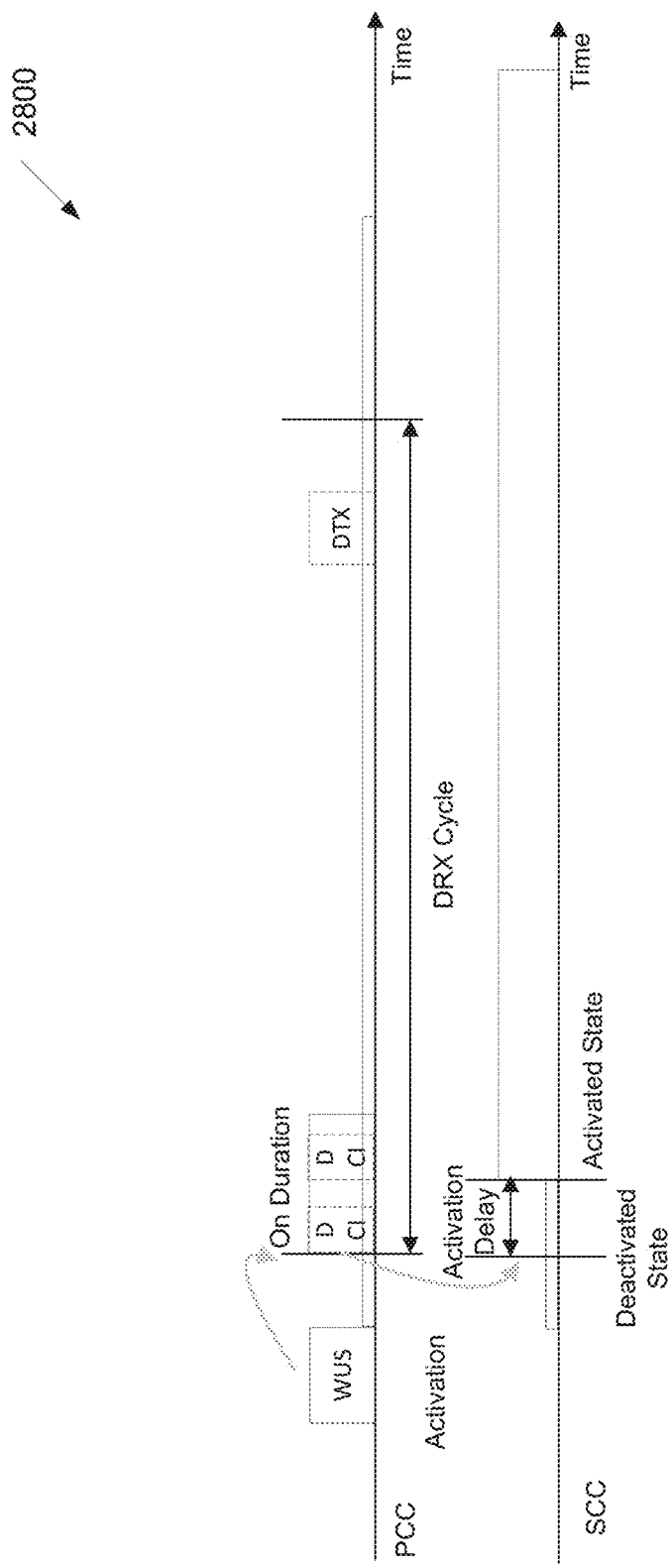
FIG. 28 illustrates yet another example multiple cells configuration according to embodiments of the present disclosure.

FIG. 28 illustrates yet another example multiple cells configuration 2800 according to embodiments of the present disclosure. The embodiment of the multiple cells configuration 2800 illustrated in FIG. 28 is for illustration only and could have the same or similar configuration. FIG. 28 does not limit the scope of this disclosure to any particular implementation.

A PDCCH conveying a DCI format that the UE detects on a scheduling cell, such as the PCell, and schedules PDSCH/PUSCH on a SCell can be used as a WUS for the SCell. No additional activation signal for the SCell is required. A bit field, such as a carrier indicator field (CIF) field, corresponding to the SCell in the DCI format is used to activate the SCell in a current DRX cycle. No cross-carrier scheduling is used because of large activation delay for SCells. If cross-carrier activation is supported in this case, candidate K2/K0 values in the DCI format 1_1 may be modified to not include small values in order to be able to support a large activation delay for the SCell. After the activation for the SCell by a DCI format on the scheduling cell, the UE can perform PDCCH monitoring on the SCell. If a dormant SCell state is introduced, cross-carrier scheduling can be used to activate a SCell as well as to schedule PDSCH/PUSCH on the SCell due to the smaller activation delay.

In one example, for DCI format 1_1, the CIF indicates the SCell that is activated by DCI format 1_1. Other fields in DCI format 1_1 can be interpreted as for same carrier scheduling.

In yet another example, a new information field in DCI format 1_1 indicates the SCell(s) to be activated. For example, the field can indicate a group of cells, from a configured set of groups of cells, to be activated.

A difference between the above scheme and a zero-RA DCI format for indicating to SCells that are activated is that the above scheme uses the CIF and BWP indicator fields or a new information field in DCI format 1_1 (while other fields in DCI format 1_1 are interpreted as for same cell scheduling) whereas the zero-RA DCI format indication uses a reserved value for the resource allocation field.

Another information field that can be present in a DCI format scheduling PDSCH/PUSCH is the BWP index on which the corresponding SCell operates. Otherwise, when this information field is absent, the initial active BWP or the default BWP that is configured per SCell by RRC signaling is assumed to be used for operation on the corresponding SCell.

When multiple active BWPs are supported in SCells, a DCI format scheduling PDSCH/PUSCH can convey all active BWP indexes for the corresponding SCell. Otherwise, when this information field is absent, all initial active BWPs that are configured per SCell by RRC signaling are assumed for the corresponding SCell.

To reduce signaling overhead for activating multiple BWPs on SCells in a DCI format scheduling PDSCH/PUSCH, a MAC CE can be used to activate SCells with multiple active BWPs. An existing SCell activation/deactivation MAC CE signaling can be extended to include additional information for multiple active BWPs. One example is: a new LCID (index xxxxxx: one reserved index value can be used for this new LCID) in MAC CE header is used to indicate a new format of MAC CE for SCell activation/deactivation with multiple active BWPs and a new MAC CE for multiple active BWPs is designed for both 1 octet and 4 octets formats. An example is shown in TABLE 4 and FIG. 29 where 2 BWPs are configured in each SCell and 2 SCells/8 SCells are supported respectively for 1 octet/4 octets MAC CE format.

TABLE 4

Values of LCID for DL-SCH

| Index | LCID values |
|---|---|
| 000000 | CCCH |
| 000001-100000 | Identity of the logical channel |
| 100001-110111 | Reserved |
| 111000 | Duplication Activation/Deactivation |
| 111001 | SCell Activation/Deactivation (4 octet) |
| 111010 | SCell Activation/Deactivation (1 octet) |
| 111011 | Long DRX Command |
| 111100 | DRX Command |
| 111101 | Timing Advance Command |
| 111110 | UE Contention Resolution Identity |
| 111111 | Padding |
| xxxxxx | SCell Activation/Deactivation for multiple active BWPs |

Figure 29:
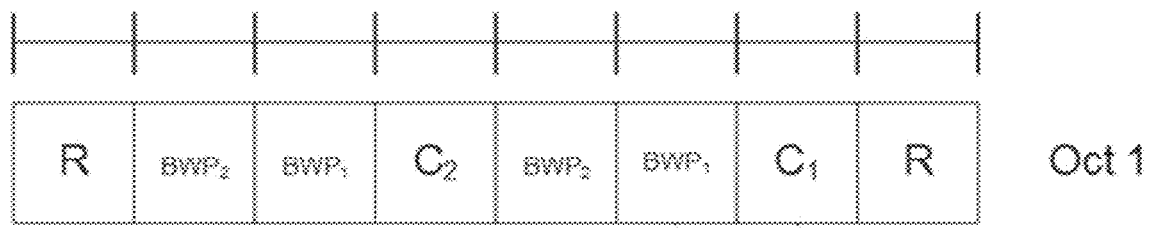
FIG. 29 illustrates an example Scell activation/deactivation MAC CE according to embodiments of the present disclosure.
Figure 29:
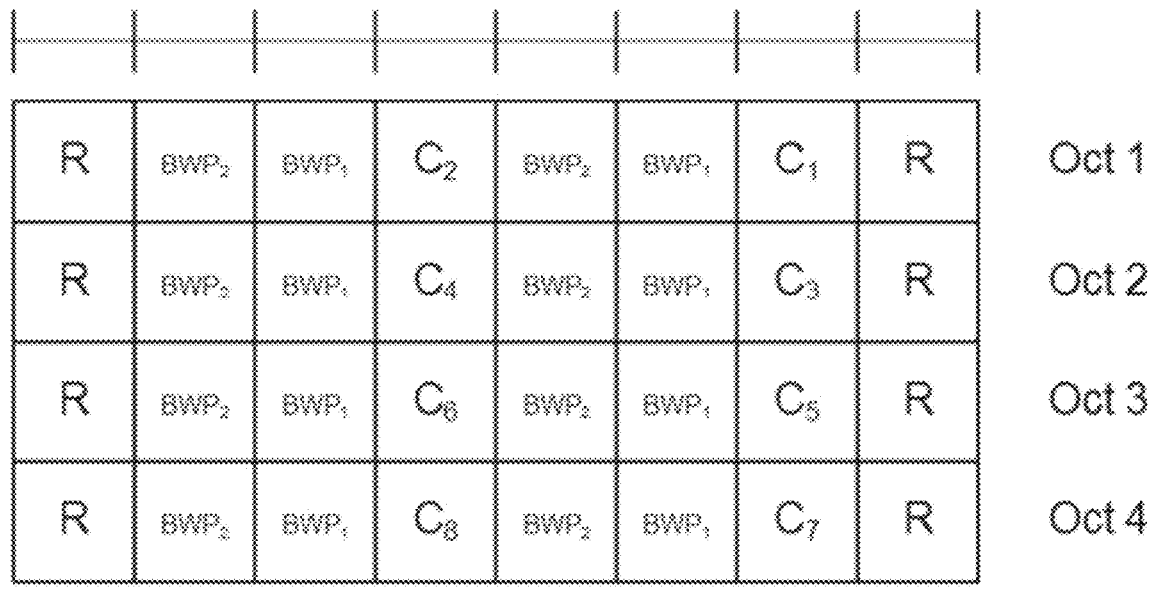

FIG. 29 illustrates an example Scell activation/deactivation MAC CE 2900 according to embodiments of the present disclosure. The embodiment of the Scell activation/deactivation MAC CE 2900 illustrated in FIG. 29 is for illustration only and could have the same or similar configuration. FIG. 29 does not limit the scope of this disclosure to any particular implementation.

As shown in FIG. 29, for a SCell configured with SCellIndex i, $C_i$ indicates the activation/deactivation status of the SCell with SCellIndex i; else, the MAC entity may ignore the $C_i$ field. The $C_i$ field is set to "1" to indicate that the SCell with SCellIndex i is activated. The $C_i$ field is set to "0" to indicate that the SCell with SCellIndex i is deactivated. $BWP_i$ is a BWP index per SCell configured by RRC. The $BWP_i$ field is set to "1" to indicate that the BWP with BWP index i is activated. The BWP, field is set to "0" to indicate that the BWP with BWP index i is deactivated. R is a reserved bit set to "0."

An NR network can also operate with a large carrier frequency such as in a mmWave frequency band. One key issue for such operation is the large propagation loss and signal blockage that can materially degrade performance. To overcome this issue, directional beamformed transmission and reception with a large number of antenna elements is used for both a base station and a UE.

To achieve relatively large beamforming gain with reasonable implementation complexity, a hybrid analog-digital beamforming architecture is typically used where analog beams on each panel/subarray are formed through phase shifters and/or amplitude weights and digital precoding is performed across panel/subarrays. Because of narrow analog beam transmission width, downlink analog transmission from the base station can cover only a limited cell area. Therefore, in order to cover the whole cell area, the base station uses multiple Tx beams. Furthermore, factors such as UE mobility and signal blockage can change the quality of beams. Therefore, to support multi-beam operation, procedures associated with beam management are introduced. A beam is defined by a set of quasi-collocation (QCL) properties for an associated transmitted signal and the term "beam" is used for brevity instead of referring to QCL properties of a transmitted signal. A set of QCL properties is associated with a transmission configuration indicator (TCI) state.

Beam management is defined as a set of L1/L2 procedures for acquiring and maintaining a set of transmission/reception points (TRP(s)) and/or UE beams that can be used for DL and UL transmission/reception. Beam management procedures include at least the following: (1) beam determination for TRP(s) or for a UE to select Tx/Rx beam(s); (2) beam measurement for TRP(s) or for a UE to measure characteristics of received beamformed signals; (3) beam reporting for a UE to report information of beamformed signal(s) based on beam measurements; (4) beam sweeping with beams transmitted and/or received during a time interval in a predetermined way; (5) beam switching where another Tx/Rx beam with better link quality can be switched to when a quality of a current beam degrades; (6) beam recovery that relates to a procedure when a link between the base station and the UE cannot be maintained and needs to be reestablished; and/or (7) beam indication where the base station informs the UE of a Tx beam.

NG-RAN supports multi-RAT dual connectivity (MR-DC) operation whereby a UE in RRC_CONNECTED is configured to utilize radio resources provided by two distinct schedulers, located in two different NG-RAN nodes connected via a non-ideal backhaul and providing either E-UTRA (i.e. if the node is an ng-eNB) or NR access (i.e. if the node is a gNB). One relatization is Evolved-Universal Terrestrial Radio Access-New Radio dual connectivity (EN-DC). In EN-DC, the master node is LTE, and the secondary node is NR. Both nodes have a direct connection with the EPC in the user plane that carries the user data, but only the master node has the direct connection with the EPC in the control plane that carries the signaling traffic between the UE and the core network.

In one example, a UE transmits at a given time only to the master node or only to the secondary node in order to avoid intermodulation interference. The UE can transmit to LTE and NR base stations in a TDM manner. The NR base station can transmit in MBSFN subframes of LTE and TDM can be supported for downlink transmissions between LTE and NR base stations.

Therefore, there is a need to specify operations supporting functionality of wake-up signal in multi-beam operating scenarios and the related procedures on beam management when DRX is considered including forms of wake-up signal, related beam management procedures, and configurations.

There is another need to specify operations supporting functionality of wake-up signal in multi-beam CA scenarios and the related beam management procedures and configurations when DRX is considered including forms of wake-up signal, related beam management procedures, and configurations.

There is another need to specify power savings mechanisms for multi-panel UEs.

There is another need to specify power savings mechanisms for UEs operating with dual connectivity.

In one example of multi-beam operating scenarios, forms of WUS can be configured by RRC as multi-beam WUS, single-beam WUS, or DTX as indication for PDCCH monitoring in the following DRX cycle or other specialized forms of WUS depending upon UE capabilities.

In another example of multi-beam operating scenarios, whether aperiodic/periodic beam management exists or not before the start of the next DRX cycle can be configured by RRC. Whether beam measurement and reporting on WUS are done by a UE can be configured by RRC.

In another example of multi-beam operating scenarios, WUS can be used to initiate aperiodic/periodic beam management that is configured to be completed before the next DRX cycle starts. A configuration for aperiodic CSI-RS and PUCCH resources for the beam management can be indicated by the WUS, including the WUS being a CSI-RS. A PUCCH resource is used by a UE to provide a CSI report or a beam state information (BSI) report.

In one example of multi-beam operating scenarios, WUS can be used to indicate the Tx beam information for the PDCCH in the next DRX cycle. For example, the beam can be same as the one assumed by the UE to detect the WUS where the UE can attempt WUS detection assuming transmission with different beams and the WUS can be transmitted multiple times in order for the UE to switch beam hypotheses.

In another example of multi-beam CA operating scenarios, whether or not aperiodic/periodic beam management on SCells exists before the start of the next DRX cycle can be configured by RRC.

In another example of multi-beam CA operating scenarios, WUS on the PCell (or on a scheduling cell) can be used to initiate aperiodic/periodic beam management on SCells that is configured to be completed before the next DRX cycle starts. The aperiodic CSI and PUCCH resources configuration for beam management on SCells can be indicated to a UE by the WUS or be configured by RRC. A PUCCH resource is used for CSI feedback.

In another example of multi-beam CA operating scenarios, if a UE wakes up for a SCell or the SCell is activated by a PDCCH on the PCell (or a scheduling cell) during the active time of DRX cycle, the beam management on the SCell can be initiated by the PDCCH on the PCell (or, in general, on the scheduling cell). The aperiodic CSI-RS and PUCCH resource configuration for the beam management on the SCell can be indicated by the DCI format in the PDCCH or can be preconfigured by RRC signaling and triggered by the WUS on the PCell (or, in general, on the scheduling cell).

In another example of UE multi-panel operating scenarios, power savings can be achieved by turning off unused panels via RRC or MAC CE signaling between the UE and the gNB. The signaling information can be a number of SRS ports for uplink and the maximum number of simultaneously received beams for the UE for downlink.

In LTE-NR dual connectivity and NR-NR dual connectivity, a WUS on a NR cell can be used as a wake-up signal for both LTE cells and NR cells and WUS on a NR cell can be used as a wake-up signal for other NR cells in NR-NR dual connectivity.

Because some time elapses between DRX cycles for a UE, a serving beam quality may degrade due to UE movement or signal blockage when the UE wakes up at a next DRX cycle. Beam sweeping can be used for a WUS transmission before the start of a next DRX cycle. Beam management, based on an indication by the WUS, can be performed before the UE begins PDCCH monitoring at the start of a next DRX cycle. Therefore, a CSI-RS configuration for beam management and PUCCH configuration for a CSI or a BSI report can be conveyed by the WUS.

Figure 30:
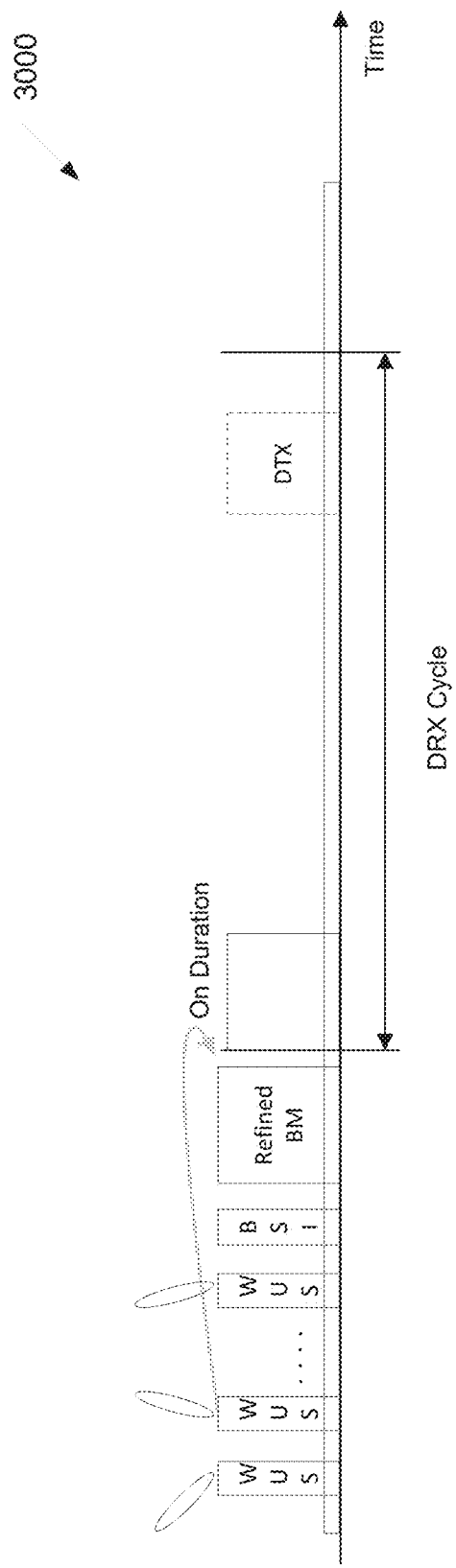
FIG. 30 illustrates an example multi-beam WUS transmission according to embodiments of the present disclosure.

FIG. 30 illustrates an example multi-beam WUS transmission 3000 according to embodiments of the present disclosure. The embodiment of the multi-beam WUS transmission 3000 illustrated in FIG. 30 is for illustration only and could have the same or similar configuration. FIG. 30 does not limit the scope of this disclosure to any particular implementation.

Beam sweeping in a WUS transmission can be used as a basis for further CSI-RS beam management. After WUS reception, a UE can be configured to report a preferred serving beam, for example by reporting an index from a configured set of QCL configurations, to the gNB on a PUCCH resource that is indicated by the WUS or preconfigured to the UE by higher layer signaling. Based upon the CSI report or a BSI report from the UE, the gNB can determine a beam to transmit a CSI-RS to the UE. A CSI-RS transmission offset can be a few slots later than the WUS transmission and after the PUCCH report reception on the preferred/indicated serving beam. In FIG. 30, a gNB transmits a multi-beam WUS. A preferred serving beam index is reported on the PUCCH resource. Then a refined beam management is completed before the start of a next DRX cycle. Each transmission beam of a WUS can be transmitted a few times for the UE to determine an optimal reception beam.

Figure 31:
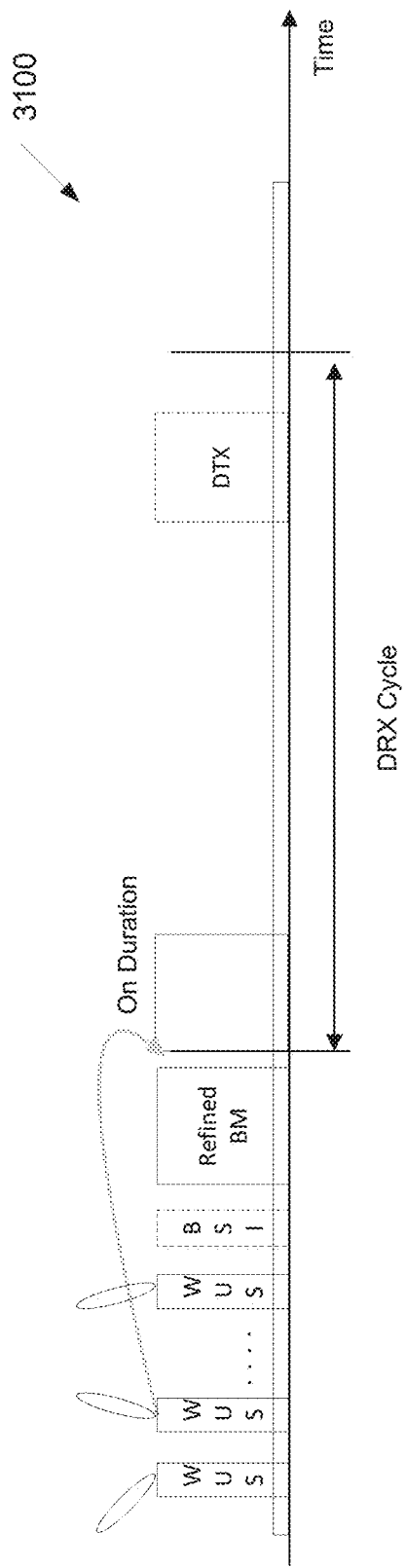
FIG. 31 illustrates another example multi-beam WUS transmission according to embodiments of the present disclosure.

FIG. 31 illustrates another example multi-beam WUS transmission 3100 according to embodiments of the present disclosure. The embodiment of the multi-beam WUS transmission 3100 illustrated in FIG. 31 is for illustration only and could have the same or similar configuration. FIG. 31 does not limit the scope of this disclosure to any particular implementation.

After WUS reception, the UE can be configured whether or not to report to the gNB a preferred beam index for the WUS on the indicated PUCCH resource. If the UE is not configured to report a preferred beam index, the UE can start the following refined beam management without any prior information on the WUS serving beam index. A dashed box in FIG. 31 means that a corresponding operation is not configured.

Figure 32:
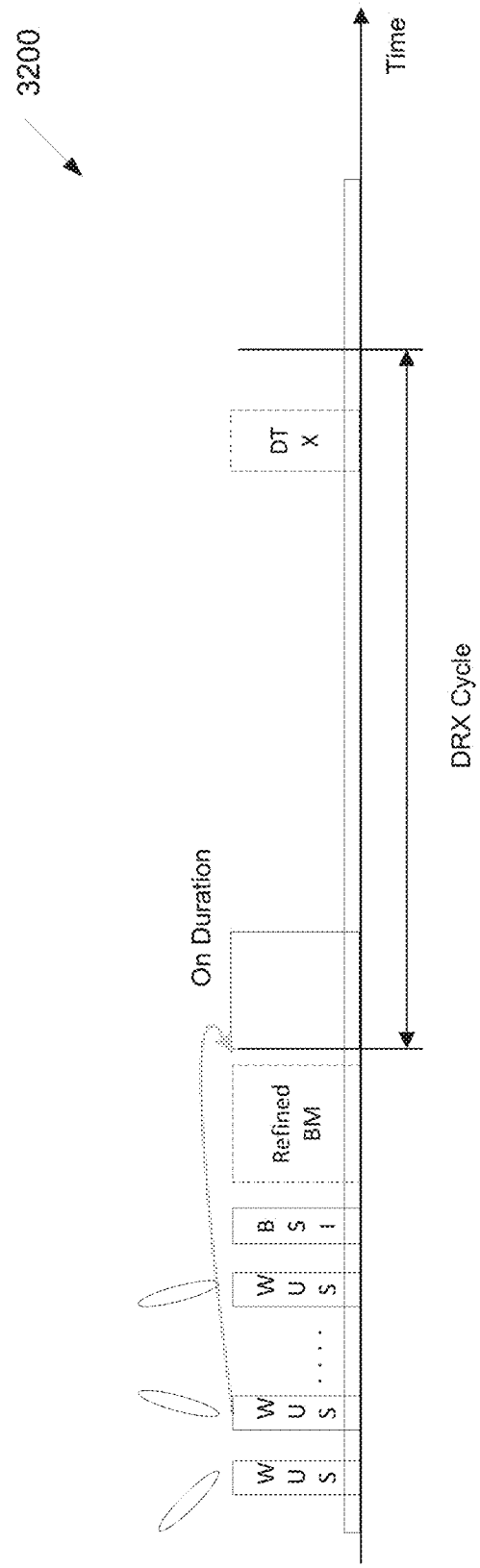
FIG. 32 illustrates yet another example multi-beam WUS transmission according to embodiments of the present disclosure.

FIG. 32 illustrates yet another example multi-beam WUS transmission 3200 according to embodiments of the present disclosure. The embodiment of the multi-beam WUS transmission 3200 illustrated in FIG. 32 is for illustration only and could have the same or similar configuration. FIG. 32 does not limit the scope of this disclosure to any particular implementation.

A network can configure whether or not a UE performs refined beam management procedures before the start of a next DRX cycle. When a refined beam management is not configured before the start of a next DRX cycle, the UE can start a beam management procedure after the start of a next DRX cycle. The UE reports a preferred WUS serving beam to the gNB after detecting a multi-beam WUS. A dashed box in FIG. 32 means that a corresponding operation is not configured.

Figure 33:
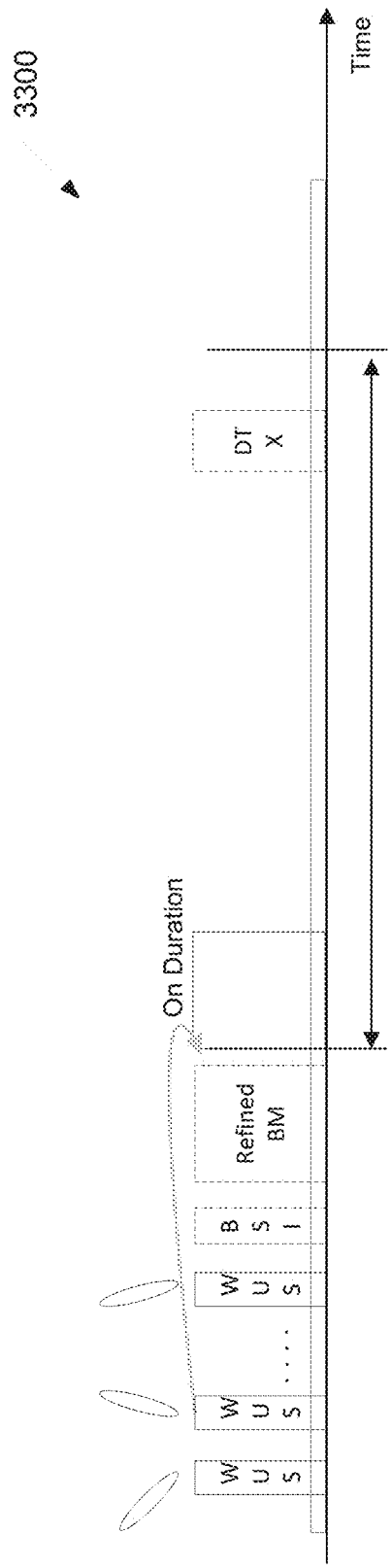
FIG. 33 illustrates yet another example multi-beam WUS transmission according to embodiments of the present disclosure.

FIG. 33 illustrates yet another example multi-beam WUS transmission 3300 according to embodiments of the present disclosure. The embodiment of the multi-beam WUS transmission 3300 illustrated in FIG. 33 is for illustration only and could have the same or similar configuration. FIG. 33 does not limit the scope of this disclosure to any particular implementation.

A UE is not configured to report to a gNB either a BSI report or the following refined beam management. By default the gNB uses the serving beam in the latest DRX cycle for transmitting PDCCH in the following DRX cycle. A dashed box in FIG. 33 means not configured.

Figure 34:
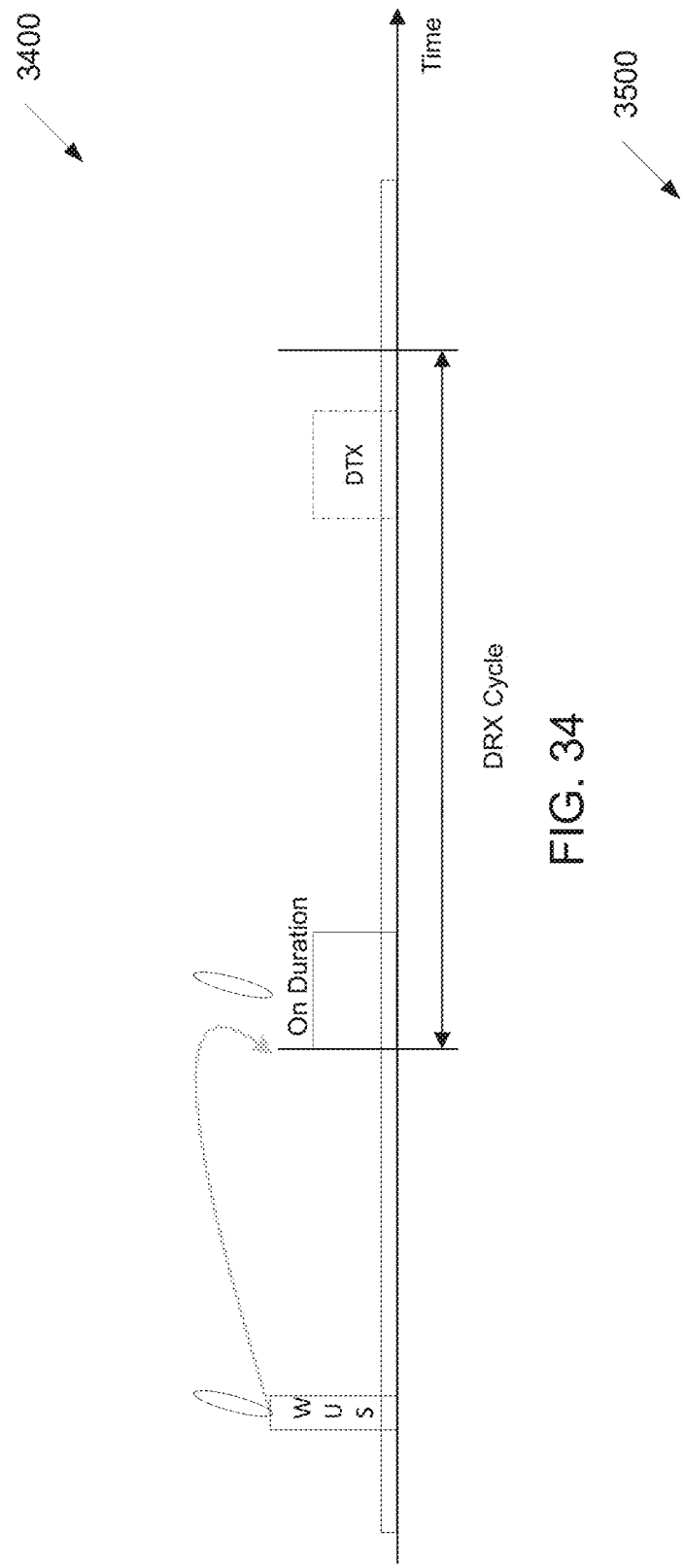
FIG. 34 illustrates yet another example multi-beam WUS transmission according to embodiments of the present disclosure.

FIG. 34 illustrates yet another example multi-beam WUS transmission 3400 according to embodiments of the present disclosure. The embodiment of the multi-beam WUS transmission 3400 illustrated in FIG. 34 is for illustration only and could have the same or similar configuration. FIG. 34 does not limit the scope of this disclosure to any particular implementation.

Since more resources are consumed for beam sweeping for a WUS transmission, the gNB can use only one WUS transmission beam for a UE that can be the latest transmission beam used for for PDCCH monitoring by the UE. The serving beam can change after some inactivity time in a current DRX cycle. Then, when the gNB transmits the WUS, the UE may miss the WUS due to the serving beam misalignment between the UE and the gNB. Because the UE does not wake up in the next DRX cycle when the UE cannot detect a WUS transmitted by the gNB, a larger latency and a throughput loss can result. FIG. 34 shows an example of a single WUS transmission beam for a UE. If the UE fails to detect the WUS due to beam misalignment between the UE and the gNB, the UE may not wake up in the following DRX cycle.

Figure 35:
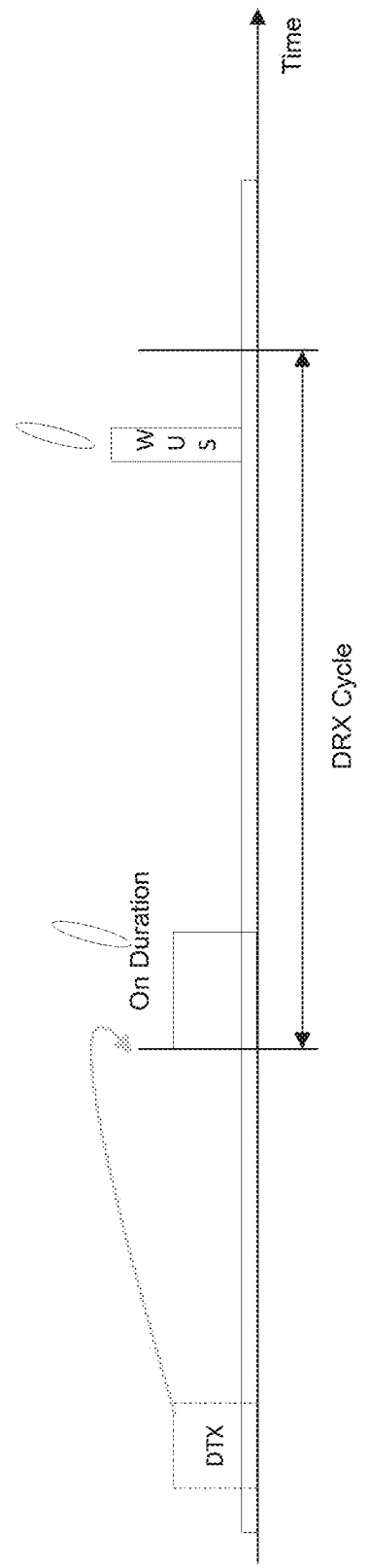
FIG. 35 illustrates yet another example multi-beam WUS transmission according to embodiments of the present disclosure.

FIG. 35 illustrates yet another example multi-beam WUS transmission 3500 according to embodiments of the present disclosure. The embodiment of the multi-beam WUS transmission 3500 illustrated in FIG. 35 is for illustration only and could have the same or similar configuration. FIG. 35 does not limit the scope of this disclosure to any particular implementation.

Another alternative is that a gNB transmits a WUS to a UE when there are no PDCCH assignments for the UE in the next DRX cycle, whereas the gNB does not transmit a WUS (DTX) when there is a PDCCH assignment for the UE in the next DRX cycle. When the gNB transmits a WUS and the UE does not detect the WUS, for example due to serving beam misalignment between the UE and the gNB, the UE assumes a WUS DTX and wake ups in the next DRX cycle for PDCCH monitoring. More power consumption may result but extra latency and throughput loss may be avoided. FIG. 35 shows an example that a WUS DTX serves as wake-up signal for a UE.

A gNB can configure whether a multi-beam WUS has a multi-beam sweeping form or non-multi-beam sweeping form. Forms of multi-beam WUS can be UE-specific or UE-group specific.

The positions for a multi-beam WUS transmission can be configured to a UE by a gNB using RRC signaling or can be defined in the specification of a system operation. A number of transmission beams for a multi-beam WUS transmission can be configured to a UE by a gNB using RRC signaling or can be defined in the specifications of a system operation.

A UE behavior with respect to a WUS detection can be configured by higher layers. For example, for an application with latency tolerance, a WUS can be configured to indicate potential existence of PDCCH in the next DRX cycle and the UE wakes up to monitor PDCCH. For an application with more power consumption tolerance but less latency tolerance of latency, DTX can be configured to indicate the potential existence of PDCCH in the next DRX cycle and the UE wakes up to monitor PDCCH when the UE does not detect a WUS.

A gNB can configure a UE, for example by RRC signaling, whether or not to perform a beam management procedure before the start of a next DRX cycle. The gNB can also configure the UE whether or not to provide a BSI report for the WUS before the start of a next DRX cycle.

For a beam management that a gNB configures to a UE to complete before the start of a next DRX cycle, the following are examples for the configurations.

In one example, a gNB can configure a CSI request or a BSI request to be associated with a WUS. The configuration of corresponding CSI-RS resources is by RRC signaling. A CSI request or a BSI request is an index to an aperiodic CSI-RS configuration list. A UE reports a preferred serving beam index to the gNB before the start of PDCCH monitoring on an associated BWP/cell in the next DRX cycle. The CSI-AperiodicTriggerStateList IE is used to configure the UE with a list of aperiodic trigger states. Each value from 1 to 2^reportTriggerSize of the CSI request field is associated with one trigger state.

Upon reception of a value associated with a trigger state, the UE performs a measurement based on a CSI-RS and provides a corresponding CSI report or BSI report according to all entries in the associatedReportConfigInfoList for that trigger state. For each beam-specific WUS, the CSI request field can be different depending on the transmission beam for each WUS. When the UE detects a WUS with a specific transmission beam, the UE and the gNB can use the CSI-RS configuration associated with the WUS to perform beam management. Since there are no PUCCH resources included in CSI-AperiodicTriggerStateList IE, a separate PUCCH resource indicator for beam reporting needs to be indicated in the WUS or configured by RRC signaling. A PUCCH resource index field value is an index mapped to a PUCCH resource in a PUCCH resource set that the gNB configures to the UE by RRC signaling.

In another example, a CSI or a BSI request is implicitly provided by the WUS. When a UE detects a wake-up signal before the start of a next DRX cycle, the UE starts measurements on the CSI-RS resources configured by RRC signaling and reports the CSI or the BSI on the PUCCH resource configured by RRC signaling for CSI or BSI reporting.

In another example, CSI-RS based beam management is configured by RRC signaling as a periodic beam management. When a UE is in an inactive state, the UE does not perform CSI-RS based beam measurement and beam reporting. When the UE is waken up by a WUS, the UE starts to perform CSI-RS beam measurement and beam reporting. The periodicity of the periodic beam management needs to be aligned with the WUS timing. This implies that beam management is to be completed before the start of a next DRX cycle.

Before a UE performs a CSI-RS measurement in response to a CSI request or BSI request, the UE can be configured by a serving gNB to report a preferred serving beam index for the WUS on an associated PUCCH resource. The following examples relate to a determination by a UE a PUCCH resource for the UE to transmit a PUCCH that includes a CSI report or a BSI report for a preferred serving beam index for the WUS.

In one example, a PUCCH resource index is included in the WUS for the UE to report beam state information (BSI) to the gNB. The PUCCH transmission slot offset relative to the end of the WUS reception can also be configured, or can be defined in the specifications of the system operation, or can be indicated by the WUS.

In one example, a PUCCH resource indicated by the WUS is used by a UE for the configurations of subsequent beam management, when configured. Similar, a PUCCH transmission slot offset relative to the end of WUS reception can be configured to the UE by RRC signaling, or be defined in the specifications, or indicated by the WUS. The PUCCH resource indicated in the configurations for beam management is also used by the UE to report BSI to the gNB for the subsequent beam management.

For a PUCCH resource indicated by a WUS, the PUCCH resource can be configured with a same serving beam and time-frequency resources in each beam specific WUS. Then, the PUCCH-SpatialRelationInfo parameter in each PUCCH resource configuration for each WUS is same and is used to indicate the transmission beam that the UE applies for the transmission of a PUCCH on the PUCCH resource.

In one example, a PUCCH resource can be configured with a different serving beam and time-frequency resources in each beam specific WUS. Then, a UE uses the PUCCH resource indicated/associated in the corresponding beam specific WUS. For example, when a WUS with transmission beam #2 is detected by the UE, the UE reports a BSI in a PUCCH resource indicated/associated in transmission beam #2. For a PUCCH resource, the PUCCH-SpatialRelationInfo parameter in the PUCCH resource configuration is used to indicate the transmission beam used for the transmission on the PUCCH resource.

If a report for beam management on a PUCCH is initiated after a BSI report for a serving beam index of a WUS, the PUCCH transmission slot offset can be relative to the end of WUS reception or relative to another reference point that can be configured by RRC or defined by specifications or indicated in the WUS. For example, the slot offset relative to a reference point can be configured by RRC as part of each PUCCH resource in a PUCCH resource set.

When beam management is not configured to start before the start of a next DRX cycle, the following examples can apply for indication of serving beam(s) for PDCCH transmissions for the following DRX cycle.

One example for indicating a serving beam index for a PDCCH transmission in the following DRX cycle is to indicate a serving beam index in the WUS. Then, a UE can monitor PDCCH with the indicated beam at the start of the next DRX cycle when beam management is not configured before the start of the next DRX cycle.

Another example for indicating a serving beam index used for PDCCH transmission in the following DRX cycle is to use the latest transmission beam that was previously activated for PDCCH transmissions in corresponding CORESET(s).

When a UE reports to a gNB a BSI associated with a WUS, the gNB may use the reported WUS transmission beam as the PDCCH transmission beam.

Figure 36:
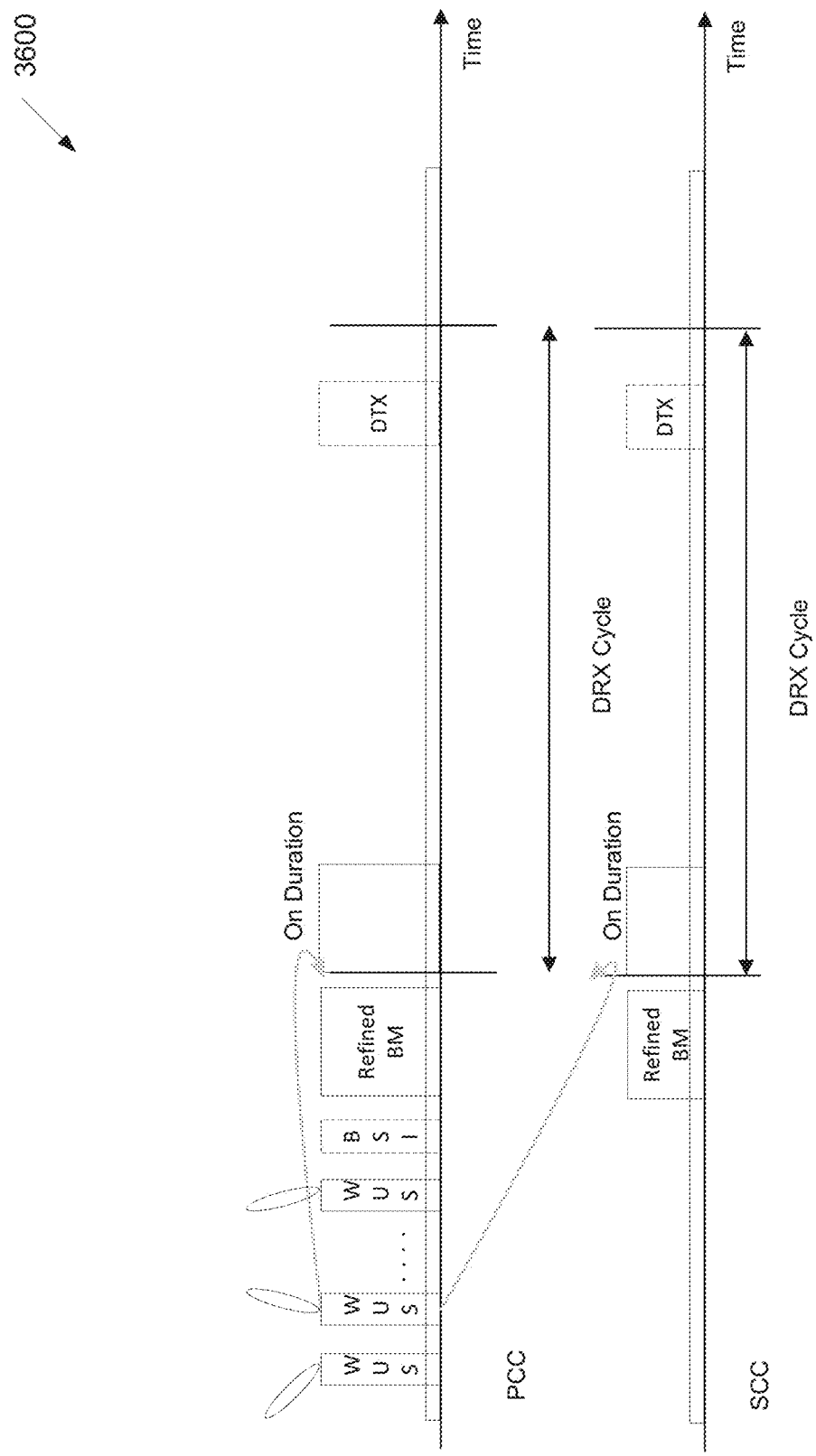
FIG. 36 illustrates an example beam management according to embodiments of the present disclosure.

FIG. 36 illustrates an example beam management 3600 according to embodiments of the present disclosure. The embodiment of the beam management 3600 illustrated in FIG. 36 is for illustration only and could have the same or similar configuration. FIG. 36 does not limit the scope of this disclosure to any particular implementation.

A WUS transmission on the PCell, or in general on a scheduling SCell, can be configured to wake up or activate a SCell. In multi-beam operating scenarios, beam management procedures on the SCell can be initiated by a multi-beam WUS on the PCell (or on a scheduling cell) if the WUS indicates potential PDCCH transmissions for scheduling transmissions/receptions on the SCell in the next DRX cycle. This can be further conditioned on the PCell and the SCell having different quasi-collocation properties (are not QCLed). For example, if the PCell (or a scheduling cell) and a SCell are not on a same frequency band or are not collocated, the PCell (or the scheduling cell) and the SCell can have different QCL properties. Then, when a WUS on the PCell (or the scheduling cell) wakes up the UE for receptions on the SCell, a beam management procedure can be initiated for the SCell. An example is shown in FIG. 36 where the beam management for both the PCell and a SCell is initiated by a same WUS on the PCell when the PCell and SCell are not QCLed.

In one example, beam management procedures on a SCell can be initiated by a single beam WUS (when the PCell does not operate with multiple beams or when a single beam WUS is configured for the PCell) on the PCell when the WUS indicates potential PDCCH transmissions for scheduling transmissions/receptions on the SCell in next DRX cycle. This can be further conditioned on the PCell and the SCell not being QCLed. The beam management procedures can be completed, as needed, before the start of the next DRX cycle for both the PCell and the SCell. If the WUS indicates no potential PDCCH transmissions for scheduling transmissions/receptions on the SCell in the next DRX cycle, the UE does not need to perform beam management procedures on the SCell.

Figure 37:
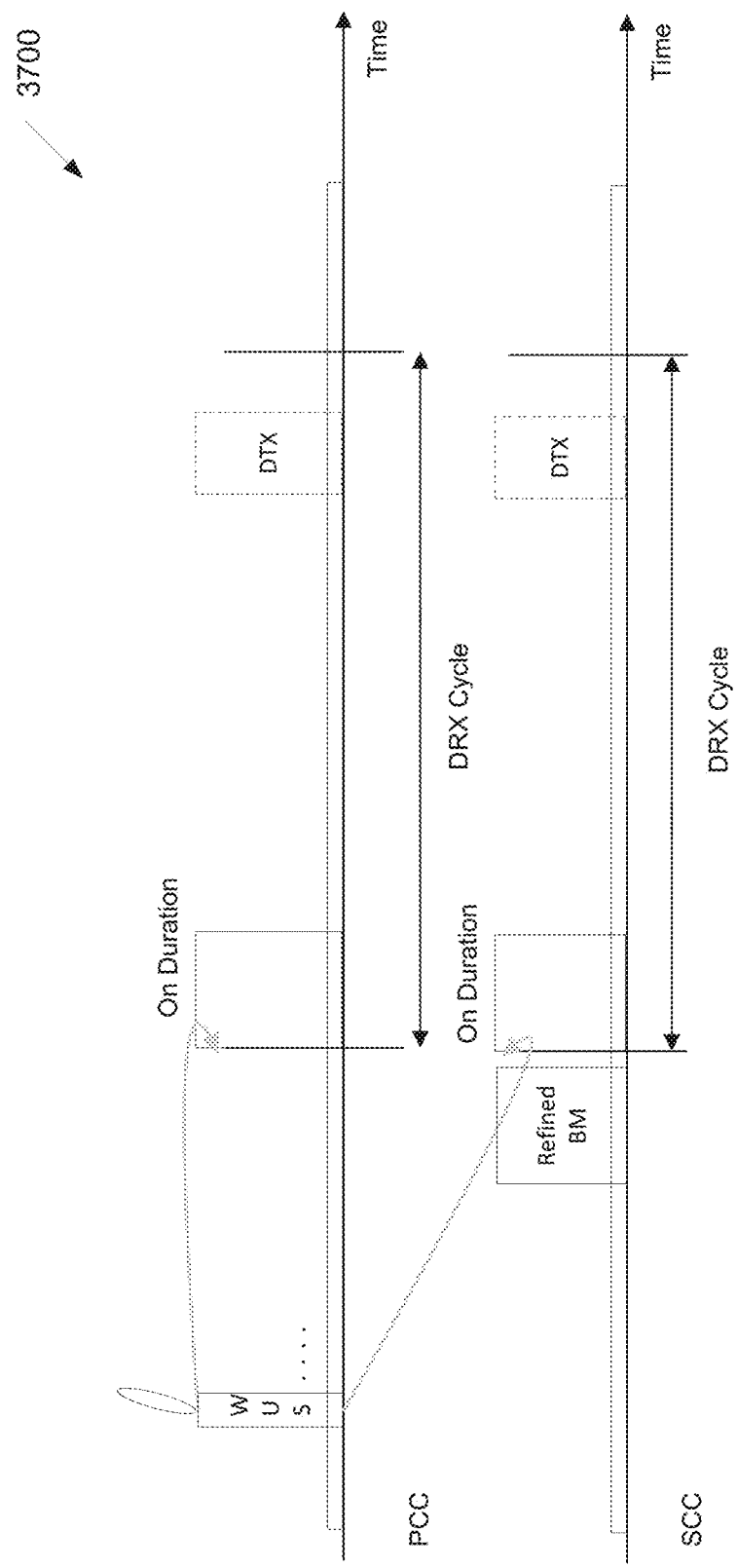
FIG. 37 illustrates another example beam management according to embodiments of the present disclosure.

FIG. 37 illustrates another example beam management 3700 according to embodiments of the present disclosure. The embodiment of beam management 3700 illustrated in FIG. 37 is for illustration only and could have the same or similar configuration. FIG. 37 does not limit the scope of this disclosure to any particular implementation.

In FIG. 37, a WUS reception on the PCell initiates beam management only for the SCell when the PCell and the SCell are not QCLed.

When beam management before a start of a next DRX cycle is configured by RRC and initiated by a multi-beam WUS, the WUS can include a CSI request or a BSI request. Similar to a CSI request or BSI request for the PCell, a configuration of CSI-RS resources for a SCell can be provided to a UE by RRC signaling. The UE reports a preferred serving beam to the gNB before the start of monitoring PDCCH in the next DRX cycle. The CSI-AperiodicTriggerStateList IE is used to configure the UE with a list of aperiodic trigger states. Each value from 1 to 2^reportTriggerSize of the CSI request field is associated with one trigger state. Upon reception of a CSI request or a BSI request value associated with a trigger state, the UE performs measurement based on a CSI-RS reception and provides a corresponding report for the Scell according to all entries in the associatedReportConfigInfoList for that trigger state. The UE can use a same PUCCH resource on the PCell for reporting the BSI to the gNB when the PUCCH resources are in the same PUCCH group. Otherwise, a new PUCCH resource for a CSI/BSI report for the SCell can be indicated in the WUS as for the PCell when a beam management before the start of the next DRX cycle for the PCell is configured.

In one example, a CSI request or a BSI request for a SCell is implicitly provided by the WUS. When a UE detects a WUS for a SCell before the start of a next DRX cycle, the UE starts CSI-RS measurements on the SCell using CSI-RS resources configured by RRC signaling and reports the CSI or BSI on a PUCCH resource configured by RRC signaling or indicated by the WUS.

If a SCell is waken up or activated by a PDCCH reception on the PCell that schedules a PDSCH or PUSCH on the SCell during the active time of a current DRX cycle, the beam management on the SCell can be initiated by the PDCCH on the PCell.

When there are periodic CSI-RS resources configured for each DRX cycle, and the timing of the periodic CSI-RS is aligned with the DRX cycle of a SCell, aperiodic beam management can be skipped. Otherwise, the aperiodic beam management can be used.

For aperiodic beam management initiated on the PCell for a SCell, for example when a WUS reception on the PCell (or a scheduling cell) initiates beam management on a SCell, a DCI format provided by a PDCCH can include a CSI request or a BSI request. A configuration of CSI-RS resources for a SCell can be provided by RRC signaling. The UE reports a preferred serving beam to the gNB before the start of PDCCH monitoring in the next DRX cycle. The CSI-AperiodicTriggerStateList IE is used to configure the UE with a list of aperiodic trigger states. Each value from 1 to 2^reportTriggerSize of the CSI request field is associated with one trigger state. Upon reception of the value associated with a trigger state, the UE may perform measurements using the CSI-RS and provide a CSI report or BSI report for a SCell according to all entries in the associatedReportConfigInfoList for that trigger state.

A UE can report a CSI or a BSI for a SCell on a PUCCH. The UE can use a same PUCCH resource as for reporting CSI/BSI for the PCell when the PCell and the SCell are in a same PUCCH group. A PUCCH resource for a CSI/BSI report for the SCell can also be indicated in the DCI format provided by the PDCCH.

In one example, a CSI request or a BSI request is implicitly determined upon a detection of a DCI format in a PDCCH. When a UE detects a DCI format in a PDCCH that schedules a PDSCH or a PUSCH and indicates a wake-up or activation for a SCell in the active time of current DRX cycle, the UE starts aperiodic CSI-RS measurements on CSI-RS resources configured by RRC on the SCell. The UE reports the CSI or the BSI on the PUCCH resource configured by RRC.

In an alternative realization, a zero-RA DCI format can be used to indicate beam management configurations for a SCell. Non-used RA fields, such as a frequency domain resource assignment field or a time domain resource assignment field, can be used and reinterpreted accordingly. In another example, a new DCI format can be designed to include beam management configurations for one or more SCells.

For a UE in multi-panel operating scenarios, when a panel is not used for transmissions, for example when the UE does not have large data packets to transmit, the UE can provide a change request to the gNB and the gNB may configure accordingly, for example, a number of SRS ports and a transmission scheme such as a number of MIMO layers. Then, the UE can save power by turning off the RF hardware on the panel that is not used.

In one example, a UE can request use for a number of panels that are used to transmit signals to the gNB by RRC signaling. In one example, a UE can request use for a number of panels that are used to transmit signals to the gNB by a MAC CE. The panel request can be a number of SRS ports.

Similar, for multi-panel downlink operating scenarios, a gNB can determine panels that are not used for receptions by a UE and signal this information to the UE by RRC or a MAC CE. The UE can turn off the RF hardware for panels that are not used for receptions and reduce power consumption. For example, when higher layer parameter group-based-beam-reporting is configured as "ON," the UE reports only one of the simultaneously received transmission beams as the preferred transmission beam. Another alternative is for the UE to inform the gNB about this change by RRC or MAC CE and the gNB may configure accordingly, for example, a transmission scheme, such as a number of MIMO layers, to the UE. The panel information can be a maximum number of simultaneously received beams by the UE.

When NR and LTE operate on different carriers, if DRX periodicity is aligned between NR and LTE, a WUS transmission on an NR cell can apply to all or a subset of configured or activated cells that are associated with the NR cell for both NR and LTE. The WUS can inform whether or not there is any upcoming PDCCH for scheduling PDSCH or PUSCH on a respective cell. When NR and LTE baseband processing hardware are in a co-located processing unit, the scheduling information can be exchanged between NR and LTE via Xn interface. A periodicity of this exchange of scheduling information can be in multiples of the length of DRX period.

A UE needs to wake up to detect a WUS only on the NR cell where the WUS is transmitted. Therefore, the UE needs to turn on the RF hardware and baseband processing units only for detecting a WUS on the NR cell where the WUS is transmitted (WUS cell). When the WUS indicates a potential upcoming PDCCH scheduling PDSCH or PUSCH on a NR cell or LTE cell associated with the WUS cell for wake up indication, the UE may wake up on the NR cell or the LTE cell. When the WUS indicates there is no upcoming PDCCH scheduling PDSCH or PUSCH on a cell associated with the WUS cell, the UE may not wake up for transmissions/ receptions on the cell. UE power consumption can be reduced as inactive time in the DRX cycle is increased for cells where the UE does not wake up, particularly for inter-band CA operation.

Figure 38:
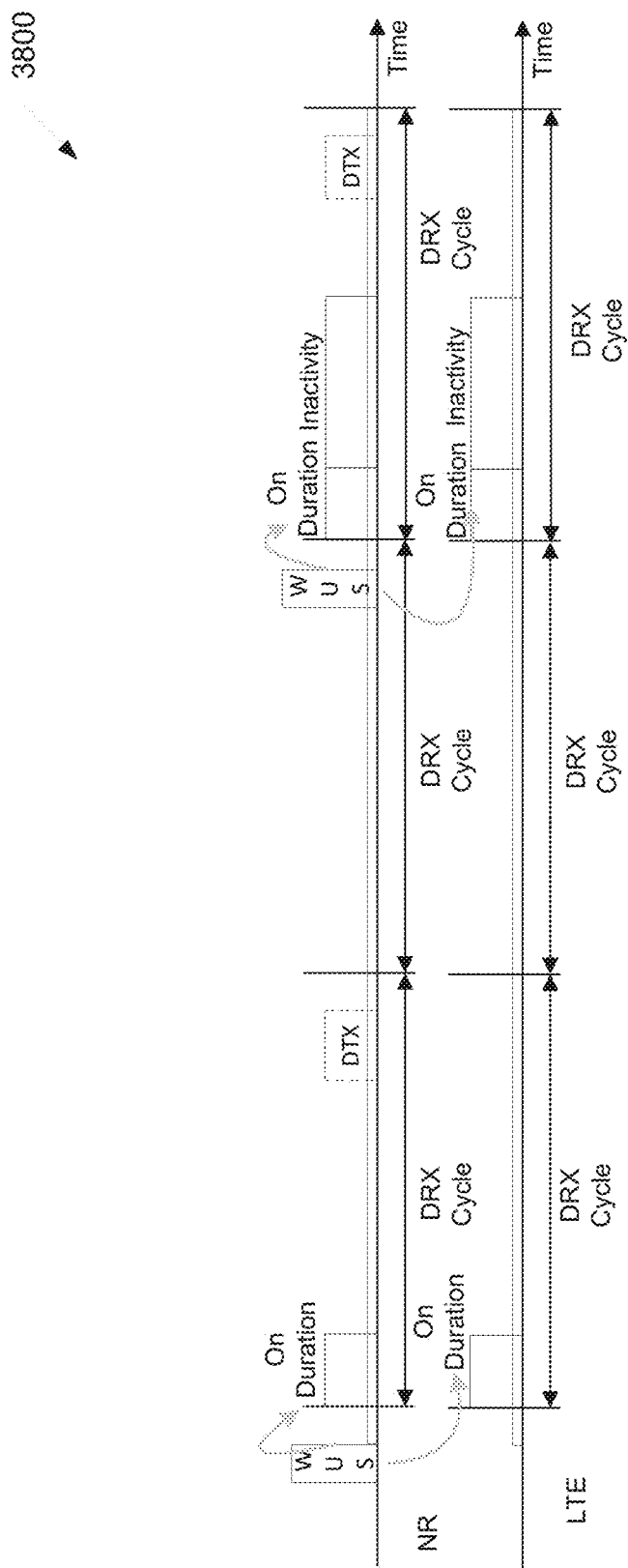
FIG. 38 illustrates an example wake-up signal transmission according to embodiments of the present disclosure.

FIG. 38 illustrates an example wake-up signal transmission 3800 according to embodiments of the present disclosure. The embodiment of the wake-up signal transmission 3800 illustrated in FIG. 38 is for illustration only and could have the same or similar configuration. FIG. 38 does not limit the scope of this disclosure to any particular implementation.

FIG. 38 shows an example where a WUS transmission is on a NR cell (WUS cell) and serves to wake-up a UE for cells of both NR and LTE that are associated with the WUS cell for wake up/activation purposes. If a DRX periodicity for a UE is aligned between NR cells and LTE cells, a WUS on a NR cell (WUS cell) can be used to indicate, for all or for subset of configured serving cells of both NR and LTE, whether or not there is any upcoming PDCCH scheduling PDSCH or PUSCH on a cell associated with the WUS cell.

Figure 39:
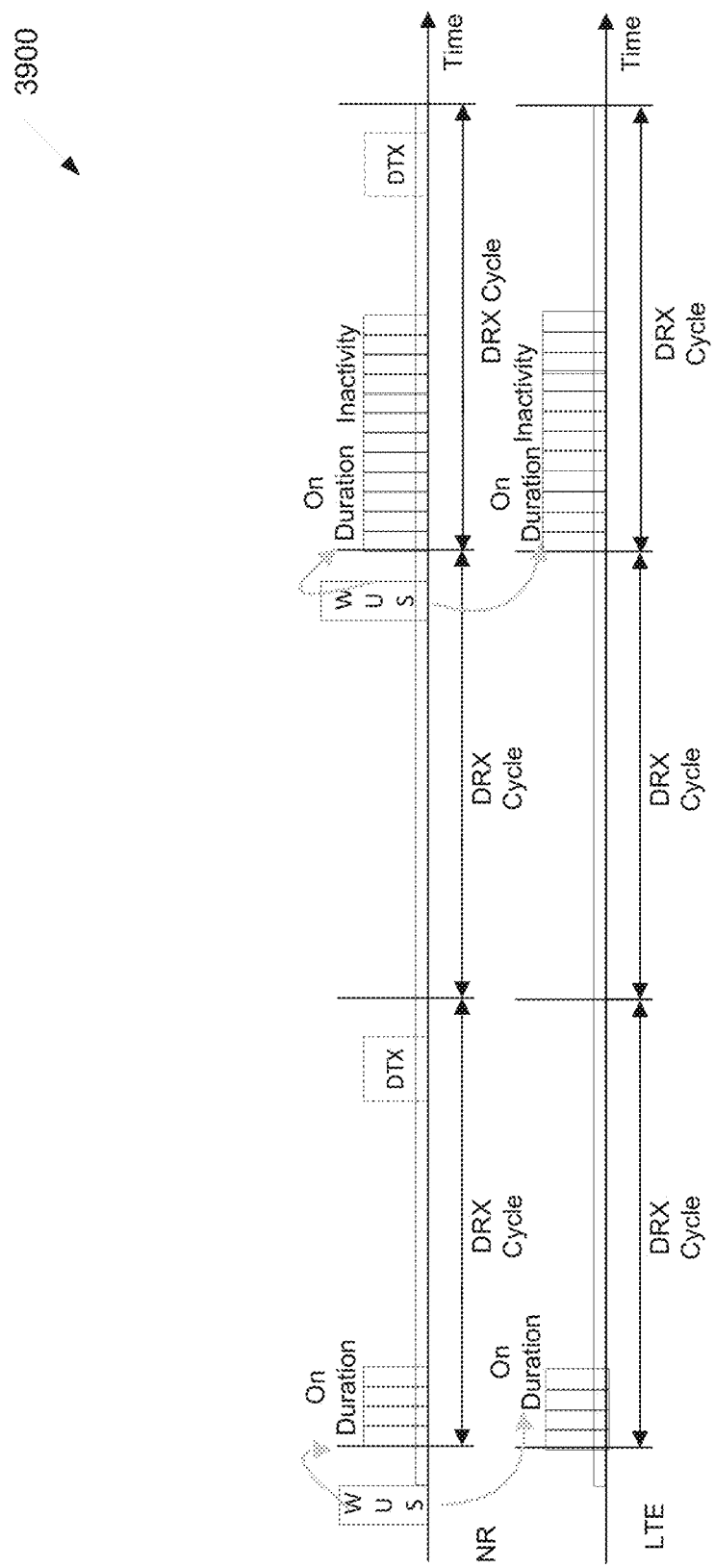
FIG. 39 illustrates another example wake-up signal transmission according to embodiments of the present disclosure.

FIG. 39 illustrates another example wake-up signal transmission 3900 according to embodiments of the present disclosure. The embodiment of the wake-up signal transmission 3900 illustrated in FIG. 39 is for illustration only and could have the same or similar configuration. FIG. 39 does not limit the scope of this disclosure to any particular implementation.

FIG. 39 shows an example where a WUS transmission is on a NR cell (WUS cell) and serves to wake-up a UE for cells of both NR and LTE that are configured to be associated with the WUS cell. If DRX periodicity for the UE is aligned between the gNBs for NR-NR dual connectivity, a WUS on a cell can be used to indicate for all or for subset of the configured cells of NR gNBs whether or not there is any upcoming PDCCH scheduling PDSCH or PUSCH in a respective cell. When NR baseband processing hardware for both gNBs is in a co-located processing unit, the scheduling information can be exchanged periodically between both gNBs of NR via Xn interface. The periodicity of this exchange of scheduling information can be in multiples of the length of a DRX period.

Figure 40:
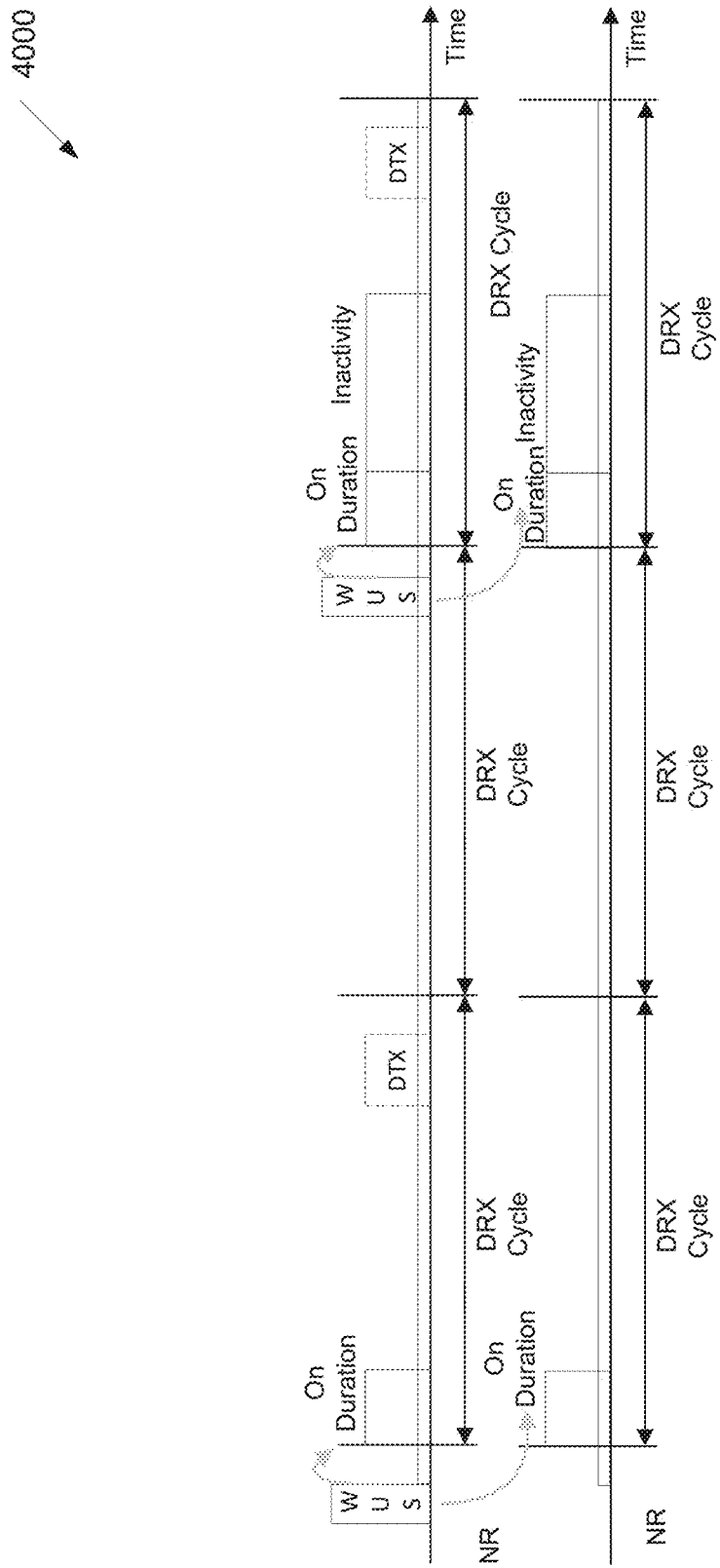
FIG. 40 illustrates yet another example wake-up signal transmission according to embodiments of the present disclosure.

FIG. 40 illustrates yet another example wake-up signal transmission 4000 according to embodiments of the present disclosure. The embodiment of the wake-up signal transmission 4000 illustrated in FIG. 40 is for illustration only and could have the same or similar configuration. FIG. 40 does not limit the scope of this disclosure to any particular implementation.

FIG. 40 shows an example where a WUS transmission is on a NR cell (WUS cell) and serves as to wake up a UE for cells of both NR gNBs associated with the WUS cell for the purposes of waking up the UE for the next DRX ON period. One efficient UE power saving mechanism known as the UE wakeup mechanism is to trigger the UE for network access from power efficient mode when data arrives in IDLE, CONNECTED and INACTIVE states. A UE can stay in the power efficient mode, such as micro sleep or OFF period in the long DRX cycle, unless the UE is informed of network access through the UE wakeup mechanism. Alternatively, a network can indicate to the UE to switch from the "network access" mode to the power efficient mode when there is no traffic to deliver.

A UE also consumes material power for RRM measurements. In particular, a UE needs to power up before a DRX ON period to track the channel in preparation for the RRM measurement. Some of the RRM measurements are not necessary but consume a lot of UE power. For example, a low mobility UE does not need to perform RRM measurements as frequently as a high mobility UE. A network can provide signaling to assist a UE to reduce power consumption associated with RRM measurements. Additional UE assistance, for example UE mobility status information, can be useful for the network to enable UE power consumption reduction for RRM measurements.

In the RRC_IDLE state, a UE may measure the SS-RSRP and SS-RSRQ level of the serving cell and evaluate a cell selection criterion S defined below for the serving cell at least every DRX cycle. If the UE has evaluated in $N_{serv}$ consecutive DRX cycles that the serving cell does not fulfil the cell selection criterion S, the UE may initiate measurements for all neighboring cells indicated by the serving cell regardless of the measurement rules currently limiting UE measurements.

When evaluating Srxlev and Squal of non-serving cells for reselection purposes, the UE can use parameters provided by the serving cell. The following rules can be used by the UE to limit measurements. In one example, if the serving cell fulfils Srxlev>$S_{IntraSearchP}$ and Squal>$S_{IntraSearchQ}$, the UE can choose to not perform intra-frequency measurements; otherwise, the UE performs intra-frequency measurements.

In another example, a UE can apply the following rules for NR inter-frequency and inter-RAT frequency measurement that are indicated in system information and for which the UE has priority provided as defined in LTE. For a NR inter-frequency or inter-RAT frequency measurement with a reselection priority higher than the reselection priority of the current NR frequency, the UE can perform measurements of higher priority NR inter-frequency or inter-RAT frequency. For a NR inter-frequency with an equal or lower reselection priority than the reselection priority of the current NR frequency and for inter-RAT frequency with lower reselection priority than the reselection priority of the current NR frequency, if the serving cell fulfils Srxlev>$S_{nonIntraSearchP}$ and Squal>$S_{nonIntraSearchQ}$, the UE can choose to not perform measurements of NR inter-frequencies or inter-RAT frequency cells of equal or lower priority. Otherwise, the UE can perform measurements of NR inter-frequency or inter-RAT frequency cells of equal or lower priority.

A measurement is defined as a SS/PBCH block based intra-frequency measurement, provided that the center frequency of the SS/PBCH block of the serving cell indicated for measurement and the center frequency of the SS/PBCH block of the neighboring cell are same and the subcarrier spacing of the two SS/PBCH blocks are also the same.

SS/PBCH block based measurements are configured along with one or two measurement timing configuration(s) (SMTC) that provide periodicity, duration and offset information on a window of up to 5 ms where the measurements are to be performed. For intra-frequency connected mode measurements, up to two measurement window periodicities can be configured. A single measurement window offset and measurement duration are configured per intra-frequency measurement object.

When measurement gaps are needed, the UE is not expected to detect a SS/PBCH block that starts earlier than the gap starting time+(plus) switching time, nor to detect a SS/PBCH block that ends later than the gap end-(minus) switching time. The switching time is 0.5 ms for frequency range 1 (FR1, up to 6 GHz) and 0.25 ms for frequency range 2 (FR2, above 6 GHz).

In one example, for intra frequency measurements, SMTC window duration, timing offset and SMTC periodicity are signaled in system information for IDLE mode and by RRC for CONNECTED mode.

In another example for inter frequency measurements, a SMTC window duration, timing offset, and SMTC periodicity are signaled per frequency in a system information block by the serving cell for IDLE mode and by RRC signaling for CONNECTED mode.

In one example of SMTC window duration, both for inter-/intra-frequency measurements, the candidate values are {1, 2, 3, 4, 5} msec.

In one example of SMTC window timing offset, SMTC window timing reference for the timing offset is SFN #0 of the corresponding serving cell. For IDLE mode, the serving cell here implies the cell the UE is camped on. For intra-frequency measurements, the candidate values are {0, 1, . . . , SMTC periodicity-1} ms. For inter-frequency measurements, the candidate values are {0, 1, . . . , SMTC periodicity-1} ms.

In one example of SMTC periodicity, both for inter-/intra-frequency measurements, the candidate values are {5, 10, 20, 40, 80, 160} msec.

In the RRC_CONNECTED state, the UE is configured to report the received signal measurement information to a gNB. This is done via a RRCConnectionReconfiguration message that includes the following. In one example of measurement object, list of cells (and their frequencies of operation) on which measurements are to be performed is included. In one example of reporting configuration, the reporting configuration includes periodic or event-driven triggers to send a measurement report and the information (received power, etc.) to be included in the report. In one example of measurement identity, an applicable measurement object and a reporting configuration are identified. In one example, filtering is used on the measurements. In one example of measurement gaps, an indication of a time period when no downlink or uplink transmissions are performed is provided. The objective of this time gap is to enable a UE to switch radio and perform measurements from the neighboring cells when the UE operates on frequencies other than that of the serving cell.

In the RRC_CONNECTED state, the measurement period for intra-frequency measurements is defined. The UE may be capable of performing RSRP and RSRQ measurements for N identified intra-frequency cells/inter-frequency cells, and the UE may be capable of reporting measurements to higher layers.

The IE MeasObjectNR specifies information applicable for SS/PBCH block(s) intra/inter-frequency measurements or CSI-RS intra/inter-frequency measurements.

A UE is required to be capable of measuring without measurement gaps when SS/PBCH blocks are completely contained in the active BWP. When the measurement signal has a different subcarrier spacing than PDSCH/PDCCH and on frequency range 2, there are restrictions on the scheduling availability as described in the following.

In one example of scheduling availability of UE performance measurements with a same subcarrier spacing as PDSCH/PDCCH on FR1, there are no scheduling restrictions due to measurements performed with the same subcarrier spacing as PDSCH/PDCCH on FR1.

In one example of scheduling availability of UE performance measurements with a different subcarrier spacing than PDSCH/PDCCH on FR1, for a UE that supports intraCarrierConcurrentMeas, there are no restrictions on scheduling availability due to measurements. For a UE that does not support intraCarrierConcurrentMeas, the following restrictions apply due to SS-RSRP/RSRQ/SINR measurements.

In one example, if useServingCellTimingForSync is enabled, the UE is not expected to transmit PUCCH/PUSCH or receive PDCCH/PDSCH on SS/PBCH block symbols to be measured and on one data symbol before consecutive SS/PBCH block symbols and one data symbol after consecutive SS/PBCH block symbols within SMTC window duration.

In another example, if useServingCellTimingForSync is not enabled, the UE is not expected to transmit PUCCH/PUSCH or receive PDCCH/PDSCH on all symbols within SMTC window duration.

When a UE is configured for intra-band carrier aggregation operation, the scheduling restrictions apply to all serving cells on the band.

In LTE, relaxed monitoring for cell reselection is provided in order to further reduce power consumption for idle mode UEs. Idle mode UEs are required to perform neighboring cells measurements for cell reselection according to the measurement rules controlled by the parameters SIntraSearchP and SnonIntraSearchP that are common to all UEs, that is, regardless of the UE location in the cell.

When the measurements are required, the UE performs the measurements during every DRX cycle. For UEs with relatively short DRX cycle and UEs in deep coverage, such measurements have a material impact on the UE battery consumption. On the other hand, many devices are always stationary (e.g. fixed to a wall) or intermittently stationary, i.e. not physically moving for long time periods. For such UEs, there is no need to perform measurements for mobility purposes and introducing relaxed monitoring requirements can significantly reduce their battery consumption. For a relaxed monitoring for cell reselection, the UE can choose to not perform intra-frequency and inter-frequency measurements if a stationary criterion as described below is not fulfilled. The stationary criterion is fulfilled when (Srxlev, Last−Srxlev)<SDeltaP, where Srxlev is the current Srxlev value in the serving cell and Srxlev, Last is the last Srxlev value in the serving cell, set as follows. After ranking cells for cell reselection and after cell reselection, the UE can set the value of Srxlev, Last to the value of Srxlev in the serving cell. A request to not perform RRM measurements, or to perform reduced RRM measurements, can be made by the UE to a serving gNB or be initiated when a stationary UE is deployed. The gNB can then configure the UE to not perform RRM measurements or to operate in a reduced RRM measurement mode.

In one example, the following are provided: configurations of a reduced RRM measurement mode; procedures for a reduced RRM measurements when a WUS/DTX mechanism is introduced; procedures related to rate matching for a reduced RRM measurement mode; procedures related to BWP adaptation for a reduced RRM measurement mode; and procedures related to CSI-RS measurement for a reduced RRM measurement mode.

A reduced RRM measurement mode or a normal RRM measurement mode can be configured to a UE by the network or can be selected by the UE. Compared to a normal RRM measurement mode, fewer RRM measurements can be performed by the UE for a reduced RRM measurement mode, leading to lower power consumption for RRM measurement.

For a normal RRM measurement mode, when a RSRP measurement from the serving cell falls below a specified or configured threshold, known as S criterion, the UE starts performing measurements on one or more neighboring cells. The measurements are intra-frequency when the neighboring and serving cells operate on the same frequency. The measurements are inter-frequency, when neighboring cells operate on different frequencies. Different values for S criterion threshold may be specified for intra/inter-frequency measurements A reduced RRM measurement mode can be realized by a new criterion, some additional criteria on the existing S criterion, a larger periodicity of SMTC window, a different SMTC window duration, or can be implicitly defined by other new procedures such as a WUS/DTX mechanism.

For a reduced RRM measurement mode realized by a new criterion, for example, a lower criterion threshold can result to a lower probability that the UE starts performing measurements on neighboring cells.

For a reduced RRM measurement mode realized by additional criteria to the existing S criterion, when RSRP measurement from the serving cell satisfies a threshold of the existing S criterion and the additional criteria at the same time, the UE starts performing measurement on neighboring cells.

For a reduced RRM measurement mode realized by a larger periodicity of SMTC window, less RRM measurements are performed during a given time period, thereby leading to lower UE power consumption for RRM measurements.

For a reduced RRM measurement mode realized by a different SMTC window duration, a smaller SMTC window duration requires a smaller measurement time by the UE for RRM measurements, thereby leading to lower power consumption.

A reduced RRM measurement mode can also be realized by other procedures. For example, when a WUS/DTX signal is introduced and no data transmission/reception is indicated for the UE in the following DRX cycle, the UE does not perform RRM measurements in the following DRX cycle.

When the network has more mobility information acquired from a UE, such as for example a number of handovers or a number of cell reselections within a given time period, the network can indicate either a reduced RRM measurement mode or a normal RRM measurement mode to the UE.

For a connected UE, the UE can be indicated in RRCReconfiguration message whether a RRM measurement mode is a normal RRM measurement mode or one of reduced RRM measurement modes that are defined or specified. For different RRM measurement modes, their relevant parameters can be defined in the MeasObjectNR IE or specified respectively.

For a reduced RRM measurement mode realized by a larger periodicity of SMTC window, a larger periodicity than 160 ms can be specified, and the periodicity of infinity can be used to indicate that the UE does not need to perform RRM measurement e.g., when the network knows that the UE is stationary.

For a reduced RRM measurement mode realized by a smaller duration of SMTC window, a smaller duration than 1 ms can be specified. A SMTC window of zero duration can be used to indicate that the UE does not need to perform RRM measurements e.g., when the network knows that the UE is stationary.

For an idle/inactive mode UE, the UE can select the RRM measurement mode based upon the UE's mobility status. At least two RRM measurement modes and their related parameters can be defined in system information blocks (SIBs) or be specified. Based upon the UE's current mobility status, the UE can select one of the RRM measurement modes and use corresponding RRM measurement parameters received in the SIBs to perform RRM measurements. For a normal RRM measurement mode, the UE performs a RRM measurement in each DRX cycle for the serving cell. For a reduced RRM measurement mode, the UE can perform a RRM measurement for the serving cell over a period of more than one DRX cycles.

For a UE in an idle/inactive state, the parameters that can be configured for a reduced RRM measurement mode can include, but not limited to, any combination of the following and can be specified or signaled.

In one example of SMTC configuration parameters, the parameters include a SMTC periodicity, SMTC duration, and SMTC offset. Parameters related to triggered measurement criterion, e.g., $S_{IntraSearchP}$, SIntraSearchQ, $S_{nonIntraSearchP}$, and SnonIntraSearchQ where $S_{IntraSearchP}$ and SIntraSearchQ include the following. If Srxlev>$S_{IntraSearchP}$ and Squal>SIntraSearchQ, the UE can search for all intra-frequency neighboring cells and inter-frequency neighboring cells of higher priority, where $S_{nonIntraSearchP}$ and SnonIntraSearchQ include the following. If Srxlev>$S_{nonIntraSearchP}$ and Squal>$S_{nonIntraSearchQ}$, the UE can search for inter-frequency neighboring cells of equal or lower priority. Srxlev is Cell selection reception level value (dB) and Squal is Cell selection quality value (dB).

In one example, parameters related to serving cell measurement, e.g., Nserv, where Nserv is a number of consecutive DRX cycles that the serving cell does not fulfil the cell selection criterion S, the UE may initiate the measurements on all neighboring cells. Another related parameter is the periodicity in terms of number of DRX cycles that the UE performs RRM measurements.

In one example, parameters related to additional criteria for RRM measurements, e.g., $S_{SearchDeltaP}$, where $S_{SearchDeltaP}$ is a parameter related to relaxed RRM mode for neighbor cell detection and measurements that are applied. When (Srxlev$_{Ref}$-Srxlev)<$S_{SearchDeltaP}$, where Srxlev$_{Ref}$ is a reference Srxlev, a relaxed RRM measurement mode is applied. Otherwise, the UE performs neighboring cell detection and measurements according to current criteria. The parameters may be conveyed in SIBs or be defined by specifications to reduce signaling overhead.

For UE operation in connected state, the parameters that can be configured for a reduced RRM measurement mode can include, but not limited to, any combination of the following.

In one example, a parameter can be a normal or reduced RRM measurement mode indication.

In one example of SMTC configuration parameters, SMTC periodicity, SMTC duration and SMTC offset are provided.

In one example, parameters related to additional criteria, e.g., $S_{SearchDeltaP}$ where $S_{searchDeltaP}$ is a parameter related to relaxed RRM mode for neighbor cell detection and measurements that are applied. When (Srxlev$_{Ref}$-Srxlev)<$S_{SearchDeltaP}$, where Srxlev$_{Ref}$ is a reference Srxlev, a relaxed RRM measurement mode is applied. Otherwise, the UE performs neighboring cell detection and measurements according to current criteria.

In one example, parameters relate to intra/inter frequency measurement, e.g., measurement period with and without measurement gaps for intra/inter frequency measurement, or a parameter N that is the required number of identified-intra-frequency/inter-frequency cells to be measured during the measurement period.

In one example, the parameters can be conveyed in MeasObjectNR IE or defined by specifications to reduce signaling overhead.

The configuration of SMTC window can be indicated by physical layer signaling. Indexes of all SMTC configurations can be defined by higher layers. The SMTC window that is used is then signaled by physical layer signaling by providing an index to a SMTC configuration defined by higher layers. The physical layer signaling can be through a WUS or a DCI format.

A reduced RRM measurement mode can also be indicated by physical layer signaling. The form of the physical layer signaling can be a WUS or a DCI format.

Reduced RRM measurements can be considered together with a WUS/DTX mechanism for an idle/inactive and connected state.

In an idle state, if a WUS/DTX is used to indicate whether or not there is any paging message scheduled in the following DRX cycle then, when a UE detects DTX for a WUS transmission, the UE determines that there is no paging message scheduled in the following DRX cycle. If a reduced RRM mode is selected by the UE, the UE can skip an RRM measurement in the SMTC window configured for the current or following DRX cycle.

In a connected state, if a reduced RRM measurement mode is configured for the UE, the UE can skip the RRM measurement in the SMTC window configured for the current or the following DRX cycle if the UE does not need to wake up in the current or the following DRX cycle based on an indication by a WUS.

In one example for the procedure of reduced RRM measurements, a RRM measurement for a SMTC window can be indicated by a WUS/DCI format that precedes the SMTC window and indicates whether or not a UE needs to perform the RRM measurement for the SMTC window.

If a UE does not need to perform intra/inter frequency RRM measurements, for example due to a reduced RRM measurement mode, some resources in the SMTC window configured for the RRM measurement for cases where the measurement signal has a different subcarrier spacing than PDSCH/PDCCH or on frequency range 2 may be wasted. To better utilize such resources, PDSCH transmissions can be scheduled in the respective OFDM symbols of the SMTC window.

If a WUS is used, one bit information in the WUS can be used to indicate that a UE does not need to perform RRM measurement for the following DRX cycle. The UE does not need to consider rate matching for PDSCH receptions on symbols around the SS/PBCH block symbols (a predefined number of symbols before and after the consecutive SS/PBCH block symbols) to be measured within the SMTC window duration. PDSCH can be received on the symbols around the SS/PBCH block symbols (a predefined number of symbols before and after the consecutive SS/PBCH block symbols) to be measured within the SMTC window duration.

When a reduced RRM measurement mode, for example for a stationary UE, is configured where the UE does not perform a RRM measurement, the UE can be scheduled on the symbols around the SS/PBCH block symbols within the SMTC window duration (a predefined number of symbols before and after the consecutive SS/PBCH block symbols).

The following applies to a UE in both idle/inactive mode and connected state. When a UE wakes up on a default BWP and switches to a BWP that contains SS/PBCH blocks to perform RRM measurements in the serving cell then, if the active BWP for RRM measurement includes only SS/PBCH blocks of the serving cell and does not include SS/PBCH blocks from neighboring cells, the UE retunes to the BWP that includes the SS/PBCH blocks from the neighboring cells to perform RRM measurements on the neighboring cells. If the SMTC window for the serving cell is same as the SMTC windows of neighboring cells and the frequency position of SS/PBCH blocks for the serving cell does not overlap with the frequency position of SS/PBCH blocks of neighboring cells, the UE cannot perform RRM measurements in the same SMTC window. For this case, the following are considered.

In one example, if the UE is configured a BWP that contains the SS/PBCH block of both the serving cell and neighboring cells, the UE retunes to the BWP, instead of a BWP that contains only the SS/PBCH block of the serving cell, in each DRX cycle.

In another example, in each DRX cycle, when a UE wakes up and performs a RRM measurement, the UE retunes to the BWP that contains the SS/PBCH blocks of both the serving cell and neighboring cells, instead of a default BWP, to avoid an unnecessary BWP switching time.

In another example, if the UE is not configured a BWP that contains SS/PBCH blocks of both the serving cell and neighboring cells, the UE distributes RRM measurements into different SMTC windows for neighboring cells with different frequency positions of SS/PBCH blocks. The UE wakes up to a BWP, or switches from a default BWP, that includes intra/inter frequency SS/PBCH blocks to perform the RRM measurements in order to avoid unnecessary BWP switching time.

In another example, different SMTC windows are configured for intra/inter frequency cells with different frequency positions of SS/PBCH blocks. When the UE is scheduled a PDSCH reception by a DCI format, if the UE is configured with a reduced RRM measurement mode, the UE does not perform RRM measurements to avoid unnecessary BWP adaptation/switching when a bandwidth of an associated SS/PBCH block is not contained within a PDSCH reception bandwidth. If the SS/PBCH block frequency location in a SMTC window is not in a same BWP as the PDSCH reception, and the time offset between the SMTC window and the PDSCH reception is less than a predefined number of symbols, the UE skips a RRM measurement for the SS/PBCH block.

The following applies to a UE with WUS/DTX configured and in connected state. If the UE is configured a CSI-RS resource and an associated CSI-RS transmission is outside the C-DRX active time but overlaps with a configured WUS/DTX period, CSI-RS measurement may be performed if a normal RRM measurement mode is configured to the UE. Otherwise, if a reduced RRM measurement mode is configured to the UE, the UE may not perform a CSI-RS measurement when the UE detects a DTX for the WUS and/or the CSI-RS resource is located outside the BWP of the configured WUS/DTX.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) comprising:
   a transceiver configured to:
      receive first information for which secondary cells (SCells) are included in respective groups of first groups of SCells, and
      receive first PDCCHs, wherein:
         a first PDCCH from the first PDCCHs provides a first downlink control information (DCI) format,
         the reception of the first PDCCH is outside an On-duration of any discontinuous reception (DRX) cycle,
         the first DCI format includes a first bitmap, and
         bits of the first bitmap have a one-to-one mapping with the first groups of SCells; and
   a processor operably coupled to the transceiver, the processor configured to:
      determine, based on a value of a corresponding bit of the first bitmap, whether or not to instruct the transceiver to receive PDCCHs for scheduling, on SCells in a group of SCells from the first groups of SCells, receptions of physical downlink shared channels (PDSCHs) or transmissions of physical uplink shared channels (PUSCHs); and
      determine whether or not to instruct the transceiver to receive PDCCHs, for scheduling receptions of PDSCHs or transmission of PUSCHs, on a primary cell during the On-duration of a next DRX cycle based on a value of a first bit, wherein:
         the first bit is included in the first DCI format, and
         the first bit is not included in the first bitmap.

2. The UE of claim 1, wherein:
   the transceiver is further configured to receive a configuration for a first bandwidth part (BWP) of a cell from the group of SCells,
   when the UE receives PDCCHs in a BWP of the cell, for scheduling receptions of PDSCHs or transmission of PUSCHs, prior to receiving the first DCI format and the value of the corresponding bit indicates to receive PDCCHs, for scheduling receptions of PDSCHs or transmission of PUSCHs, on the cell, the UE receives the PDCCHs in the BWP of the cell, and
   when the UE does not receive PDCCHs in any BWP of the cell, for scheduling receptions of PDSCHs or transmissions of PUSCHs, prior to receiving the first DCI format and the value of the corresponding bit indicates to receive PDCCHs, for scheduling receptions of PDSCHs or transmissions of PUSCHs, on the cell, the UE receives the PDCCHs in the first BWP of the cell.

3. The UE of claim 1, wherein:
the transceiver is further configured to receive second information; and
the processor is further configured to:
  determine that the first DCI format is not received before a start of the On-duration of a next DRX cycle, and
  determine whether or not to receive PDCCHs for scheduling receptions of PDSCHs, or transmissions of PUSCHs, on a primary cell during the On-duration of the next DRX cycle based on the second information.

4. The UE of claim 1, wherein the reception of the first PDCCH is on a bandwidth part (BWP) that is same as a BWP at an end of the On-duration of a last DRX cycle for receptions of PDCCHs, for scheduling receptions of PDSCHs or transmissions of PUSCHs, were received on the primary cell.

5. The UE of claim 1, wherein:
the transceiver is further configured to:
  receive second information for second groups of SCells; and
  receive a second PDCCH,
the second PDCCH provides a second DCI format,
the second DCI format includes a resource allocation field,
the processor is further configured to determine the second DCI format as:
  scheduling a reception of a PDSCH when the resource allocation field does not have a first value; and
  providing a second bitmap when the resource allocation field has the first value, bits of the second bitmap have a one-to-one mapping with the second groups of SCells,
the second bitmap is provided by fields in the second DCI format other than the resource allocation field, and
a value of a bit of the second bitmap indicates whether or not to receive PDCCHs, for scheduling receptions of PDSCHs or transmissions of PUSCHs, on a corresponding group of SCells from the second groups of SCells.

6. The UE of claim 1, wherein:
the transceiver is further configured to:
  receive second information for second groups of SCells; and
  receive a second PDCCH on a cell,
the second PDCCH provides a second DCI format,
the second DCI format schedules a PDSCH reception or a PUSCH transmission on the cell,
the second DCI format includes a field that provides a second bitmap,
bits of the second bitmap have a one-to-one mapping with the second groups of SCells, and
the processor is further configured to determine whether or not to instruct the transceiver to receive PDCCHs, for scheduling receptions of PDSCHs or transmissions of PUSCHs, on SCells in a group of SCells from the second groups of SCells based on a value of a corresponding bit of the second bitmap.

7. A method for a user equipment (UE) to receive physical downlink control channels (PDCCHs), the method comprising:
receiving first information for which secondary cells (SCells) are included in respective groups of first groups of SCells;
receiving first PDCCHs, wherein:
  a first PDCCH from the first PDCCHs provides a first downlink control information (DCI) format,
  the reception of the first PDCCH is outside an On-duration of any discontinuous reception (DRX) cycle,
  the first DCI format includes a first bitmap, and
  bits of the first bitmap have a one-to-one mapping with the first groups of SCells;
determining, based on a value of a corresponding bit of the first bitmap, whether or not to receive PDCCHs for scheduling, on SCells in a group of SCells from the first groups of SCells, receptions of physical downlink shared channels (PDSCHs) or transmissions of physical uplink shared channels (PUSCHs); and
determining whether or not to receive PDCCHs, for scheduling receptions of PDSCHs or transmissions of PUSCHs, on a primary cell during the On-duration of a next DRX cycle based on a value of a first bit, wherein:
  the first bit is included in the first DCI format, and
  the first bit is not included in the first bitmap.

8. The method of claim 7, further comprising:
receiving a configuration for a first bandwidth part (BWP) for a cell from the group of SCells, wherein:
  when the UE does not receive PDCCHs in any BWP of the cell, for scheduling receptions of PDSCHs or transmissions of PUSCHs, prior to receiving the first DCI format and the value of the corresponding bit indicates to receive PDCCHs, for scheduling receptions of PDSCHs or transmissions of PUSCHs, on the cell, the UE receives the PDCCHs in the first BWP of the cell; and
  when the UE receives PDCCHs in a BWP of the cell, for scheduling receptions of PDSCHs or transmissions of PUSCHs, prior to receiving the first DCI format and the value of the corresponding bit indicates to receive PDCCHs, for scheduling receptions of PDCCHs or transmissions of PUSCHs, on the cell, the UE receives the PDCCHs in the BWP of the cell.

9. The method of claim 7, wherein the reception of the first PDCCH is on a bandwidth part (BWP) that is same as a BWP at an end of the On-duration of a last DRX cycle for receptions of PDCCHs, for scheduling receptions of PDSCHs or transmissions of PUSCHs, on the primary cell.

10. The method of claim 7, further comprising:
receiving second information;
determining that the first DCI format is not received before a start of the On-duration of a next DRX cycle; and
determining whether or not to receive PDCCHs for scheduling receptions of PDSCHs or transmissions of PUSCHs, on a primary cell during the On-duration of the next DRX cycle based on the second information.

11. The method of claim 7, further comprising:
receiving second information for second groups of SCells;
receiving a second PDCCH, wherein:
  the second PDCCH provides a second DCI format, and
  the second DCI format includes a resource allocation field; and
determining the second DCI format as:
  scheduling a reception of a PDSCH when the resource allocation field does not have a first value, and
  providing a second bitmap when the resource allocation field has the first value, wherein:

bits of the second bitmap have a one-to-one mapping with the second groups of SCells, the second bitmap is provided by fields in the second DCI format other than the resource allocation field, and a value of a bit of the second bitmap indicates whether or not to receive PDCCHs for scheduling receptions of PDSCHs or transmissions of PUSCHs, on a corresponding group of SCells from the second groups of SCells.

12. The method of claim 7, further comprising:

receiving second information for second groups of SCells;

receiving a second PDCCH on a cell, wherein:

the second PDCCH provides a second DCI format, the second DCI format schedules a PDSCH reception or a PUSCH transmission on the cell, the second DCI format includes a field that provides a second bitmap, bits of the second bitmap have a one-to-one mapping with the second groups of SCells; and determining whether or not to receive PDCCHs, for scheduling receptions of PDSCHs or transmissions of PUSCHs, on SCells in a group of SCells from the second groups of SCells based on a value of a corresponding bit of the second bitmap.

13. A base station comprising:

a processor, operably coupled to a transceiver, the processor configured to instruct, based on a value of a corresponding bit of a first bitmap, the transceiver whether or not to transmit PDCCHs for scheduling, on SCells in a group of SCells from a first groups of SCells, receptions of physical downlink shared channels (PDSCHs) or transmissions of physical uplink shared channels (PUSCHs); and the transceiver configured to:

transmit first information for the first groups of SCells; and transmit first PDCCHs, wherein:

a first PDCCH from the first PDCCHs provides a first downlink control information (DCI) format, the transmission of the first PDCCH is outside an On-duration of any discontinuous reception (DRX) cycle, the first DCI format includes the first bitmap, and bits of the first bitmap have a one-to-one mapping with the first groups of SCells, wherein the processor is further configured to determine whether or not to instruct the transceiver to transmit PDCCHs, for scheduling receptions of PDSCHs or transmissions of PUSCHs, on a primary cell during the On-duration of a next DRX cycle based on a value of a first bit, wherein:

the first bit is included in the first DCI format, and the first bit is not included in the first bitmap.

14. The base station of claim 13, wherein the transmission of the first PDCCH is on a bandwidth part (BWP) that is same as a BWP at an end of the On-duration of a last DRX cycle for transmissions of PDCCHs for scheduling receptions of PDSCHs, or transmissions of PUSCHs, on the primary cell.

15. The base station of claim 13, wherein:

the processor is further configured to:

determine that the first DCI format is not transmitted before a start of the On-duration of a next DRX cycle; and determine whether or not to transmit PDCCHs for scheduling receptions of PDSCHs or transmissions of PUSCHs, on a primary cell during the On-duration of the next DRX cycle based on second information; and the transceiver is further configured to transmit the second information.

16. The base station of claim 13, wherein:

the processor is further configured to determine a second DCI format as:

scheduling a reception of a PDSCH when a resource allocation field in the second DCI format does not have a first value, and providing a second bitmap when the resource allocation field in the second DCI format has the first value, bits of the second bitmap have a one-to-one mapping with groups of SCells from second groups of SCells, the second bitmap is provided by fields in the second DCI format other than the resource allocation field, a value of a bit of the second bitmap indicates whether or not to instruct the transceiver to transmit PDCCHs, for scheduling receptions of PDSCHs or transmissions of PUSCHs, on a corresponding group of SCells from the second groups of SCells, and the transceiver is further configured to transmit:

second information for the second groups of SCells, and a second PDCCH that provides the second DCI format.

17. The base station of claim 13, wherein:

the processor is further configured to determine whether or not to instruct the transceiver to transmit PDCCHs, for scheduling transmissions of PDSCHs or receptions of PUSCHs, on SCells in a group of SCells from second groups of SCells based on a value of a bit of a second bitmap, the transceiver is further configured to:

transmit second information for the second groups of SCells, and transmit a second PDCCH on a cell, the second PDCCH provides a second DCI format, the second DCI format schedules a PDSCH reception or a PUSCH transmission on the cell, the second DCI format includes a field that provides the second bitmap, and bits of the second bitmap have a one-to-one mapping with the second groups of SCells.

* * * * *